US012572574B2

(12) United States Patent
Larson et al.

(10) Patent No.: US 12,572,574 B2
(45) Date of Patent: Mar. 10, 2026

(54) RETRIEVAL AUGMENTED GENERATIVE QUESTION AND ANSWER BOOSTING

(71) Applicants: LIFE TECHNOLOGIES CORPORATION, Carlsbad, CA (US); THERMO ELECTRON NORTH AMERICA LLC, Bannockburn, IL (US); PPD Development, L.P., Wilmington, NC (US)

(72) Inventors: Bradley Jared Larson, Portland, OR (US); Thomas S. Schutz, Carlsbad, CA (US); Rachel Alane Heskin, San Marcos, CA (US); Anthony Owen Cooper, Clyde, NC (US); John Christian Jameson, Littleton, CO (US); Lawrence Michael Lobato, Jr., Vista, CA (US); Praveen Kakumanu, San Ramon, CA (US); Soumak Mookherjee, Cary, NC (US)

(73) Assignees: LIFE TECHNOLOGIES CORPORATION, Carlsbad, CA (US); THERMO ELECTRON NORTH AMERICA LLC, Bannockburn, IL (US); PPD DEVELOPMENT, L.P, Wilmington, NC (US)

( * ) Notice: Subject to any disclaimer, the term of this patent is extended or adjusted under 35 U.S.C. 154(b) by 139 days.

(21) Appl. No.: 18/640,914

(22) Filed: Apr. 19, 2024

(65) Prior Publication Data

US 2025/0328565 A1     Oct. 23, 2025

(51) Int. Cl.
G06F 16/334 (2025.01)
G06F 40/40 (2020.01)

(52) U.S. Cl.
CPC .......... G06F 16/3344 (2019.01); G06F 40/40 (2020.01)

(58) Field of Classification Search
None
See application file for complete search history.

(56) References Cited

U.S. PATENT DOCUMENTS

| | | | |
|---|---|---|---|
| 2025/0111192 A1* | 4/2025 | Bayless | G06N 3/006 |
| 2025/0272512 A1* | 8/2025 | Bellay | G06F 40/40 |
| 2025/0291827 A1* | 9/2025 | Chong | G06F 16/3329 |

OTHER PUBLICATIONS

Microsoft "Azure AI Search" Microsoft, https://azure.microsoft.com/en-us/products/ai-services/ai-search/?ef_id =_k_EAlalQobChMIntu6_9bxhAMVnWpHAROMDQWIEAAYASAAEgIfKfD_BwE_k_&OCID=AIDcmm5edswduu_SEM_k_EAlalQobChMIntu6_9bxhAMVnWpHAROMDQWIEAAYASAAEglfKfD_BwE_k_&gad_source=1&gclid=EAlalQobChMIntu6_9bxhAMVnWpHAROMDQWIEAAYASAAEglfKfD_BWE, Last Accessed Mar. 13, 2024, 10 pages.

(Continued)

*Primary Examiner* — Eddy Cheung
(74) *Attorney, Agent, or Firm* — Amin, Turocy & Watson, LLP

(57) ABSTRACT

Systems or techniques are provided for facilitating retrieval augmented generative question and answer boosting. In various embodiments, a system can access a plain text question regarding a scientific instrument. In various aspects, the system can generate, via a large language model that references a document-graph repository, a structured or unstructured answer for the plain text question. In various instances, the document-graph repository can comprise a plurality of document-graphs that respectively correspond to a plurality of technical documents. In various cases, for a first document-graph that corresponds to a first technical document, leaf nodes of the first document-graph can represent respective text blocks written in the first technical document, and non-leaf nodes of the first document-graph (Continued)

can respectively represent a document title, one or more section headings, and one or more scientific instrument identifiers written in the first technical document and beneath which the respective text blocks are nested.

20 Claims, 25 Drawing Sheets

(56) References Cited

OTHER PUBLICATIONS

Langchain "Laingchain" LangChain, https://www.langchain.com/, Last Accessed Mar. 13, 2024, 19 pages.

Han, et al. "RobustQA: Benchmarking the Robustness of Domain Adaptation for Open-Domain Question Answering" Findings of the Association for Computational Linguistics: ACL 2023, pp. 4294-4311, 18 pages.

Varshney, et al. "Post-Abstention: Towards Reliably Re-Attempting the Abstained Instances in QA" arXiv:2305.01812v1 [cs.CL] May 2, 2023, 14 pages.

Sui, et al. "Table Meets LLM: Can Large Language Models Understand Structured Table Data? A Benchmark and Empirical Study" WSDM '24, Mar. 4-8, 2024, Mérida, Yucatán, Mexico, 10 pages.

Min, et al. "AMBIGQA: Answering Ambiguous Open-domain Questions" arXiv:2004.10645v2 [cs.CL] Oct. 5, 2020, 15 pages.

Wei, et al. "Chain-of-Thought Prompting Elicits Reasoning in Large Language Models" arXiv:2201.11903v6 [cs.CL] Jan. 10, 2023, 43 pages.

Nakamo, et al. "WebGPT: Browser-assisted question-answering with human feedback" arXiv:2112.09332v3 [cs.CL] Jun. 1, 2022, 32 pages.

Vaswani, et al. "Attention is All You Need" arXiv:1706.03762v7 [cs. CL] Aug. 2, 2023, 15 pages.

* cited by examiner

SCIENTIFIC INSTRUMENT MODULE
102

FIRST (QUESTION ACCESS)
LOGIC
104

SECOND (DOCUMENT-
GRAPH ANSWERING) LOGIC
106

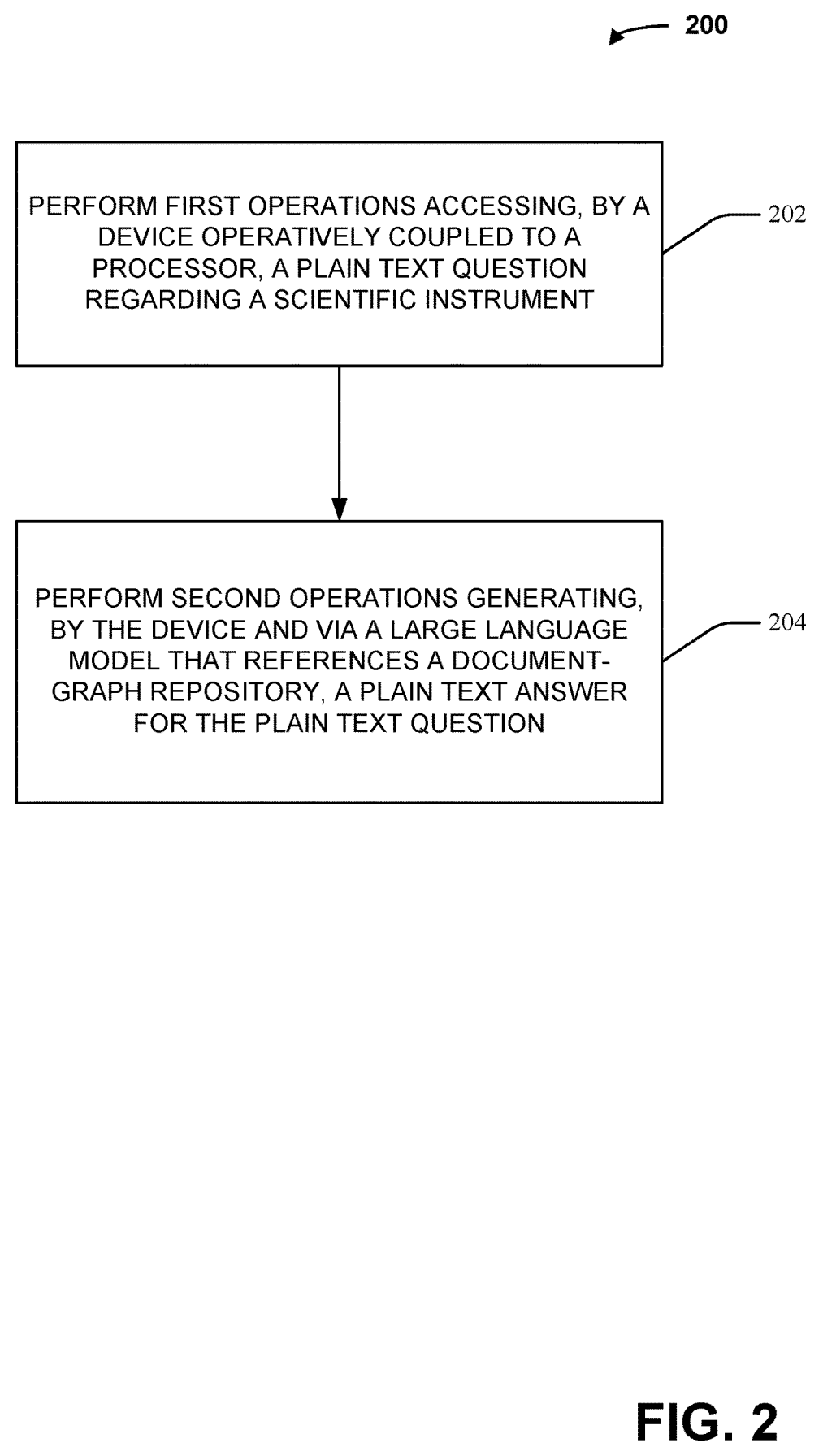

PERFORM FIRST OPERATIONS ACCESSING, BY A DEVICE OPERATIVELY COUPLED TO A PROCESSOR, A PLAIN TEXT QUESTION REGARDING A SCIENTIFIC INSTRUMENT — 202

PERFORM SECOND OPERATIONS GENERATING, BY THE DEVICE AND VIA A LARGE LANGUAGE MODEL THAT REFERENCES A DOCUMENT-GRAPH REPOSITORY, A PLAIN TEXT ANSWER FOR THE PLAIN TEXT QUESTION — 204

FIG. 2

600

602 — <u>Troubleshooting Manual</u>

604 — <u>Environment</u>

606 —
Triplus RSH (HS Mode)

Triplus RSH Smart (HS Mode)

CDS is Chromeleon 7.2.10 Mue

Triplus Driver version is 3.1.21

608 — <u>Issue</u>

610 —
Liquid injections are OK, but when an HS injection is performed, the error "PMW OUT Voltage is not set to 34V" message appears and stops the sequence. It happens during the syringe flush step.

Instrument method states: the syringe purge is Off. Despite this, the autosampler tries to flush it.

When the syringe is flushed manually in the virtual terminal, the same issue appears.

612 — <u>Resolution</u>

614 —
The PMW Out Voltage must be set to 34V in the I/O options of the instrument. Instrument must be set in Extended User level to access the setting.

FIG. 6

DOCUMENT-GRAPH 1204

POTENTIALLY-RELEVANT CONTEXT-TAGGED TEXT BLOCK 1202

ITERATIVE GRAPH-WALKING AND EMBEDDING-CHANGE COMPARISON

COMPOSED CONTEXT-TAGGED TEXT BLOCK 1206

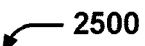
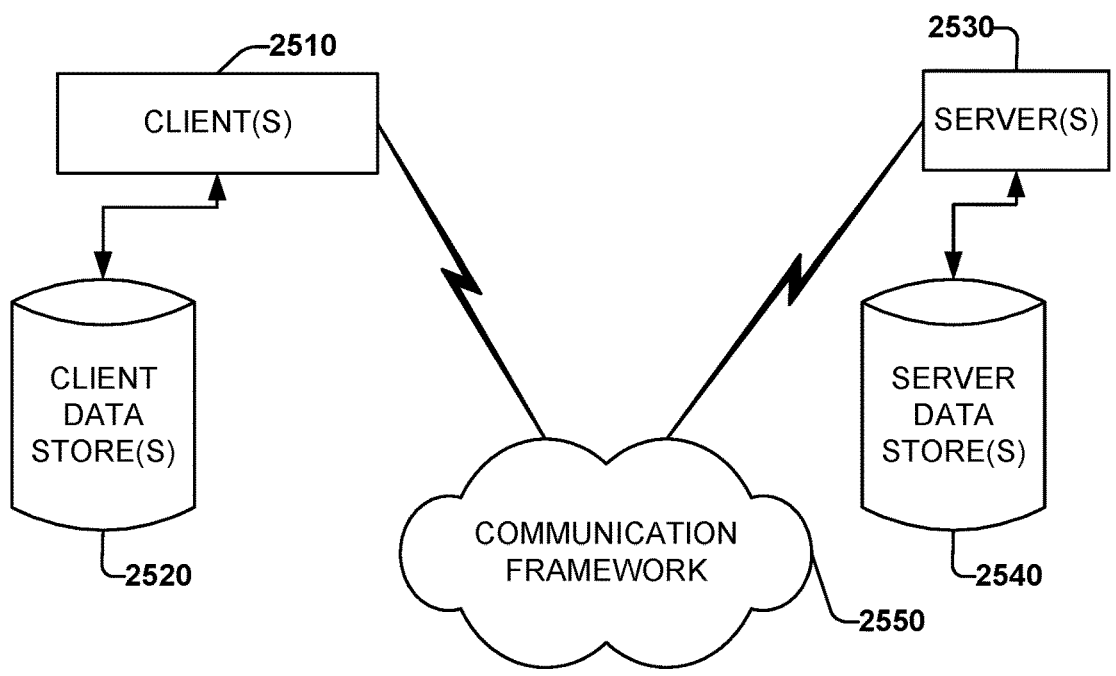
FIG. 25

RETRIEVAL AUGMENTED GENERATIVE QUESTION AND ANSWER BOOSTING

BACKGROUND

Generative artificial intelligence can facilitate automated question answering for operation, maintenance, or troubleshooting inquiries associated with scientific instruments. Existing techniques for facilitating generative artificial intelligence can suffer from insufficient answer accuracy.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate retrieval augmented generative question and answer boosting are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a plain text question regarding a scientific instrument. In various aspects, the computer-executable components can comprise an answer component that can generate, via a large language model that references a document-graph repository, a plain text answer for the plain text question. In various instances, the document-graph repository can comprise a plurality of document-graphs that respectively correspond to a plurality of technical documents, wherein, for a first document-graph of the plurality of document-graphs that corresponds to a first technical document of the plurality of technical documents, leaf nodes of the first document-graph can represent respective text blocks written in the first technical document, and wherein non-leaf nodes of the first document-graph can respectively represent a document title, one or more section headings, and one or more scientific instrument identifiers written in the first technical document and beneath which the respective text blocks are nested.

According to one or more embodiments, a computer-implemented method is provided. In various embodiments, the computer-implemented method can comprise accessing, by a device operatively coupled to a processor, a plain text question regarding a scientific instrument. In various aspects, the computer-implemented method can comprise generating, by the device and via a large language model that references a document-graph repository, a plain text answer for the plain text question. In various instances, the document-graph repository can comprise a plurality of document-graphs that respectively correspond to a plurality of technical documents, wherein, for a first document-graph of the plurality of document-graphs that corresponds to a first technical document of the plurality of technical documents, leaf nodes of the first document-graph can represent respective text blocks written in the first technical document, and wherein non-leaf nodes of the first document-graph can respectively represent a document title, one or more section headings, and one or more scientific instrument identifiers written in the first technical document and beneath which the respective text blocks are nested.

According to one or more embodiments, a computer program product for facilitating retrieval augmented generative question and answer boosting is provided. In various embodiments, the computer program product can comprise a non-transitory computer-readable memory having program instructions embodied therewith. In various aspects, the program instructions can be executable by a processor to cause the processor to access a natural language question asking about maintenance or operation of a scientific instrument. In various instances, the program instructions can be further executable to cause the processor to identify, from a document-graph repository, one or more context-tagged text blocks that are relevant to the natural language question. In various cases, the program instructions can be further executable to cause the processor to generate, via execution of a large language model on a unified prompt that is based on the natural language question and on the one or more context-tagged text blocks, a natural language answer.

DESCRIPTION OF THE DRAWINGS

Various embodiments will be readily understood by the following detailed description in conjunction with the accompanying figures. To facilitate this description, like reference numerals designate like structural elements. Embodiments are illustrated by way of example, not by way of limitation, in the figures. The figures are not necessarily drawn to scale.

FIG. 1 illustrates an example, non-limiting block diagram of a scientific instrument module in accordance with various embodiments described herein.

FIG. 2 illustrates an example, non-limiting flow diagram of a computer-implemented method in accordance with various embodiments described herein.

FIGS. 5-10 illustrate example, non-limiting block diagrams regarding document-graphs in accordance with one or more embodiments described herein.

FIG. 25 illustrates an example networking environment operable to execute various implementations described herein.

DETAILED DESCRIPTION

Figure 3:
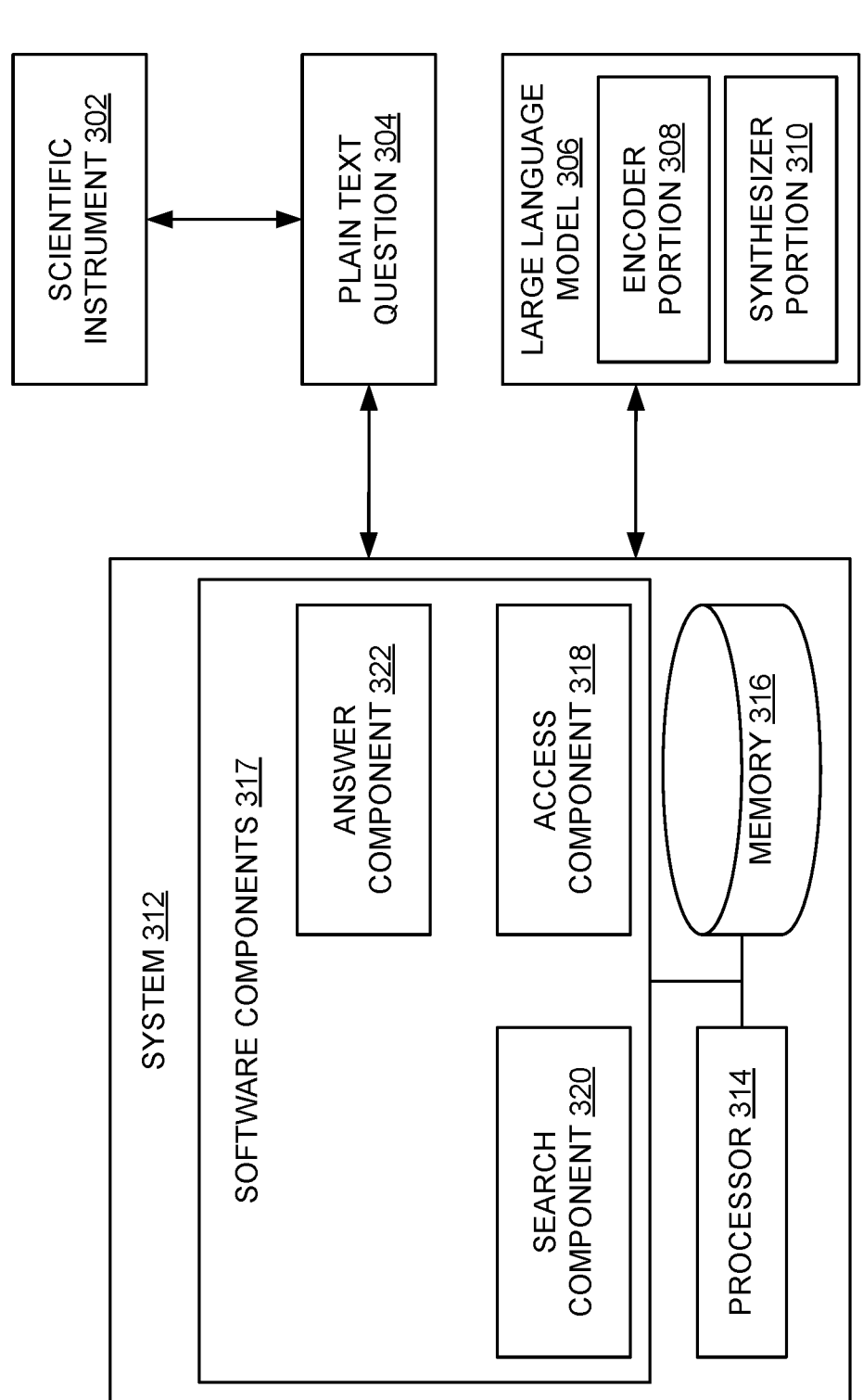
FIG. 3 illustrates a block diagram of an example, non-limiting system that facilitates retrieval augmented generative question and answer boosting in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Various operations can be described as multiple discrete actions or operations in turn, in a manner that is most helpful in understanding the subject matter disclosed herein. However, the order of description should not be construed as to imply that these operations are necessarily order dependent. In particular, these operations can be performed in an order different from the order of presentation. Operations described can be performed in a different order from the described embodiments. Various additional operations can be performed, or described operations can be omitted in additional embodiments.

Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices. As used herein, the phrase "based on" should be understood to mean "based at least in part on," unless otherwise specified.

A scientific instrument (e.g., mass spectrometer, charged-particle microscope) can be any suitable computerized device that can capture or generate electronic measurements in a scientific, laboratory, research, or clinical operational context (e.g., that can capture or generate spectroscopic images or composition spectra). To facilitate the capture or generation of such electronic measurements, scientific instruments can leverage complex arrangements of actuatable parts (e.g., ion sources, ion lenses, heaters, coolers, fluid valves, fluid pumps, circuit switches, specimen stages, apertures), sensors (e.g., ion detectors, voltmeters, thermistors, potentiometers, pressure gauges), or consumables (e.g., carrier fluids, calibrants, filters).

A user of a scientific instrument can have inquiries regarding how the scientific instrument should be operated, maintained, serviced, or troubleshot. In various aspects, such inquiries can be automatically answered by leveraging generative artificial intelligence. In particular, such inquiries can be automatically answered by leveraging retrieval augmented generative artificial intelligence (RAG-AI). RAG-AI can involve a large language model (LLM), such as ChatGPT, that can reference, at inference time, a database of technical documents (e.g., service manuals) that pertain to the scientific instrument. More specifically, when given a natural language question about the scientific instrument, that natural language question can be concatenated with one or more relevant textual references from the technical document database, and the LLM can be executed on that concatenation, thereby yielding a natural language answer to the natural language question. In this way, the LLM can be considered as synthesizing a response to the natural language question, where the substance or semantic content of that response is based on whatever substance or semantic content is conveyed in the one or more relevant textual references.

Existing techniques for facilitating RAG-AI can involve performing relevance searches through the technical document database at a sub-document level. In particular, a technical document pertaining to a scientific instrument can be quite lengthy (e.g., a service manual for a mass spectrometer can be tens or hundreds of pages long). Accordingly, to comply with token limits of the LLM, existing techniques can involve breaking up such lengthy technical documents into smaller, discrete blocks of text (e.g., into individual pages, sections, paragraphs, or passages). In other words, a "textual reference" in such existing techniques can be a discrete block of text from a technical document rather than an entirety of the technical document. So, when given a natural language question about the scientific instrument, existing techniques can perform a search through those smaller, discrete blocks of text to identify blocks that are relevant to the given natural language question, and the LLM can be subsequently executed on a concatenation of the given natural language question with those identified blocks.

The inventors of various embodiments described herein recognized that such existing techniques can exhibit insufficient answer accuracy. Specifically, the present inventors realized that such existing techniques are unable to confidently or reliably handle scientific instrument identifiers. An identifier of a scientific instrument is often an alphanumeric string (e.g., ICS-2000) that uniquely corresponds to the scientific instrument or that uniquely corresponds to a group or class of instruments to which the scientific instrument belongs. For example, the identifier can be a product name, a model number, a version number, or a serial number of the scientific instrument.

The present inventors realized that such identifiers can introduce problems for RAG-AI that rely on embedding searches, since such identifiers can carry little semantic meaning (e.g., such identifiers often appear to be random gibberish to LLMs that have not previously encountered those identifiers during training).

The present inventors also realized that such identifiers can introduce problems for RAG-AI that rely on keyword searches, since such keyword searches can be thrown off by minor spelling differences in identifiers (e.g., "ICS2000" vs. "ICS-2000" vs. "ICS_2000" vs. "I.C.S.2000" vs. "2000-ISC").

Furthermore, the present inventors realized that such identifiers are often recited in one particular or designated location or section of a technical document rather than being explicitly recited in every location or section of the technical document. For example, a 200-page service manual can specify on page 1 which particular scientific instruments (e.g., which product names, model numbers, version numbers, or serial numbers) to which the service manual applies, and the remaining pages of the service manual can refer to those particular scientific instruments generically, vaguely, or collectively rather than specifically by name (e.g., pages 2-200 can discuss or explain maintenance procedures or troubleshooting processes that can be performed on "the applicable devices" or on "the specified instruments", as opposed to repetitively re-reciting the specific identifiers that are already enumerated on page 1).

The present inventors recognized that this can be problematic, because numerous text blocks that are extracted from such a technical document can thus fail to recite the identifiers of the particular scientific instruments to which those text blocks are applicable. In other words, the present inventors recognized that existing techniques are likely to wrongly or mistakenly utilize the substance or semantic content of such no-identifier text blocks to answer questions about scientific instruments to which those no-identifier text blocks do not pertain. For example, suppose that a natural language question asks how to prime the pump of an ICS2000, suppose that a no-identifier text block describes how to prime the pump of an "applicable instrument", and suppose that the document from which that no-identifier text block was extracted is applicable to an ICS5000 rather than to the ICS2000. In such case, whatever pump priming information that is conveyed by that no-identifier text block can be considered as not being applicable to or accurate for the ICS2000. Nevertheless, existing techniques are likely to mistakenly rely upon that no-identifier text block to answer the natural language question, since both that no-identifier text block and the natural language question pertain to pump priming.

For at least these reasons, existing techniques for facilitating RAG-AI can exhibit insufficient or unsatisfactory answer accuracy.

Accordingly, systems or techniques that can ameliorate one or more of these technical problems can be desirable.

Various embodiments described herein can address one or more of these technical problems. One or more embodiments described herein can include systems, computer-implemented methods, apparatus, or computer program products that can facilitate retrieval augmented generative question and answer boosting. In other words, various embodiments described herein can increase the answer accuracy of RAG-AI. The present inventors devised various techniques for achieving such an increase in answer accuracy. As described herein, such an increase in answer accuracy can be achieved by implementation of any of the following: a repository or database of document-graphs, each document-graph comprising respective context-tagged text blocks; composition of adjacent context-tagged text blocks via iterative graph-walking and embedding-change comparison; text block re-ranking based on synthesized responses to chain-of-thought prompts; and prompt augmentation for identifier emphasis.

First, consider implementation of document-graphs. In various aspects, as mentioned above, a given technical document can be broken up or decomposed into discrete text blocks, and those discrete text blocks can be searched at inference time for relevance to any given natural language question. As described herein, various embodiments can involve tagging each text block with whatever higher-level contextual information pertaining to that text block that is present or otherwise recited in the given technical document. In various instances, this can be accomplished by generating a graph whose nodes and edges collectively represent the contents and hierarchical structure of the given technical document. In particular, leaf nodes of such graph can represent individual text blocks written in the given technical document, and non-leaf nodes of such graph can represent titles, section or subsection headings, page numbers, instrument identifiers, dates, or any other contextual information that are written in the given technical document and that encompass, encapsulate, apply to, or otherwise qualify respective text blocks of the given technical document. In various cases, each leaf node of such graph can be considered as being linked or concatenated with whatever non-leaf nodes from which it depends. In other words, any text block within such graph can be considered as being tagged with whichever titles, section or subsection headings, page numbers, instrument identifiers, dates, or other contextual information below which that text block is nested in such graph. In still other words, such graph can be considered as comprising context-tagged text blocks rather than text-blocks by themselves. In various aspects, tagging each text block with its corresponding contextual information can help to eliminate the occurrence of no-identifier text blocks. Accordingly, context-tagging as described herein can help to avoid situations in which RAG-AI mistakenly or erroneously synthesizes answers for certain scientific instruments using text blocks that are not applicable or pertinent to those certain scientific instruments. In this way, context-tagging via document-graphs as described herein can help to increase or boost answer accuracy of RAG-AI.

Next, consider implementation of adjacent context-tagged text block composition. In various aspects, various embodiments described herein can involve searching at inference time for context-tagged text blocks that are relevant to a given natural language question. In various instances, such searching can be accomplished via embedding techniques or via keyword techniques. In various cases, when a relevant (or potentially-relevant) context-tagged text block is found, various embodiments described herein can involve generating a larger, aggregated, or composed context-tagged text block, based on that relevant context-tagged text block and based on whatever document-graph that relevant context-tagged text block comes from. More specifically, another context-tagged text block that is adjacent or nearest to that relevant context-tagged text block can be found, by starting at the relevant context-tagged text block and walking up, down, or over one or more levels in whichever document-graph that contains that relevant context-tagged text block. In various aspects, the relevant context-tagged text block and that adjacent or nearest context-tagged text block can be joined or concatenated together, thereby yielding a composed context-tagged text block. If an embedding of that composed context-tagged text block differs by less than any suitable threshold margin from an embedding of the relevant context-tagged text block (and if that composed context-tagged text block does not violate token limits of the LLM), then the composed context-tagged text block can be used to answer the given natural language question. In contrast, if the embedding of that composed context-tagged text block differs by more than the threshold margin from the embedding of the relevant context-tagged text block (or if that composed context-tagged text block violates token limits of the LLM), then the relevant context-tagged text block can be used to answer the given natural language question, rather than the composed context-tagged text block. In various instances, adjacent text block composition as described herein can be considered as a fallback mechanism for catching text blocks that are relevant or potentially relevant to the given natural language question but that are not found during an initial embedding or keyword search (e.g., due to identifiers carrying little semantic information or having minor spelling differences). In this way, adjacent text block composition as described herein can help to increase or boost answer accuracy of RAG-AI.

Now, consider implementation of chain-of-thought re-ranking. In various aspects, as mentioned above, various embodiments described herein can involve searching at inference time for context-tagged text blocks that are relevant or potentially relevant to a given natural language question. In various instances, such searching can be accomplished via embedding techniques or via keyword techniques. Note that the context-tagged text blocks (or adjacent compositions thereof) that are discovered using embedding techniques can be different or otherwise non-identical from those that are discovered using keyword techniques. To reconcile or compare these differently-discovered context-tagged text blocks, a re-ranker can be implemented to assign to each discovered or found context-tagged text block a relevance score showing how relevant or irrelevant a respective context-tagged text block is to the given natural language question. In some cases, the re-ranker can be executed on each of the discovered or found context-tagged text blocks themselves. However, in other cases, the re-ranker can instead leverage chain-of-thought prompting. More specifically, the LLM can be forced to synthesize responses to a set of chain-of-thought prompts for each of the discovered or found context-tagged text blocks, with each chain-of-thought prompt being a question or statement that is directed to determining the substantive sufficiency of any discovered or found context-tagged text block with respect to the given natural language question. So, the LLM can be fed the set of chain-of-thought prompts for each of the discovered or found context-tagged text blocks, thereby yielding a respective set of synthesized chain-of-thought responses for each of the discovered or found context-tagged text blocks. In various aspects, rather than being executed on the discovered or found context-tagged text blocks themselves, the re-ranker can instead be executed on each set of such synthesized chain-of-thought responses. Such execution can yield a respective relevance score for each set of synthesized chain-of-thought responses, and thus for each of the discovered or found context-tagged text blocks. In various instances, chain-of-thought prompting as described herein can be considered as providing the re-ranker with deeper or richer information (e.g., the synthesized responses to the chain-of-thought prompts) regarding context-tagged text blocks that are discovered or found using different searching techniques. In other words, such deeper or richer information can cause the re-ranker to be more informed when computing relevance scores than it otherwise would be, thereby causing the computed relevance scores to be more accurate than they otherwise would be. In this way, chainof-thought re-ranking as described herein can help to increase or boost answer accuracy of RAG-AI.

Finally, consider implementation of identifier emphasis augmentations. In various aspects, various embodiments described herein can identify (e.g., via chain-of-thought re-ranking) context-tagged text blocks that are relevant to a given natural language question. In various instances, a unified prompt can be formed by concatenating the given natural language question with those relevant context-tagged text blocks. Accordingly, the LLM can be executed on the unified prompt, thereby yielding a natural language answer to the given natural language question. In some cases, however, the unified prompt can be augmented for identifier emphasis. Indeed, various embodiments described herein can determine whether or not the given natural language question recites a scientific instrument identifier. If so, the unified prompt can be augmented with one or more additional sentences that instruct or command the LLM to focus on or otherwise pay extra attention to that scientific instrument identifier. In various instances, such prompt augmentation can be considered as an additional relevancy filter or enforcement mechanism that encourages, guides, or otherwise forces the LLM to rely more heavily upon whichever of the relevant context-tagged text blocks recite that same scientific instrument identifier. In this way, identifier emphasis augmentation as described herein can help to increase or boost answer accuracy of RAG-AI.

Various embodiments described herein can be considered as a computerized tool (e.g., any suitable combination of computer-executable hardware or computer-executable software) that can facilitate retrieval augmented generative question and answer boosting. In various aspects, such computerized tool can comprise an access component, a search component, or an answer component.

In various embodiments, the scientific instrument can be any suitable computerized device that can electronically capture, measure, or otherwise record any suitable electronic information that carries clinical or laboratory significance (e.g., can be a mass spectrometer, can be a scanning or transmission electron microscope, can be an electron energy-loss microscope, can be a dual beam microscope).

In various embodiments, there can be a plain text question that is associated with the scientific instrument. In various aspects, the plain text question can be one or more unstructured or natural language sentences or sentence fragments that semantically request any suitable technical information regarding the scientific instrument (e.g., regarding technical features, constituent parts, servicing, or malfunction symptoms of the scientific instrument). In various instances, the plain text question can be provided by a user of the scientific instrument via any suitable human-computer interface device (e.g., keyboard, keypad, touchscreen, voice transcription system).

In various embodiments, there can be a LLM. In various aspects, the LLM can exhibit any suitable deep learning internal architecture. For example, the LLM can include any suitable numbers of any suitable types of layers (e.g., input layer, one or more hidden layers, output layer, any of which can be convolutional layers, dense layers, long short-term memory (LSTM) layers, transformer layers, non-linearity layers, pooling layers, batch normalization layers, or padding layers). As another example, the LLM can include any suitable numbers of neurons in various layers (e.g., different layers can have the same or different numbers of neurons as each other). As yet another example, the LLM can include any suitable activation functions (e.g., softmax, sigmoid, hyperbolic tangent, rectified linear unit) in various neurons (e.g., different neurons can have the same or different activation functions as each other). As still another example, the LLM can include any suitable interneuron connections or interlayer connections (e.g., forward connections, skip connections, recurrent connections).

Regardless of its specific internal architecture, the LLM can be configured as a generative text-to-text model. That is, the LLM can be configured to receive as input any suitable textual data (which, in various cases, may or may not be accompanied by any suitable numerical data or any suitable graphical data), and the LLM can be configured to produce as output synthesized textual content (e.g., one or more synthesized sentences or sentence fragments) that is semantically or substantively based on such inputted textual data (and based on accompanying numerical or graphical data, as appropriate).

In order to accomplish this, the LLM can be considered as comprising an encoder portion and a synthesizer portion. In various aspects, the encoder portion can be any suitable upstream layers of the LLM that are configured to receive the inputted textual data (and any accompanying numerical or graphical data, as appropriate) and to produce embeddings based on that inputted textual data. In various instances, the synthesizer portion can be any suitable downstream layers of the LLM that are configured to receive those embeddings and to produce the synthesized textual content based on those embeddings.

In various aspects, an embedding produced by the encoder portion of the LLM in response to a piece of inputted textual, numerical, or graphical data can be considered as any suitable mathematical quantity (e.g., scalar, vector, matrix, tensor, tokenization, or any suitable combination thereof) that numerically represents at least some substantive or semantic aspect of that inputted textual, numerical, or graphical data in a low-dimensional fashion. In other words, the embedding can be smaller in terms of size or dimensionality (e.g., in some cases, one or more orders of magnitude smaller) than such inputted textual, numerical, or graphical data; but despite such smaller size, the embedding can nevertheless be considered as substantively or semantically representing such inputted textual, numerical, or graphical data. In still other words, the embedding can be considered as a latent vector representation of such inputted textual, numerical, or graphical data.

In any case, it can be desired to leverage the LLM so as to automatically answer the plain text question. In various instances, the computerized tool described herein can accomplish this.

In various embodiments, the access component of the computerized tool can electronically access the plain text question or the LLM. For instance, the access component can receive, retrieve, or otherwise obtain the plain text question or the LLM from any suitable centralized or decentralized data structures (e.g., graph data structures, relational data structures, hybrid data structures). In any case, the access component can be considered as a conduit through which other components of the computerized tool can electronically interact with (e.g., read, write, edit, copy, manipulate, execute) the plain text question or the LLM.

In various embodiments, the search component of the computerized tool can electronically store, maintain, control, or otherwise access a document-graph repository. In various aspects, the search component can electronically leverage the document-graph repository so as to identify a plurality of context-tagged text blocks that are substantively relevant to the plain text question. In various instances, the search component can electronically generate a unified prompt, based on the plain text question and on the plurality of relevant context-tagged text blocks.

More specifically, there can be a plurality of technical documents. In various aspects, each of the plurality of technical documents can be any suitable electronic file (e.g., word-doc file, portable document format (PDF) file, webpage file) that can textually (or, in some cases, graphically or numerically) describe, explain, or otherwise indicate any suitable technical information regarding the design, fabrication, operation, maintenance, or troubleshooting of any suitable scientific instruments (e.g., each technical document can be a service manual or handbook of some respective scientific instrument, a bill of materials of some respective scientific instrument, a blueprint or schematic of some respective scientific instrument, or a failure mode analysis report of some respective scientific instrument). In various instances, any of the plurality of technical documents can be or have been written (e.g., via any suitable word processing software, computer-aided design software, or quantitative analysis software) by technicians or engineers who were tasked with designing, developing, prototyping, revising, or manufacturing any suitable scientific instruments. Note that, in some cases, any technical document can exhibit or otherwise have any suitable length or size (e.g., can be one or a few pages in length; can be tens of pages in length; can be hundreds of pages in length).

In various aspects, the document-graph repository can contain a plurality of document-graphs that respectively correspond to the plurality of technical documents. In various instances, each of the plurality of document-graphs can include a respective plurality of context-tagged text blocks that are sourced or otherwise derived from a respective one of the plurality of technical documents.

In various cases, a text block of any given technical document can be any suitable discrete, cohesive, textually-contiguous portion of that given technical document. For instance, the text block can be one or more consecutive sentences or paragraphs that are written in the given technical document and that collectively address a unitary or granular semantic concept or idea. In various aspects, the given technical document can be considered as having or including contextual information that, although not explicitly written in the text block itself, nevertheless introduces, applies to, or otherwise qualifies the text block. For example, such contextual information can include a title or heading under which that text block is written, a page number on which that text block is written, a date for which that text block is effective or valid, or a scientific instrument identifier to which that text block is pertinent. In various instances, whichever document-graph that corresponds to the given technical document can be considered as a directed, acyclic graph that has leaf nodes and non-leaf nodes. In various cases, each unique text block of the technical document can be represented by a respective leaf node of that document-graph, and each piece of contextual information of the technical document can be represented by a respective non-leaf node of that document-graph, such that the hierarchical structure of the document-graph can be considered as indicating which pieces of contextual information in the given technical document introduce, apply to, or qualify which text blocks in the given technical document. In various aspects, each leaf node can be considered as being tagged, linked, or concatenated with the non-leaf nodes beneath which that leaf node is directly or indirectly nested in the document-graph (e.g., as being tagged, linked, or concatenated with the non-leaf nodes that are upstream of that leaf node). Accordingly, because of the document-graph, each text block of the given technical document can be considered as being tagged with whichever contextual information (e.g., with whatever scientific instrument identifiers) that applies to it, hence the term "context-tagged text block". Thus, the implementation of document-graphs as described herein can be considered as helping to avoid or eliminate occurrences of no-identifier (or, more broadly, no-context) text blocks.

In various aspects, each context-tagged text block (e.g., each concatenation of downstream text block and upstream contextual information) in the document-graph repository can have its own respective embedding (e.g., its own respective latent vector). In various instances, the search component can generate such embedding by leveraging the encoder portion of the LLM. In other words, for any given context-tagged text block, the search component can execute the encoder portion of the LLM on that given context-tagged text, and such execution can yield an embedding for that given context-tagged text block. In various cases, the search component can repeat this for each context-tagged text block in the document-graph repository.

In some embodiments, the search component can generate the document-graphs of the document-graph repository, by leveraging a text-to-graph neural network. In various aspects, the text-to-graph neural network can exhibit any suitable deep learning internal architecture. For example, the text-to-graph neural network can include any suitable numbers of any suitable types of layers (e.g., input layer, one or more hidden layers, output layer, any of which can be convolutional layers, dense layers, LSTM layers, transformer layers, non-linearity layers, pooling layers, batch normalization layers, or padding layers). As another example, the text-to-graph neural network can include any suitable numbers of neurons in various layers (e.g., different layers can have the same or different numbers of neurons as each other). As yet another example, the text-to-graph neural network can include any suitable activation functions (e.g., softmax, sigmoid, hyperbolic tangent, rectified linear unit) in various neurons (e.g., different neurons can have the same or different activation functions as each other). As still another example, the text-to-graph neural network can include any suitable interneuron connections or interlayer connections (e.g., forward connections, skip connections, recurrent connections).

Regardless of its specific internal architecture, the text-to-graph neural network can be configured to produce a document-graph for any given inputted document. Accordingly, for any given one of the plurality of technical documents, the search component can execute the text-to-graph neural network on that technical document, and such execution can yield the document-graph for that technical document. In various cases, the search component can repeat this for each of the plurality of technical documents, thereby yielding the document-graph repository.

In other embodiments, however, the search component can instead generate the document-graphs of the document-graph repository, by leveraging a named entity recognition neural network, the LLM, and a plurality of document-exploration prompts.

In various aspects, the named entity recognition neural network can exhibit any suitable deep learning internal architecture. For example, the named entity recognition neural network can include any suitable numbers of any suitable types of layers (e.g., input layer, one or more hidden layers, output layer, any of which can be convolutional layers, dense layers, LSTM layers, transformer layers, non-linearity layers, pooling layers, batch normalization layers, or padding layers). As another example, the named entity recognition neural network can include any suitable numbers of neurons in various layers (e.g., different layers can have the same or different numbers of neurons as each other). As yet another example, the named entity recognition neural network can include any suitable activation functions (e.g., softmax, sigmoid, hyperbolic tangent, rectified linear unit) in various neurons (e.g., different neurons can have the same or different activation functions as each other). As still another example, the named entity recognition neural network can include any suitable interneuron connections or interlayer connections (e.g., forward connections, skip connections, recurrent connections).

Regardless of its specific internal architecture, the named entity recognition neural network can be configured to extract specific types of named entities from any given inputted document. In particular, the named entity recognition neural network can be configured to extract scientific instrument identifiers from any given inputted document. Accordingly, for each of the plurality of technical documents, the search component can execute the named entity recognition neural network on the technical document, and such execution can yield one or more specific scientific instrument identifiers that are written somewhere within that technical document.

Furthermore, a document-exploration prompt can be one or more natural language sentences that request or command identification of any suitable detail regarding the semantic structure, organization, or content of any given document. As some examples, a document-exploration prompt can request or command identification of the title of any given document, another document-exploration prompt can request or command identification of the total number of sections or chapters within any given document, and yet another document-exploration prompt can request or command identification of the headings of each section or chapter of any given document. In various aspects, the search component can execute the LLM on the plurality of document-exploration prompts with respect to each of the plurality of technical documents. In other words, the search component can cause the LLM to synthesize a response to each document-exploration prompt for each technical document (e.g., can cause the LLM to identify the title of each technical document; can cause the LLM to identify the total number of sections or chapters in each technical document; can cause the LLM to identify the headings of each section or chapter of each technical document). In still other words, by using the document-exploration prompts, the search component can cause the LLM to explore or itemize the semantic structure, organization, or content of each technical document.

So, by leveraging the named entity recognition neural network, the search component can identify the explicitly-recited scientific instrument identifiers for each given technical document. Moreover, by leveraging the LLM and the plurality of document-exploration prompts, the search component can generate one or more synthesized responses that identify or itemize the semantic structure, organization, or content of each given technical document. In various aspects, the search component can combine or otherwise utilize such scientific instrument identifiers and such synthesized responses, so as to build the document-graph for that given technical document (e.g., each scientific instrument identifier or synthesized response can be represented by a respective node in the document-graph). In various cases, the search component can repeat this for each of the plurality of technical documents, thereby yielding the document-graph repository.

In various embodiments, the search component can electronically search through the document-graph repository for context-tagged text blocks that are potentially relevant to the plain text question. In some aspects, the search component can accomplish this via an embedding search (e.g., searching for context-tagged text blocks whose embeddings are within a threshold margin of similarity to an embedding of the plain text question). In other aspects, the search component can accomplish this via a keyword search (e.g., searching for context-tagged text blocks that explicitly recite one or more keywords that are also explicitly recited in the plain text question). In some instances, the search component can utilize an embedding search to identify some potentially-relevant context-tagged text blocks and a keyword search to identify other potentially-relevant context-tagged text blocks. In any case, the search component can identify a plurality of potentially-relevant context-tagged text blocks by searching through the document-graph repository based on the plain text question.

In some instances, the search component can generate a composed or aggregated version of any given potentially-relevant context-tagged text block. In various cases, the search component can accomplish this via iterative graph-walking and embedding-change comparison.

More specifically, consider a potentially-relevant context-tagged text block. In various aspects, that potentially-relevant context-tagged text block can be based on a specific text block that is located in a particular document-graph of the document-graph repository. In various instances, that particular document-graph can contain other text blocks, some of which can be considered as more nearby or more adjacent to the specific text block, and others of which can be considered as less nearby or less adjacent to the specific text block. A text block can be considered as being closer to the specific text block if it is separated from the specific text block within the particular document-graph by fewer hierarchical levels, fewer graph branches, or fewer intervening nodes. On the other hand, a text block can be considered as being farther from the specific text block if it is separated from the specific text block in the particular document-graph by more hierarchical levels, more graph branches, or more intervening nodes.

So, the search component can traverse or walk the particular document-graph starting from the specific text block, so as to identify another text block that is closest, nearest, or most adjacent to the specific text block. Note that the another text block might have different or otherwise non-identical upstream contextual information than the specific text block. In various aspects, the search component can generate a new context-tagged text block by concatenating the specific text block and the another text block, along with all of their collective upstream contextual information. Such new context-tagged text block can be considered as a composition or aggregation of the specific text block and the another text block. Thus, the new context-tagged text block can be referred to as a composed context-tagged text block.

Now, the search component can generate (e.g., via the encoder portion of the LLM) an embedding for the composed context-tagged text block, and the search component can compare that embedding to the embedding of the potentially-relevant context-tagged text block. If those two embeddings differ by more than any suitable threshold margin, or if the composed context-tagged text block is too large for any given token limit of the LLM, the search component can disregard the composed context-tagged text block. However, if those two embeddings differ by less than that threshold margin, and if the composed context-tagged text block is not too large for any given token limit of the LLM, the search component can instead disregard the potentially-relevant context-tagged text block and can treat or deem the composed context-tagged text block as being potentially-relevant to the plain text question.

In some cases, the search component can repeat this walking and embedding-comparison procedure until termination (e.g., termination due to an excessive margin of embedding change, or termination due to exceeding token limits of the LLM). In any case, it is possible that the embedding search or keyword search performed by the search component can fail to uncover some context-tagged text blocks that truly are potentially-relevant to the plain text question, and adjacent text block composition as described herein can be considered as a supplemental mechanism by which to help capture such missed text blocks.

In various aspects, the search component can leverage a re-ranker to assign a respective relevance score to each of the plurality of potentially-relevant context-tagged text blocks. In various cases, the re-ranker can exhibit any suitable deep learning internal architecture. For example, the re-ranker can include any suitable numbers of any suitable types of layers (e.g., input layer, one or more hidden layers, output layer, any of which can be convolutional layers, dense layers, LSTM layers, transformer layers, non-linearity layers, pooling layers, batch normalization layers, or padding layers). As another example, the re-ranker can include any suitable numbers of neurons in various layers (e.g., different layers can have the same or different numbers of neurons as each other). As yet another example, the re-ranker can include any suitable activation functions (e.g., softmax, sigmoid, hyperbolic tangent, rectified linear unit) in various neurons (e.g., different neurons can have the same or different activation functions as each other). As still another example, the re-ranker can include any suitable interneuron connections or interlayer connections (e.g., forward connections, skip connections, recurrent connections).

In some embodiments, the re-ranker can be configured to receive as input any two pieces of text and to produce as output a score indicating how semantically relevant or similar those two pieces of text are to each other. So, for any given potentially-relevant context-tagged text block, the search component can execute the re-ranker on both the plain text question and that given potentially-relevant context-tagged text block, and such execution can cause the re-ranker to yield a relevance score showing how relevant or irrelevant that given potentially-relevant context-tagged text block is to the plain text question. In various cases, the search component can repeat this for each of the plurality of potentially-relevant context-tagged text blocks, thereby yielding a plurality of relevance scores respectively corresponding to the plurality of potentially-relevant context-tagged text blocks.

In other embodiments, the re-ranker can instead be utilized in a chain-of-thought fashion. In particular, there can be a plurality of chain-of-thought prompts. In various aspects, a chain-of-thought prompt can be one or more natural language sentences that request or command identification of any suitable detail regarding the semantic sufficiency of any given potentially-relevant context-tagged text block to the plain text question. As some examples, a chain-of-thought prompt can ask for the plain text question to be answered based solely or only on any given potentially-relevant context-tagged text block, another chain-ofthought prompt can ask whether or not any given potentially-relevant context-tagged text block possesses sufficient information to fully answer the given plain text question, and yet another chain-of-thought prompt can ask what information is missing from any given potentially-relevant context-tagged text block that would be needed to fully answer the plain text question. In various aspects, the search component can execute the LLM on the plurality of chain-of-thought prompts with respect to each of the plurality of potentially-relevant context-tagged text blocks. In other words, the search component can cause the LLM to synthesize a response to each chain-of-thought prompt for each potentially-relevant context-tagged text block (e.g., can cause the LLM to try to answer the plain text question using each potentially-relevant context-tagged text block in isolation, to try to determine whether or not each potentially-relevant context-tagged text block is individually sufficient to answer the plain text question, and to try to determine what respective information needed to fully answer the plain text question is missing from each potentially-relevant context-tagged text block). In still other words, by using the chain-of-thought prompts, the search component can cause the LLM to explore or investigate the semantic or substantive sufficiency of each of the plurality of potentially-relevant context-tagged text blocks with respect to the plain text question.

In such cases, rather than being executed on the plurality of potentially-relevant context-tagged text blocks themselves, the re-ranker can instead be executed on whatever responses to the plurality of chain-of-thought prompts that the LLM synthesizes for the plurality of potentially-relevant context-tagged text blocks. That is, for any given potentially-relevant context-tagged text block, the search component can execute the re-ranker on both the plain text question and whatever responses were synthesized by the LLM in response to the plurality of chain-of-thought prompts for that given potentially-relevant context-tagged text block, and such execution can cause the re-ranker to yield a relevance score showing how relevant or irrelevant those synthesized responses, and thus that given potentially-relevant context-tagged text block, are to the plain text question. In various cases, the search component can repeat this for each of the plurality of potentially-relevant context-tagged text blocks, thereby yielding the plurality of relevance scores respectively corresponding to the plurality of potentially-relevant context-tagged text blocks. Note that chain-of-thought re-ranking as described herein can be considered as providing richer, deeper, or otherwise more detailed information to the re-ranker regarding the plurality of potentially-relevant context-tagged text blocks, and such richer, deeper, or otherwise more detailed information can be considered as causing the computed relevance scores to be more accurate than they otherwise would be.

In any case, the search component can compute a respective relevance score for each potentially-relevant context-tagged text block. In various aspects, the search component can identify a subset of the plurality of potentially-relevant context-tagged text blocks that are actually relevant to the plain text question, based on those relevance scores. For instance, two or more of the potentially-relevant context-tagged text blocks that have the highest or top relevance scores can be considered as being actually relevant to the plain text question. Accordingly, those two or more top-scoring potentially-relevant context-tagged text blocks can be referred to as a plurality of relevant context-tagged text blocks.

In various embodiments, the search component can generate a unified prompt, based on the plain text question and on the plurality of relevant context-tagged text blocks. In particular, the search component can concatenate the plain text question together with the plurality of relevant context-tagged text blocks, and such concatenation can be considered as the unified prompt.

In various aspects, if the plain text question contains one or more scientific instrument identifiers (e.g., which can be determined via execution of the named entity recognition neural network on the plain text question), then the search component can augment the unified prompt so as to emphasize those one or more scientific instrument identifiers. More specifically, the search component can, in various instances, add one or more unstructured or natural language sentences to the unified prompt, where such one or more unstructured or natural language sentences can request or instruct that extra attention or focus be paid to those one or more scientific instrument identifiers. For example, the one or more unstructured or natural language sentences can request or command that any response to the plain text question should more heavily rely on whichever of the plurality of relevant context-tagged text blocks explicitly recite those one or more scientific instrument identifiers.

In various embodiments, the answer component of the computerized tool can electronically generate a plain text answer, by executing the LLM on the unified prompt. In various aspects, the plain text answer can be one or more synthesized sentences or sentence fragments whose content can be derived from the plurality of relevant context-tagged text blocks, and whose content can substantively or semantically respond to whatever query, request, or command is conveyed by the plain text question. For example, the plain text question can ask how to perform some specific maintenance task on the scientific instrument, the plurality of relevant context-tagged text blocks can contain information that teaches or explains how to perform such specific maintenance task on the scientific instrument, and the plain text answer can succinctly, briefly, or otherwise directly state such information. Because the plain text answer can be generated based on the document-graphs, the text block composition, the chain-of-thought re-ranking, or the identifier emphasis augmentation described herein, an accuracy level of the plain text answer can be higher than it otherwise would have been (e.g., than it would have been if document-graphs, text block composition, chain-of-thought re-ranking, and identifier emphasis augmentation were not implemented).

In this way, the computerized tool described herein can leverage RAG-AI to automatically answer the plain text question with improved or boosted accuracy.

Various embodiments described herein can be employed to use hardware or software to solve problems that are highly technical in nature (e.g., to facilitate retrieval augmented generative question and answer boosting), that are not abstract and that cannot be performed as a set of mental acts by a human. Further, some of the processes performed can be performed by a specialized computer (e.g., artificial neural networks such as LLMs, text-to-graph models, named entity recognition models, or re-ranker models) for carrying out defined acts related to RAG-AI.

For example, such defined acts can include: accessing, by a device operatively coupled to a processor, a plain text question regarding a scientific instrument; and generating, by the device and via a large language model that references a document-graph repository, a plain text answer for the plain text question. In various aspects, the document-graph repository can comprise a plurality of document-graphs that respectively correspond to a plurality of technical documents. In various instances, for a first document-graph of the plurality of document-graphs that corresponds to a first technical document of the plurality of technical documents, leaf nodes of the first document-graph can represent respective text blocks written in the first technical document, and non-leaf nodes of the first document-graph can respectively represent a document title, one or more section headings, and one or more scientific instrument identifiers written in the first technical document and beneath which the respective text blocks are nested. In various cases, for a first leaf node that is nested beneath one or more first non-leaf nodes of the first document-graph, a concatenation of the first leaf node with the one or more first non-leaf nodes can form a context-tagged text block, and the document-graph repository can comprise an embedding that semantically represents the context-tagged text block.

In various aspects, such defined acts can include: constructing, by the device, the document-graph repository via actions comprising: document-wise execution of a trained text-to-graph model on the plurality of technical documents; or document-wise execution of the large language model on the plurality of technical documents and on one or more document-exploration prompts.

In various instances, such defined acts can include: identifying, by the device and via an embedding search or a keyword search, a context-tagged text block from the document-graph repository that is related to the plain text question; generating, by the device, a composed context-tagged text block by performing actions comprising iterative document-graph walking and embedding-change comparison with respect to the context-tagged text block; and generating, by the device, a unified prompt based on concatenating the plain text question with the composed context-tagged text block, wherein the large language model can receive the unified prompt as input and can produce the plain text answer as output.

In various cases, such defined acts can include: identifying, by the device, some of a plurality of context-tagged text blocks from the document-graph repository via an embedding search based on the plain text question and others of the plurality of context-tagged text blocks from the document-graph repository via a keyword search based on the plain text question; selecting, by the device and via execution of a re-ranker, one or more highest-ranking context-tagged text blocks from the plurality of context-tagged text blocks; and generating, by the device, a unified prompt by concatenating the plain text question with the one or more highest-ranking context-tagged text blocks, wherein the large language model can receive the unified prompt as input and can produce the plain text answer as output. In various aspects, the device can cause the large language model to respond to one or more chain-of-thought prompts for respective ones of the plurality of context-tagged text blocks, thereby yielding a plurality of chain-of-thought responses that respectively correspond to the plurality of context-tagged text blocks, the re-ranker can assign respective relevance scores to the plurality of chain-of-thought responses, and the device can identify the one or more highest-ranking context-tagged text blocks based on the relevance scores.

In various instances, such defined acts can include: prompting, by the device, the large language model to pay extra attention to an identifier of the scientific instrument, in response to the identifier being written in the plain text question.

Such defined acts are inherently computerized. Indeed, a scientific instrument, such as a charged-particle microscope, is a highly-technical computerized device comprising specific computerized hardware (e.g., temperature sensors, pressure sensors, voltage sensors, ion beam emitters, electron beam emitters, focusing lenses, mass analyzers, ion detectors, beam apertures, fluid valves). A scientific instrument and the operations that it performs cannot be implemented by the human mind, or by a human with pen and paper, in any reasonable or practicable way without computers. Furthermore, artificial neural networks (e.g., LLMs, text-to-graph models, named entity recognition models, re-rankers) are also inherently computerized constructs comprising specific software-oriented architectures (e.g., input layers, hidden layers, or output layers, any of which can be made up of trainable or non-trainable internal parameters such as convolutional layers or LSTM layers). Artificial neural networks cannot be trained or executed by the human mind, or by humans with mere pen and paper, in any reasonable or practicable way without computers. Further still, the purpose of RAG-AI is to enable computers to automatically generate natural language answers to natural language questions.

Moreover, various embodiments described herein can integrate into a practical application various teachings relating to retrieval augmented generative question and answer boosting. As explained above, existing techniques for facilitating RAG-AI can exhibit insufficient or unsatisfactory answer accuracy. The present inventors realized that such insufficient or unsatisfactory answer accuracy, at least with respect to questions and answers that pertain to operating, servicing, or maintaining scientific instruments, is caused in large part by existing techniques' inability to properly, reliably, or confidently handle scientific instrument identifiers (e.g., model numbers, serial numbers). Indeed, such identifiers are unique alphanumeric strings that can confound both embedding searches (e.g., due to carrying little semantic meaning) and keyword searches (e.g., due to minor spelling differences). Furthermore, a technical document will often list or enumerate the identifiers of whatever scientific instruments to which that technical document pertains (as well as any other helpful or pertinent contextual information) in a single location or page, and the remainder of that technical document will often not explicitly repeat or recite those identifiers (or that other contextual information). So, when a technical document is decomposed into text blocks according to existing techniques, many of those text blocks will often fail to recite or contain such identifiers (or such other contextual information). These no-identifier text blocks (or, more generally, these no-context text blocks) can be highly likely to be mistakenly or erroneously utilized by RAG-AI to answer questions about scientific instruments to which they are not applicable. For at least these reasons, existing techniques can be considered as disadvantageous.

Various embodiments described herein can help to ameliorate one or more of these technical problems. That is, various embodiments described herein can boost or otherwise improve the answer accuracy of RAG-AI with respect to questions about scientific instruments. As described herein, such embodiments can accomplish such boosting or improvement by implementing any of the following: a repository or database of document-graphs that each comprise respective context-tagged text blocks; composition of adjacent context-tagged text blocks via iterative graph-walking and embedding-change comparison; text block re-ranking based on synthesized responses to chain-of-thought prompts; and prompt augmentation for identifier emphasis.

Indeed, when given a technical document that is desired to be used as a RAG reference, various embodiments can involve constructing (e.g., via execution of a text-to-graph neural network, or via leveraging of an LLM with a set of document-exploration prompts) a document-graph to represent the substantive or semantic content and structure of that given technical document. Leaf nodes of the document-graph can respectively correspond to discrete text blocks of that given technical document, and non-leaf nodes can instead respectively correspond to contextual information (e.g., document title, section or subsection headings, page numbers, effective dates, applicable scientific instrument identifiers) that introduces, applies to, or otherwise qualifies respective ones of those text blocks. By concatenating or otherwise linking each leaf node with its upstream non-leaf nodes, each text block of the given technical document can be considered as being tagged with whatever contextual information that applies to it. Thus, implementation of document-graphs as described herein can reduce or avoid the occurrence of no-identifier (or, more generally, no-context) text blocks, thereby improving or boosting answer accuracy of RAG-AI.

Next, when given any context-tagged text block that has been retrieved via an embedding search or a keyword search, a composition of that context-tagged text block can be generated via iterative application of graph-walking and embedding-change comparison. Specifically, there can be another context-tagged text block in whatever document-graph contains the given context-tagged text block, such that the another context-tagged text block is adjacent or otherwise nearest (e.g., in terms of graph path) to the given context-tagged text block. In various aspects, the given context-tagged text block and the another context-tagged text block can be concatenated together, thereby yielding a composed context-tagged text block. If an embedding of that composed context-tagged text block differs by less than a threshold margin from an embedding of the given context-tagged text block, then the composed context-tagged text block (rather than the given context-tagged text block by itself) can be relied upon to answer whatever question whose search yielded the given context-tagged text block. In other words, the question can be answered based on both the given context-tagged text block and the another context-tagged text block, notwithstanding that the embedding search or keyword search did not return or uncover the another context-tagged text block. In still other words, the embedding search or keyword search can be considered as failing (e.g., due to the above-mentioned difficulties associated with scientific instrument identifiers) to return some context-tagged text blocks that would nevertheless be useful in answering a given question, and adjacent text block composition as described herein can be considered as a mechanism that helps to catch such missed context-tagged text blocks (e.g., that helps to fill the cracks or gaps in the embedding search or the keyword search). Thus, text block composition can help to improve or boost answer accuracy of RAG-AI.

Moreover, when given a set of potentially-relevant context-tagged text blocks (e.g., that have been returned via embedding searches, keyword searches, or text block compositions), a re-ranker can be implemented to identify which of those potentially-relevant context-tagged text blocks are more relevant to a given question. In some cases, the re-ranker can be executed on each of those potentially-relevant context-tagged text blocks, thereby computing a respective relevance score for each potentially-relevant context-tagged text block. In other cases, an LLM can be prompted to investigate the substantive or semantic sufficiency of each potentially-relevant context-tagged text block via one or more chain-of-thought queries (e.g., asking the LLM what information that is needed to answer a given question is missing from a given potentially-relevant context-tagged text block; asking the LLM to infer how relevant or irrelevant a given potentially-relevant context-tagged text block is with respect to a given question). In such cases, the re-ranker can compute the relevance scores by being executed on whatever content that the LLM synthesizes in response to those chain-of-thought queries. Such synthesized content can be considered as deeper, richer, or otherwise supplemental information that paints a fuller picture of the potentially-relevant context-tagged text blocks for the re-ranker. In this way, chain-of-thought re-ranking can cause the re-ranker to produce more accurate relevance scores, thereby improving or boosting answer accuracy of RAG-AI.

Lastly, when given multiple context-tagged text blocks that have been deemed (e.g., via re-ranking) to be most relevant to a given question, a unified prompt can be created by concatenating those multiple context-tagged text blocks with the given question. If the given question explicitly includes a scientific instrument identifier, various embodiments can involve augmenting that unified prompt with one or more sentences that emphasize that scientific instrument identifier. Such augmentation can be considered as instructing, commanding, or otherwise forcing the LLM to pay greater or heavier attention to whichever of the multiple context-tagged text blocks that also explicitly recite that scientific instrument identifier, thereby improving or boosting the answer accuracy of RAG-AI.

The present inventors experimentally verified that implementation of any of the aforementioned features (e.g., document-graphs, adjacent text block composition, chain-of-thought re-ranking, prompt augmentation for identifier emphasis) can statistically significantly increase answer accuracy of RAG-AI. Indeed, such experiments included a control test in which only existing techniques (e.g., no document-graphs, no adjacent text block composition, no chain-of-thought re-ranking, no prompt augmentation for identifier emphasis) were used to answer several hundred test questions regarding various scientific instruments. That control test yielded correct answers for about 74.3% of those questions, abstentions/non-answers for about 5.7% of those questions, and delusional/false answers for about 20.0% of those questions. The present inventors conducted an analogous test in which all of the aforementioned features (e.g., document-graphs, adjacent text block composition, chain-of-thought re-ranking, prompt augmentation for identifier emphasis) were implemented to answer those same hundreds of questions. Such analogous test yielded correct answers for about 90.5% of those questions, abstentions/non-answers for about 2.8% of those questions, and delusional/false answers for about 6.7% of those questions. This experiment shows that various embodiments described herein can yield a significant performance boost to RAG-AI (e.g., correct answers increased by a factor of about 1.2, abstentions/non-answers reduced by a factor of about 2, and delusional/false answers reduced by a factor of about 3). Other experiments conducted by the present inventors reinforced these results.

It is to be appreciated and understood that, although the above-mentioned experiments show significant performance boosting when all of the aforementioned features (e.g., document-graphs, adjacent text block composition, chain-of-thought re-ranking, prompt augmentation for identifier emphasis) are combined together, each of such aforementioned features can be considered as being an individual improvement to RAG-AI that can, in some cases, be implemented independently of the others. That is, various embodiments described herein can involve implementing any suitable combination of the aforementioned features (e.g., document-graphs, adjacent text block composition, chain-of-thought re-ranking, prompt augmentation for identifier emphasis); such embodiments are not limited only to the implementation of all of such features together.

In any case, for at least the above reasons, various embodiments described herein can be considered as addressing or ameliorating various technical problems or disadvantages that plague existing techniques. Therefore, various embodiments described herein can be considered as a concrete and tangible technical improvement in the field of RAG-AI. Accordingly, various embodiments described herein certainly qualify as useful and practical applications of computers.

Figure 1:
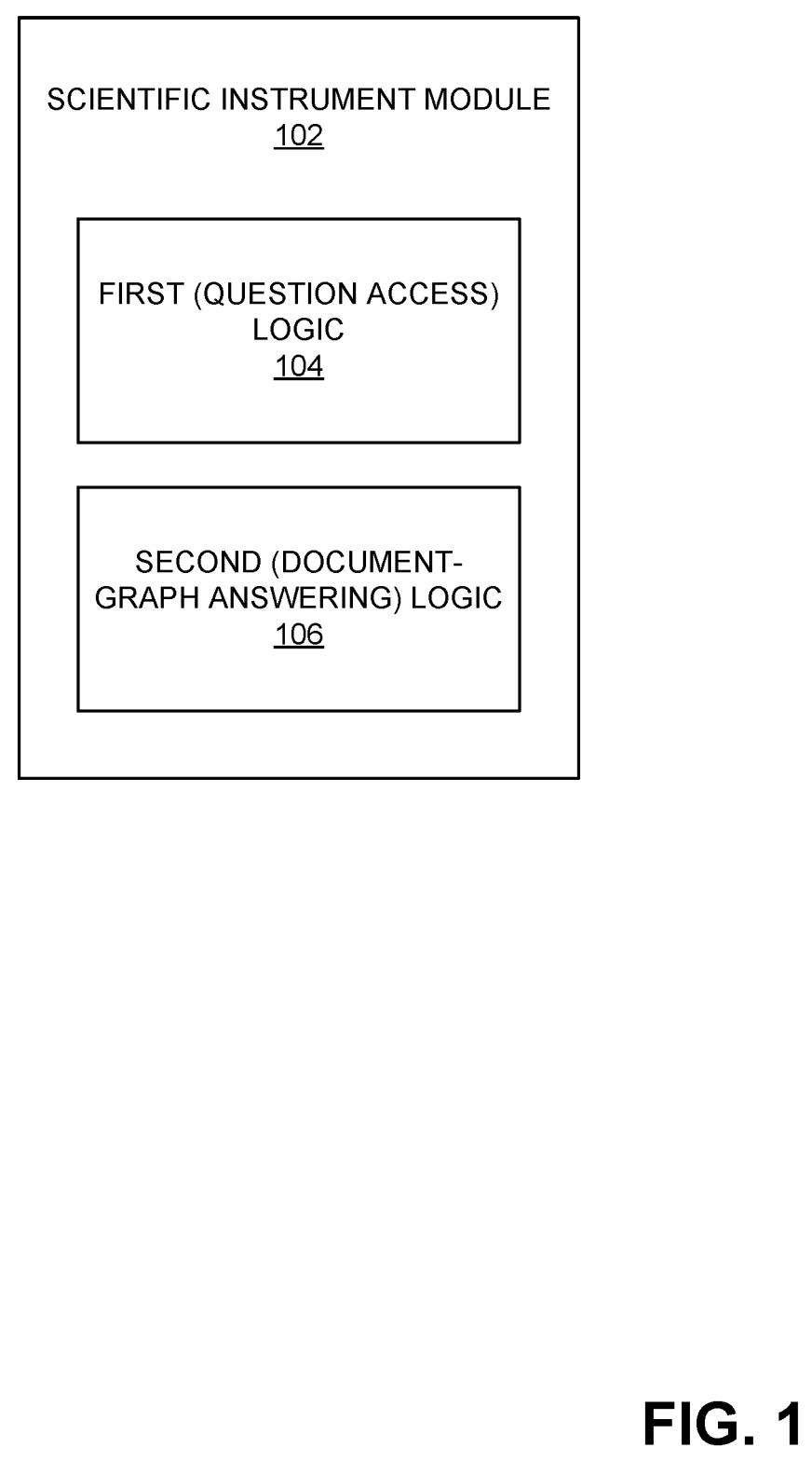

FIG. 1 illustrates an example, non-limiting block diagram of a scientific instrument module 102 in accordance with various embodiments described herein.

In various embodiments, the scientific instrument module 102 can be implemented by circuitry (e.g., including electrical or optical components), such as a programmed computing device. Logic of the scientific instrument module 102 can be included in a single computing device or can be distributed across multiple computing devices that are in communication with each other as appropriate. Examples of computing devices that may, singly or in combination, implement the scientific instrument module 102 are discussed herein with reference to FIGS. 22 and 24, and examples of systems or networks of interconnected computing devices, in which the scientific instrument module 102 may be implemented across one or more of the computing devices, are discussed herein with reference to FIGS. 23 and 25.

The scientific instrument module 102 can include first logic 104 and second logic 106. As used herein, the term "logic" can include an apparatus that is to perform a set of operations associated with the logic. For example, any of the logic elements included in the scientific instrument module 102 can be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" can refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module can omit one or more of the logic elements depicted in the associated drawings; for example, a module may include a subset of the logic elements depicted in the associated drawings when that module is to perform a subset of the operations discussed herein with reference to that module.

In various embodiments, there can be a scientific instrument corresponding to the scientific instrument module 102. In various aspects, the scientific instrument can be any suitable computerized device that can electronically measure some scientifically-relevant, clinically-relevant, or research-relevant characteristic, property, or attribute of an analytical specimen (e.g., of a known or unknown mixture, compound, or collection of matter). As a non-limiting example, a scientific instrument can be a mass spectrometer that is operatively coupled to a gas chromatograph or a liquid chromatograph. In such case, the scientific instrument can measure or determine ion spectra (e.g., relative ion abundance as a function of mass-to-charge ratio) of the analytical specimen. As another non-limiting example, a scientific instrument can be a scanning electron microscope. In such case, the scientific instrument can measure or determine a surface topography of the analytical specimen. As yet another non-limiting example, a scientific instrument can be a transmission electron microscope. In such case, the scientific instrument can measure or determine internal structural details of the analytical specimen. As a more general non-limiting example, a scientific instrument can be any suitable type of charged-particle microscope (e.g., some types of microscopes can use beams of non-electron ions to capture images).

In various embodiments, the first logic 104 can access a plain text question regarding the scientific instrument. In various aspects, the plain text question can be one or more unstructured sentences that request or command identification of some technical detail regarding the scientific instrument (e.g., regarding maintaining, servicing, or operating the scientific instrument).

In various embodiments, the second logic 106 can involve generating, via an LLM that references a document-graph repository, a plain text answer for the plain text question. In various aspects, the document-graph repository can comprise any suitable number of document-graphs. In various instances, a document-graph can represent the semantic or substantive structure and content of a respective technical document (e.g., of a respective service manual or instrument failure mode report). In particular, leaf nodes of the document-graph can represent text blocks of the technical document, and non-leaf nodes of the document-graph can represent higher-level, contextual information of the technical document (e.g., titles, headers, page numbers, dates, instrument identifiers). So, each text block of the technical document can be considered as being tagged or otherwise linked to whatever contextual information is upstream of it in the document-graph. In various cases, the second logic 106 can involve searching (e.g., via an embedding search or keyword search) through the document-graph for context-tagged text blocks that are potentially relevant to the plain text question. In various aspects, for any potentially-relevant context-tagged text block, the second logic 106 can involve generating a composed context-tagged text block, via iterative graph-walking and embedding-change comparison with respect to that potentially-relevant context-tagged text block. In various instances, when given multiple potentially-relevant context-tagged text blocks (or adjacent compositions thereof), the second logic 106 can involve utilizing a re-ranker to identify the top or otherwise most-relevant of those multiple potentially-relevant context-tagged text blocks. In various cases, the re-ranker can be executed on responses that the LLM synthesizes based on chain-of-thought prompts for each of those multiple potentially-relevant context-tagged text blocks. In various aspects, when given multiple top or most-relevant context-tagged text blocks, the second logic 106 can involve generating a unified prompt, by concatenating those multiple top or most-relevant context-tagged text blocks with the plain text question. In situations where the plain text question explicitly recites a scientific instrument identifier, the second logic 106 can involve augmenting the unified prompt to emphasize that scientific instrument identifier. In various instances, the LLM can receive the unified prompt as input and can synthesize as output the plain text answer. In other words, the LLM can be considered as constructing a response to the plain text question by using the semantic substance of the multiple top or most-relevant context-tagged text blocks.

Accordingly, the scientific instrument module 102 can facilitate retrieval augmented generative question and answer boosting.

FIG. 2 is an example, non-limiting flow diagram of a computer-implemented method 200 in accordance with various embodiments described herein. The operations of the computer-implemented method 200 may be used in any suitable context to perform any suitable operations (e.g., can be performed by or used in conjunction with any of the various modules, computing devices, or graphical user interfaces described with respect to of FIGS. 1, 21, 22, 23, 24, and 25). Operations are illustrated once each and in a particular order in FIG. 2, but the operations may be reordered or repeated as desired and appropriate (e.g., different operations performed may be performed in parallel, as suitable).

In various aspects, act 202 can include accessing, by a device operatively coupled to a processor, a plain text question regarding a scientific instrument. In various cases, the first logic 104 can perform or otherwise facilitate act 202.

In various instances, act 204 can include performing second operations generating, by the device and via an LLM that references a document-graph repository, a plain text answer for the plain text question. In various cases, the second logic 106 can perform or otherwise facilitate act 204.

Accordingly, the computer-implemented method 200 can facilitate retrieval augmented generative question and answer boosting.

FIG. 3 illustrates a block diagram of an example, non-limiting system that can facilitate retrieval augmented generative question and answer boosting in accordance with one or more embodiments described herein.

In various embodiments, there can be a scientific instrument 302. In various aspects, the scientific instrument 302 can be as described above. That is, the scientific instrument 302 can be any suitable computerized device that can leverage its constituent hardware (e.g., electron sources, anodes, condenser lenses, condenser apertures, scan coils, objective lenses, objective apertures, deflectors, condensers, stigmators, electron detectors, X-ray detectors, actuatable specimen stages) to electronically measure any suitable scientifically-relevant, clinically-relevant, or research-relevant characteristic, attribute, or property of any suitable analytical specimen. As a non-limiting example, the scientific instrument 302 can be a charged-particle microscope. As another non-limiting example, the scientific instrument 302 can be a mass spectrometer.

In various embodiments, there can be a plain text question 304. In various aspects, the plain text question 304 can be any suitable number of natural language or unstructured sentences or sentence fragments that request (e.g., as in the case of interrogative sentences) or command (e.g., as in the case of imperative sentences) that some technical aspect, detail, or feature of the scientific instrument 302 be identified. As a non-limiting example, the plain text question 304 can ask how to invoke or activate some particular operation of the scientific instrument 302 (e.g., "How do I increase the beam voltage of an ICS-2000?"; "Explain how to prepare a specimen for a Triplus RHS."; "Describe how to prime the pump of an autosampler."). As another non-limiting example, the plain text question 304 can ask how the scientific instrument 302 should be serviced (e.g., "How often should a charged-particle microscope receive routine maintenance?"; "What is routine maintenance for a charged-particle microscope?"; "Tell me how to repair an ion detector of a transmission electron microscope."; "Give me detailed instructions to replace a suppressor on my ICS-5000."). As even another non-limiting example, the plain text question 304 can ask for troubleshooting information for the scientific instrument 302 (e.g., "What are the symptoms of a damaged ion detector?"; "My scanning electron microscope is capturing images with dark, jagged artifacts throughout. What's wrong with the microscope?"; "Tell me the steps to troubleshoot the oven of a gas chromatograph."). As yet another non-limiting example, the plain text question 304 can ask about the identities of constituent components of the scientific instrument 302 (e.g., "What is the part number for the ICS-2100 injection valve?"; "Explain all the subsystems of a mass spectrometer."). As still another non-limiting example, the plain text question 304 can ask anything else whatsoever about the scientific instrument 302 (e.g., "How is a liquid chromatograph built?"; "How much energy does a transmission electron microscope consume?"). In various instances, the plain text question 304 can be provided or inputted by a user of the scientific instrument 302 via any suitable human-computer interface device (e.g., via a keyboard, keypad, touchscreen, or voice transcription system of the scientific instrument 302).

In various embodiments, there can be a large language model 306 (hereafter "LLM 306"). In various aspects, the LLM 306 can comprise an encoder portion 308 and a synthesizer portion 310. In various cases, the encoder portion 308 can be considered as being upstream from the synthesizer portion 310. Equivalently, the synthesizer portion 310 can be considered as being downstream of the encoder portion 308.

In various aspects, the encoder portion 308 can exhibit any suitable deep learning internal architecture. Indeed, in various cases, the encoder portion 308 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. As yet another example, any of such input layer, one or more hidden layers, or output layer can be transformer layers, whose learnable or trainable parameters can be single-head or multi-head attention blocks or other weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Likewise, in various instances, the synthesizer portion 310 can exhibit any suitable deep learning internal architecture. Indeed, in various cases, the synthesizer portion 310 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. As yet another example, any of such input layer, one or more hidden layers, or output layer can be transformer layers, whose learnable or trainable parameters can be single-head or multi-head attention blocks or other weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of the specific internal architecture (e.g., the specific numbers, types, or organizations of layers) that is implemented within the encoder portion 308, the encoder portion 308 can be configured to receive textual data (which can be accompanied by any suitable numerical or graphical data) and to produce embeddings based on such inputted textual data. In contrast, regardless of the specific internal architecture that is implemented within the synthesizer portion 310, the synthesizer portion 310 can be configured to receive embeddings produced by the encoder portion 308 and to produce synthesized textual content based on such embeddings. As a non-limiting example, the LLM 306 can be ChatGPT.

In various embodiments, a system 312 can be electronically integrated (e.g., via any suitable wired or wireless electronic connections) with the scientific instrument 302, with the plain text question 304, or with the LLM 306. In various cases, it can be desired to utilize the LLM 306 to automatically generate an answer in response to the plain text question 304. As described herein, the system 312 can accomplish or otherwise facilitate this.

In various aspects, the system 312 can comprise a processor 314 (e.g., computer processing unit, microprocessor) and a non-transitory computer-readable memory 316 that is operably or operatively or communicatively connected or coupled to the processor 314. The non-transitory computer-readable memory 316 can store computer-executable instructions which, upon execution by the processor 314, can cause the processor 314 or other components of the system 312 (e.g., access component 318, search component 320, answer component 322) to perform one or more acts. In various embodiments, the non-transitory computer-readable memory 316 can store computer-executable components (e.g., access component 318, search component 320, answer component 322), and the processor 314 can execute the computer-executable components.

In various embodiments, the system 312 can comprise an access component 318. In various aspects, the access component 318 can electronically access the scientific instrument 302. That is, the access component 318 can electronically communicate or otherwise electronically interact with (e.g., transmit electronic instructions or commands to, receive electronic data from) the scientific instrument 302. Accordingly, the access component 318 can be considered as a proxy or conduit through which other components of the system 312 can interact with, communicate with, or otherwise manipulate the scientific instrument 302. In various instances, the access component 318 can electronically access the plain text question 304 or the LLM 306. That is, the access component 318 can electronically receive, electronically retrieve, or otherwise electronically obtain the plain text question 304 or the LLM 306, from any suitable electronic source or database (not shown). In any case, the access component 318 can be considered as a proxy or conduit through which other components of the system 312 can interact with, control, or otherwise manipulate the plain text question 304 or the LLM 306. However, these are mere non-limiting examples. In other cases, the access component 318 can be omitted, and any other components of the system 312 can communicate or interact directly with the scientific instrument 302, with the plain text question 304, or with the LLM 306.

In various embodiments, the system 312 can comprise a search component 320. In various aspects, the search component 320 can, as described herein, search through a document-graph repository to identify a plurality of context-tagged text blocks that are relevant to the plain text question. In various cases, the search component 320 can combine those relevant context-tagged text blocks with the plain text question, thereby forming a unified prompt.

In various embodiments, the system 312 can comprise an answer component 322. In various instances, the answer component 322 can, as described herein, execute the LLM 306 on the unified prompt, thereby yielding a plain text answer to the plain text question.

Note that, in various instances, the access component 318, the search component 320, and the answer component 322 can collectively be considered as being one or more software components 317 of the system 312. In various aspects, it should be appreciated that the one or more software components 317 are described primarily herein as comprising three components (e.g., the access component 318, the search component 320, and the answer component 322) for ease of explanation and illustration. However, the one or more software components 317 are not limited to being implemented as exactly such three components in every embodiment. Indeed, in some embodiments, the functionalities described herein of such three components can be combined in any suitable fashions, so as to be implemented in or by fewer than three components (e.g., in some cases, a single component can perform all of the functionalities that are described herein with respect to the access component 318, the search component 320, and the answer component 322). In other embodiments, the functionalities described herein of such three components can instead be distributed, separated, split, or fragmented in any suitable fashions, so as to be implemented in or by more than three components (e.g., two or more components can facilitate the functionalities that are performable by the access component 318; two or more components can facilitate the functionalities that are performable by the search component 320; two or more components can facilitate the functionalities that are performable by the answer component 322).

Figure 4:
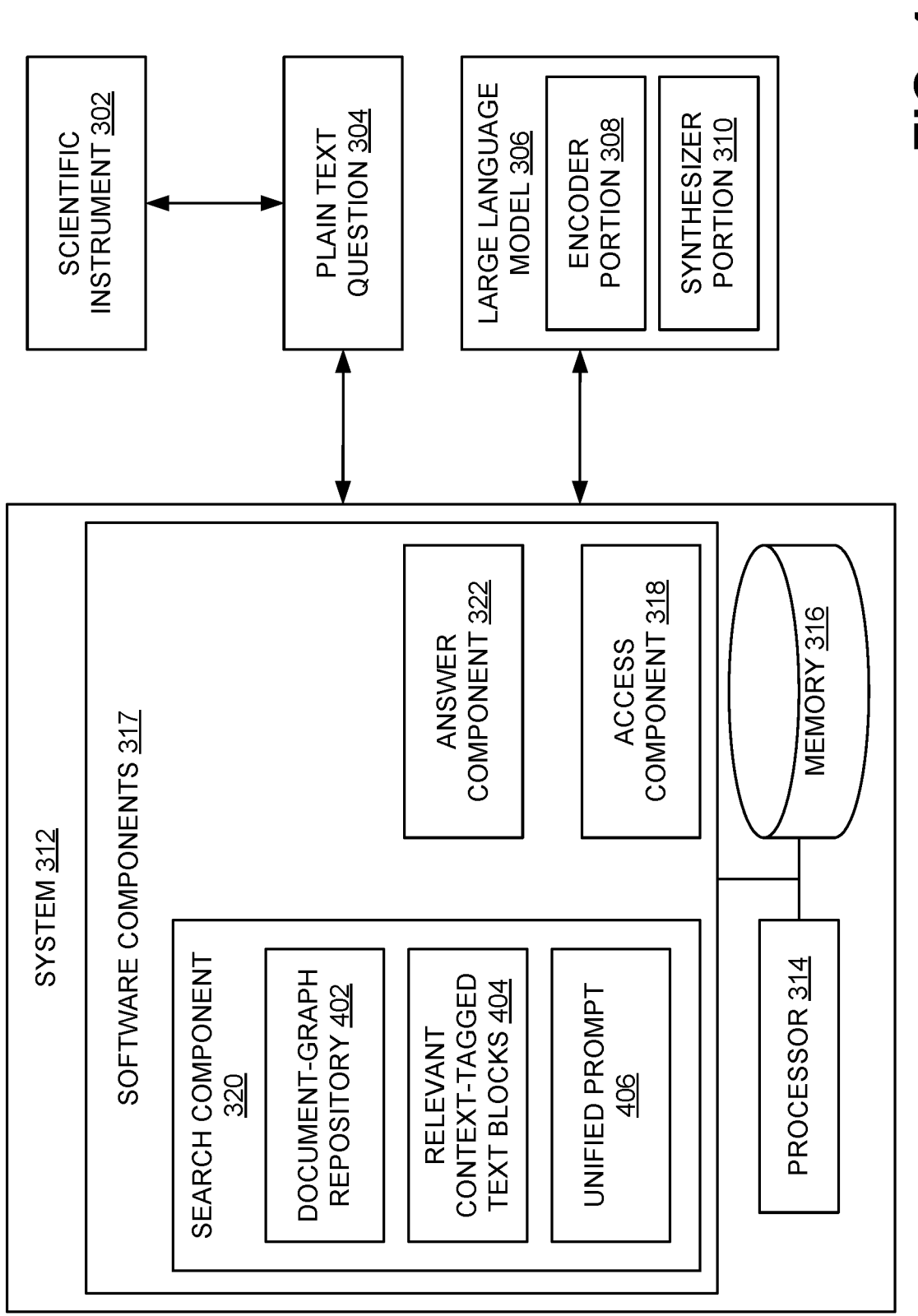
FIG. 4 illustrates a block diagram of an example, non-limiting system including a document-graph repository, a plurality of relevant context-tagged text blocks, and a unified prompt that facilitates retrieval augmented generative question and answer boosting in accordance with one or more embodiments described herein.

FIG. 4 illustrates a block diagram of an example, non-limiting system including a document-graph repository, a plurality of relevant context-tagged text blocks, and a unified prompt that can facilitate retrieval augmented generative question and answer boosting in accordance with one or more embodiments described herein.

In various embodiments, the search component 320 can electronically store, electronically maintain, electronically control, or otherwise electronically access a document-graph repository 402. In various aspects, the search component 320 can electronically search through the document-graph repository 402 based on the plain text question 304, and such searching can identify a plurality of relevant context-tagged text blocks 404. In various instances, the search component 320 can aggregate the plain text question 304 and the plurality of relevant context-tagged text blocks 404 together, thereby forming a unified prompt 406. Non-limiting aspects are described with respect to FIGS. 5-17.

FIGS. 5-10 illustrate example, non-limiting block diagrams regarding document-graphs in accordance with one or more embodiments described herein.

Figure 5:
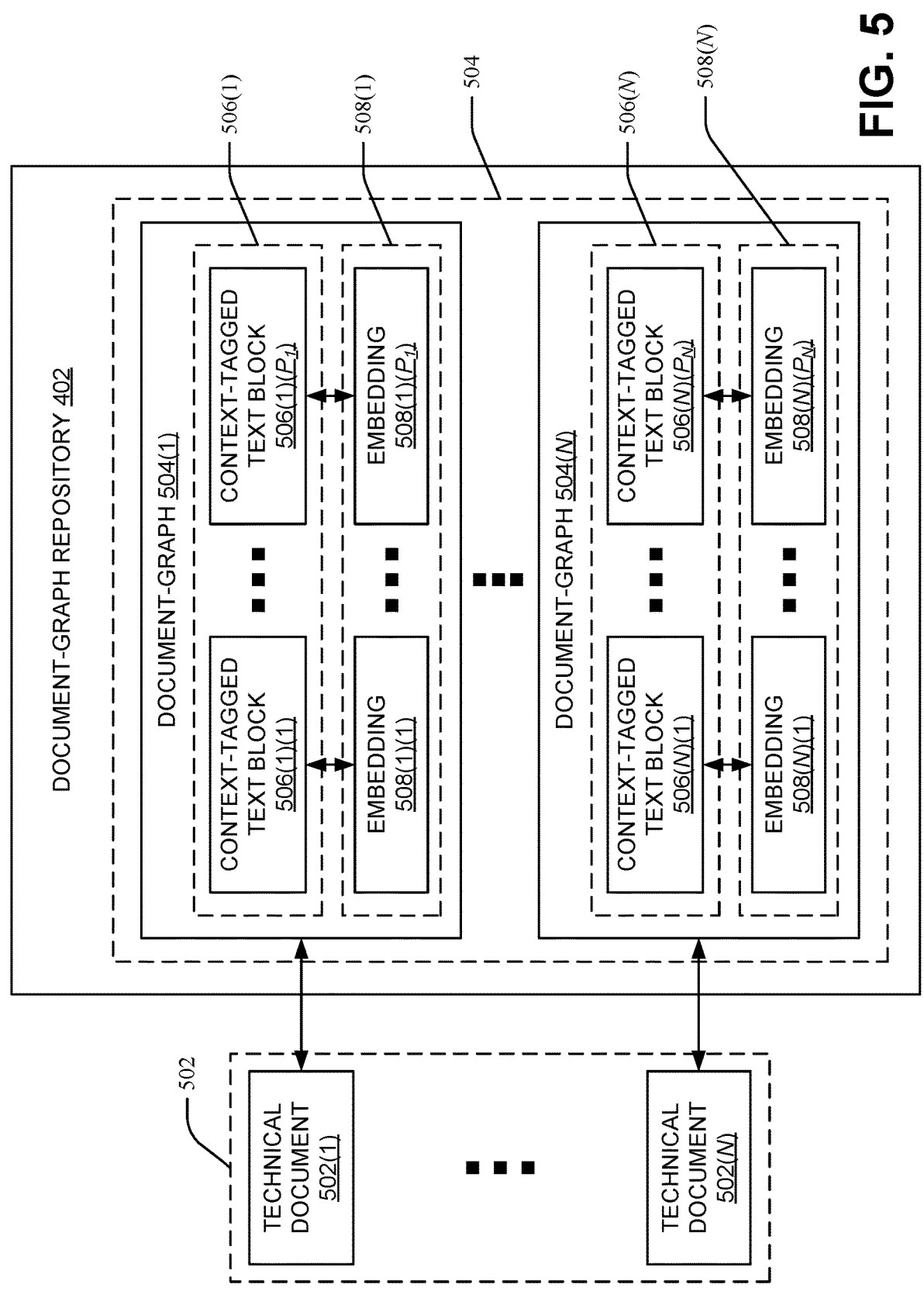

First, consider FIG. 5. In various embodiments, there can be a plurality of technical documents 502. In various aspects, the plurality of technical documents 502 can comprise n documents, for any suitable positive integer n>1: a technical document 502(1) to a technical document 502(n). In various instances, each of the plurality of technical documents 502 can be any suitable electronic file (e.g., word-doc file, PDF file, webpage file) that textually (or, in some cases, graphically or numerically) describes, teaches, shows, indicates, or otherwise conveys one or more technical features, details, or aspects of any suitable scientific instruments (which may or may not include the scientific instrument 302). As some non-limiting examples, any of the plurality of technical documents 502 can be service manuals, maintenance handbooks, schematics, or failure mode reports that describe or explain: the technological or scientific designs of any suitable scientific instruments (e.g., can list or show different constituent pieces, parts, or subsystems of various scientific instruments and can describe how those constituent pieces, parts, or subsystems work); how to operate any suitable scientific instruments (e.g., can list or show different user-configurable settings or controls of various scientific instruments and can explain what such settings or controls do); any suitable information regarding expected use or expected operation of any suitable scientific instruments (e.g., can show or explain various operating conditions or use-case scenarios that various scientific instruments are designed to handle or are not designed to handle); any suitable information regarding how any suitable scientific instruments are expected or supposed to be maintained (e.g., can list, show, or explain various servicing tasks that are expected to be performed for various scientific instruments); or any suitable information regarding troubleshooting of any suitable scientific instruments (e.g., can describe or explain how to resolve various malfunction symptoms of various scientific instruments).

In various aspects, the document-graph repository 402 can comprise a plurality of document-graphs 504 that respectively correspond (e.g., in one-to-one fashion) to the plurality of technical documents 502. Thus, since the plurality of technical documents 502 can comprise n documents, the plurality of document-graphs 504 can comprise n graphs: a document-graph 504(1) to a document-graph 504 (n). In various cases, each of the plurality of document-graphs 504 can be a directed, acyclic graph whose nodes and edges represent the semantic content and structure of a respective one of the plurality of technical documents 502.

As a non-limiting example, the document-graph 504(1) can correspond to the technical document 502(1). So, the document-graph 504(1) can represent the semantic content, structure, organization, or layout of the technical document 502(1). More specifically, leaf nodes of the document-graph 504(1) can represent respective text blocks of the technical document 502(1), and non-leaf nodes of the document-graph 504(1) can represent respective contextual information of the technical document 502(1).

In various aspects, a text block of the technical document 502(1) can be a discrete portion of the technical document 502(1) that substantively or semantically addresses a cohesive topic relating to scientific instruments. In some cases, a text block can be one or more consecutive sentences or sentence fragments that are written in the technical document 502(1). In other cases, a text block can be one or more consecutive paragraphs that are written in the technical document 502(1). But these are mere non-limiting examples. In yet other cases, a text block can be one or more consecutive sections, subsections, chapters, or pages of the technical document 502(1). Indeed, in some embodiments, a text block can be or otherwise include one or more tables, figures, or images from or otherwise contained in the technical document 502(1). In fact, in situations where the technical document 502(1) is a webpage, a text block can even include one or more videos that are presented in the webpage.

In various instances, contextual information of the technical document 502(1) can be one or more words or numbers that semantically or substantively introduce, qualify, or otherwise apply to any given text block of the technical document 502(1) but which are not necessarily recited in that given text block. In some cases, contextual information can include a title of the technical document 502(1). In other cases, contextual information can include a heading of whatever chapter, section, or subsection that the given text block belongs to within the technical document 502(1). In yet other cases, contextual information can include a page number (or a range of page numbers) at which the given text block is located within the technical document 502(1). In still other cases, contextual information can include a date (or a range of dates) on which the given text block was written or otherwise for which the given text block is considered valid or effective. In even other cases, contextual information can include a scientific instrument identifier that uniquely specifies which scientific instrument (or type, group, or class of scientific instruments) that the given text block is describing, explaining, or otherwise pertinent to.

In any case, each text block of the technical document 502(1) can be represented by a respective leaf node in the document-graph 504(1), each piece of contextual information in the technical document 502(1) can be represented by a respective non-leaf node in the document-graph 504(1), and the directed edges of the document-graph $504(1)$ can indicate which non-leaf nodes (which contextual information) introduce, qualify, or otherwise apply to which leaf nodes (which text blocks). Thus, because of the document-graph $504(1)$, each text block of the technical document $502(1)$ can be considered as being tagged, linked, or otherwise mapped to its appropriate contextual information. Suppose that the technical document $502(1)$ contains a total of $p_1$ text blocks, for any suitable positive integer $p_1 > 1$. In such case, the document-graph $504(1)$ can thus be considered as comprising or otherwise indicating a plurality of context-tagged text blocks $506(1)$ whose cardinality can be $p_1$: a context-tagged text block $506(1)(1)$ to a context-tagged text block $506(1)(p_1)$.

As another non-limiting example, the document-graph $504(n)$ can correspond to the technical document $502(n)$. So, the document-graph $504(n)$ can represent the semantic content, structure, organization, or layout of the technical document $502(n)$. Just as above, each text block of the technical document $502(n)$ can be represented by a respective leaf node in the document-graph $504(n)$, each piece of contextual information in the technical document $502(n)$ can be represented by a respective non-leaf node in the document-graph $504(n)$, and the directed edges of the document-graph $504(n)$ can indicate which non-leaf nodes (which contextual information) introduce, qualify, or otherwise apply to which leaf nodes (which text blocks). Thus, because of the document-graph $504(n)$, each text block of the technical document $502(n)$ can be considered as being tagged, linked, or otherwise mapped to its appropriate contextual information. Suppose that the technical document $502(n)$ contains a total of $p_n$ text blocks, for any suitable positive integer $p_n > 1$. In such case, the document-graph $504(n)$ can thus be considered as comprising or otherwise indicating a plurality of context-tagged text blocks $506(n)$ whose cardinality can be $p_n$: a context-tagged text block $506(n)(1)$ to a context-tagged text block $506(n)(p_n)$.

In various aspects, each context-tagged text block within the document-graph repository $402$ can correspond to a respective embedding. In various instances, such respective embeddings can be obtained by leveraging the encoder portion $308$.

As a non-limiting example, the context-tagged text block $506(1)(1)$ can correspond to an embedding $508(1)(1)$. That is, the search component $320$ can electronically execute the encoder portion $308$ on the context-tagged text block $506(1)(1)$, and such execution can yield the embedding $508(1)(1)$. More specifically, the search component $320$ can feed the context-tagged text block $506(1)(1)$ to the input layer of the encoder portion $308$, the context-tagged text block $506(1)(1)$ can complete a forward pass through the one or more hidden layers of the encoder portion $308$, and the output layer of the encoder portion $308$ can compute the embedding $508(1)$ based on whatever activation maps or feature maps are provided by its one or more hidden layers. Thus, the embedding $508(1)(1)$ can be considered as a latent vector representation of the context-tagged text block $506(1)(1)$ (e.g., can be one or more scalars, one or more vectors, one or more matrices, one or more tensors, or any suitable combination thereof that at least partially captures the semantic content or substance of the context-tagged text block $506(1)(1)$).

Similarly, the context-tagged text block $506(1)(p_1)$ can correspond to an embedding $508(1)(p_1)$. So, the search component $320$ can electronically execute the encoder portion $308$ on the context-tagged text block $506(1)(p_1)$, such execution can yield the embedding $508(1)(p_1)$, and the embedding $508(1)(p_1)$ can be considered as a latent vector representation of the context-tagged text block $506(1)(p_1)$.

Likewise, the context-tagged text block $506(n)(1)$ can correspond to an embedding $508(n)(1)$. That is, the search component $320$ can electronically execute the encoder portion $308$ on the context-tagged text block $506(n)(1)$, such execution can yield the embedding $508(n)(1)$, and the embedding $508(n)(1)$ can be considered as a latent vector representation of the context-tagged text block $506(n)(1)$.

In the same fashion, the context-tagged text block $506(n)(p_n)$ can correspond to an embedding $508(n)(p_n)$. So, the search component $320$ can electronically execute the encoder portion $308$ on the context-tagged text block $506(n)(p_n)$, such execution can yield the embedding $508(n)(p_n)$, and the embedding $508(n)(p_n)$ can be considered as a latent vector representation of the context-tagged text block $506(n)(p_n)$.

In various cases, the embedding $508(1)(1)$ to the embedding $508(1)(p_1)$ can collectively be considered as a plurality of embeddings $508(1)$. Likewise, the embedding $508(n)(1)$ to the embedding $508(n)(p_n)$ can collectively be considered as a plurality of embeddings $508(n)$.

Figure 7:
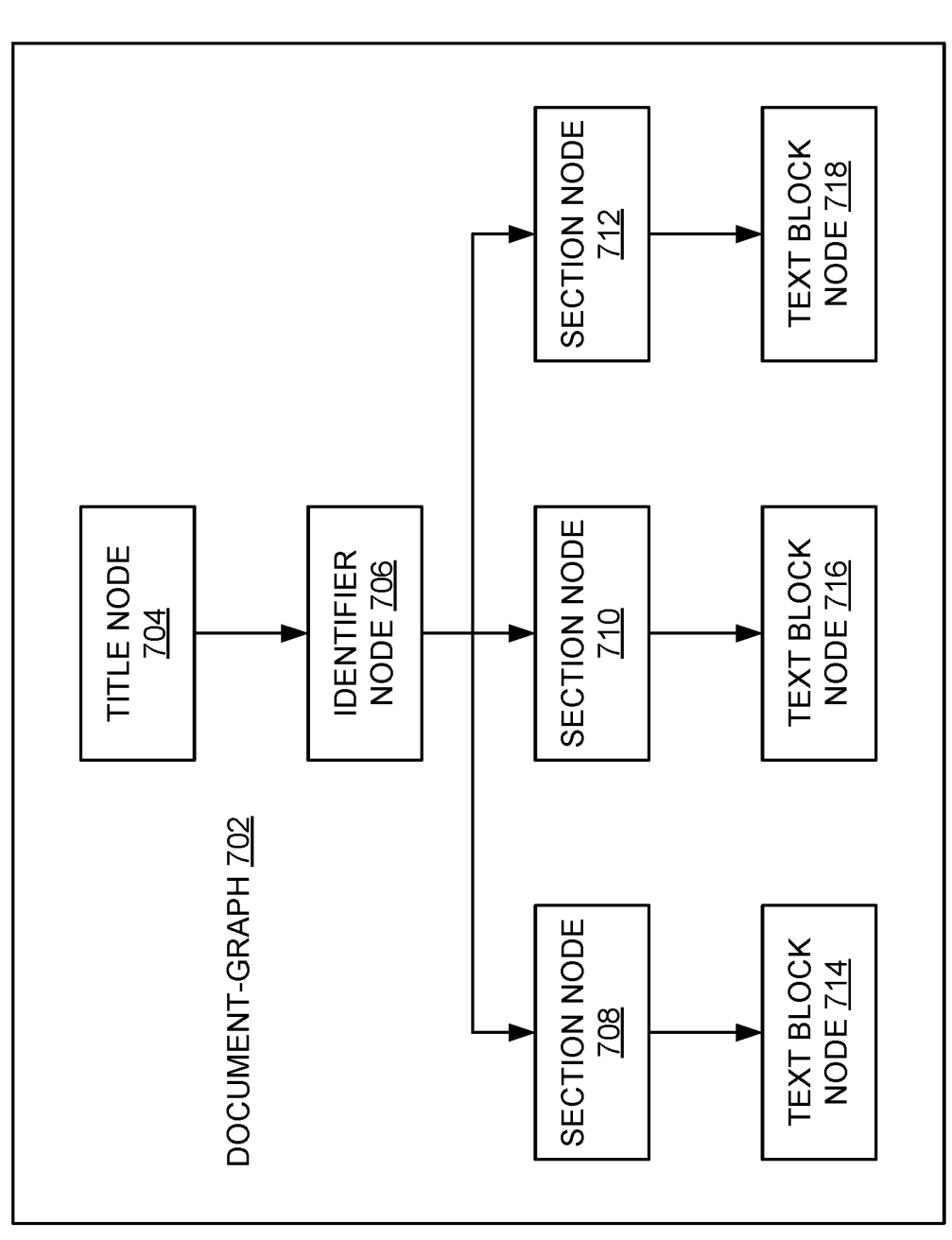

For clarification, consider the non-limiting examples shown in FIGS. 6-7. FIG. 6 depicts a technical document $600$. In this non-limiting example, the technical document $600$ can describe or explain how to troubleshoot a particular problem experienced by a particular type of scientific instrument. Numeral $602$ indicates a title of the technical document $600$. As shown, the technical document $600$ comprises three sections: a first section listing what specific scientific instruments the technical document $600$ applies to; a second section discussing a particular malfunction or problem that can be encountered by that specific scientific instrument; and a third section discussion how that particular malfunction or problem can be remedied. Numeral $604$ indicates a heading of the first section of the technical document $600$, and numeral $606$ indicates a text block within that first section. Numeral $608$ indicates a heading of the second section of the technical document $600$, and numeral $610$ indicates a text block within that second section. Numeral $612$ indicates a heading of the third section of the technical document $600$, and numeral $614$ indicates a text block within that third section. Note that a scientific instrument identifier (e.g., "Triplus RSH", "Triplus RSH Smart", "Chromeleon 7.2.10 Mue") is written in the first section of the technical document $600$ but is not written in the second or third sections of the technical document $600$, notwithstanding that all three sections of the technical document $600$ substantively pertain to that scientific instrument identifier.

Now, FIG. 7 depicts a document-graph $702$ that corresponds to the technical document $600$. As shown, the document-graph $702$ contains nodes and directed edges that collectively indicate or represent the semantic or substantive content and structure of the technical document $600$. Specifically, the document-graph $702$ can comprise a title node $704$, which can represent the title of the technical document $600$. In other words, the title node $704$ can contain whatever text is indicated by the numeral $602$. In this non-limiting example, an identifier node $706$ is immediately downstream of the title node $704$. In various aspects, the identifier node $706$ represents the scientific instrument identifier that is explicitly written in the first section of the technical document $600$ but that is absent from the second and third sections of the technical document $600$. In various instances, a section node $708$, a section node $710$, and a section node $712$ are immediately downstream of the identifier node $706$. In various cases, the section node $708$ represents the heading of the first section of the technical document 600. That is, the section node 708 can contain whatever text is indicated by the numeral 604. Similarly, the section node 710 represents the heading of the second section of the technical document 600. So, the section node 710 can contain whatever text is indicated by the numeral 608. Likewise, the section node 712 represents the heading of the third section of the technical document 600. Thus, the section node 712 can contain whatever text is indicated by the numeral 612. Now, in various aspects, a text block node 714 is immediately downstream of the section node 708, where the text block node 714 represents the substantive content or payload of the first section of the technical document 600. That is, the text block node 714 can contain whatever text is indicated by the numeral 606. Furthermore, a text block node 716 is immediately downstream of the section node 710, where the text block node 716 represents the substantive content or payload of the second section of the technical document 600. So, the text block node 716 can contain whatever text is indicated by the numeral 610. Lastly, a text block node 718 is immediately downstream of the section node 712, where the text block node 718 represents the substantive content or payload of the third section of the technical document 600. That is, the text block node 718 can contain whatever text is indicated by the numeral 614.

Accordingly, the document-graph 702 can be considered as conveying both the semantic content and the semantic structure or organization of the technical document 600. In particular, the text block nodes 714-718 (e.g., leaf nodes) can be considered as representing respective text blocks of the technical document 600; the remaining nodes (e.g., non-leaf nodes) of the document-graph 702 can be considered as representing respective pieces of contextual information (e.g., title, instrument identifier, section headings) of the technical document 600; and the directed edges of the document-graph 702 can be considered as indicating which pieces of contextual information qualify or otherwise apply to which text blocks (e.g., the text block node 714 is downstream of and thus qualified by the section node 708, the identifier node 706, and the title node 704; the text block node 714 is not downstream of and thus not qualified by the section node 710 or the section node 712).

Note that the technical document 600 and the document-graph 702 are mere non-limiting examples and that any suitable variations are possible. For instance, various sections of the technical document 600 can comprise multiple text blocks. As a non-limiting example, the second section of the technical document 600 can comprise three text blocks, one per paragraph that is written in that second section (e.g., a first text block representing the paragraph that begins with "Liquid injections are . . . ", a second text block representing the paragraph that begins with "Instrument method states . . . ", and a third text block representing the paragraph that begins with "When the syringe . . . "). As another instance, the technical document 600 can be tens or hundreds of pages in length, meaning that the technical document 600 can have very many text blocks and very many pieces of contextual information, and meaning that the document-graph 702 can have commensurate numbers of nodes. As yet another instance, the technical document 600 can comprise any suitable number of sections, any suitable number of subsections or sub-subsections, or any suitable number of chapters which can each comprise multiple sections. As even another instance, the technical document 600 might include multiple different scientific instrument identifiers, some of which can apply to some sections (or chapters, or subsections) and others of which can apply to other sections (or chapters, or subsections). In other words, although FIGS. 6-7 show a scientific instrument identifier being implemented on a per-document basis (e.g., one identifier applying to an entirety of a document), this is a mere non-limiting example. Other embodiments can involve scientific instrument identifiers being implemented on a per-section basis (or a per-chapter basis, or a per-subsection basis), such that different sections (or chapters, or subsections) can be considered as explaining information that is pertinent to different scientific instrument identifiers.

In any case, the document-graph 702 can represent both the content and the hierarchical structure of the technical document 600.

Figure 8:
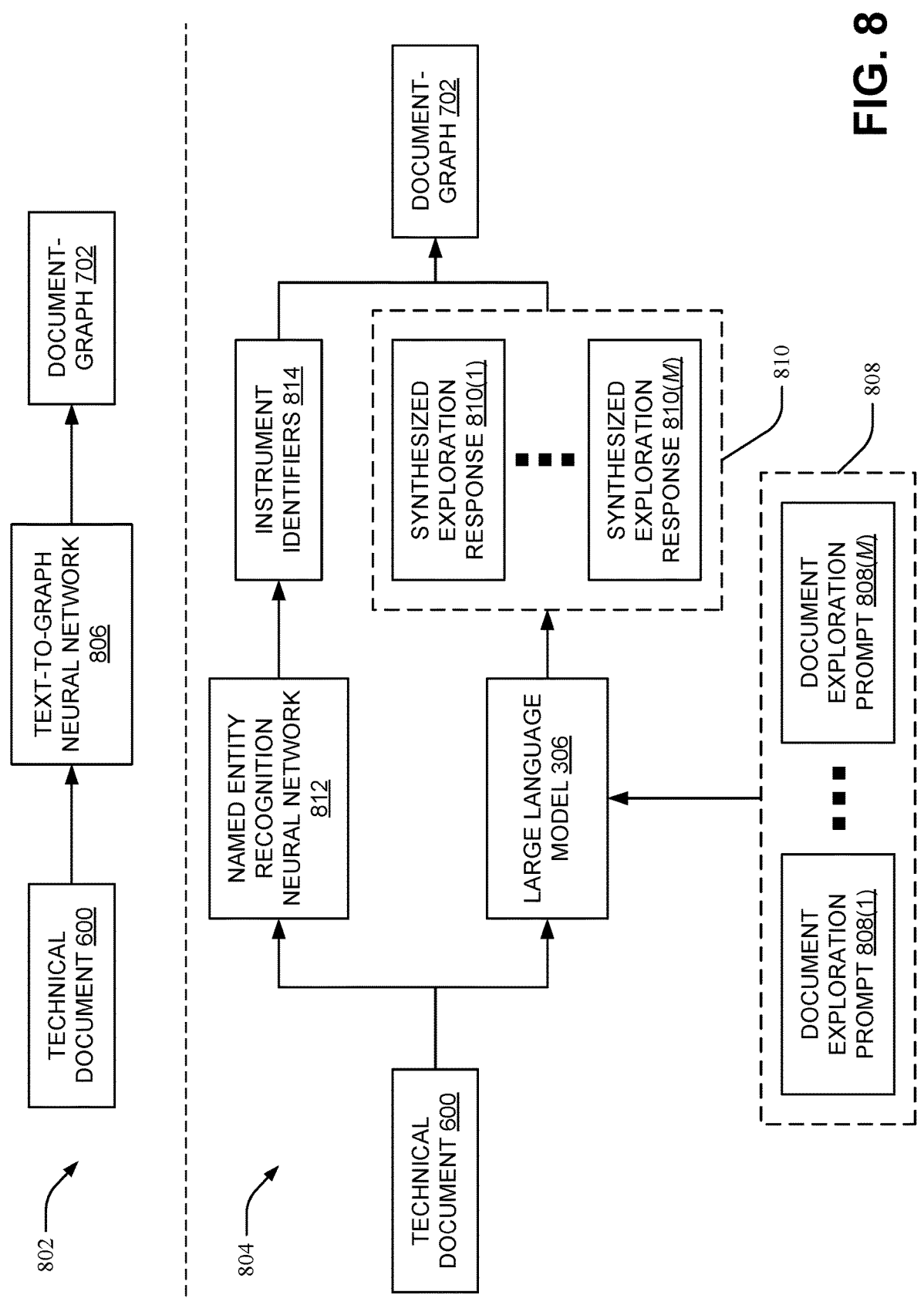

Now, consider FIG. 8. In various embodiments, the search component 320 can electronically generate the document-graph 702 in any suitable fashion. In some cases, as shown with respect to numeral 802, the search component 320 can generate the document-graph 702 by leveraging a text-to-graph neural network 806. In other cases, as shown with respect to numeral 804, the search component 320 can instead generate the document-graph 702 by leveraging a plurality of document-exploration prompts 808 and a named entity recognition neural network 812.

First, consider numeral 802. In various embodiments, the search component 320 can electronically store, electronically maintain, electronically control, or otherwise electronically access the text-to-graph neural network 806. In various aspects, the text-to-graph neural network 806 can exhibit any suitable deep learning internal architecture. Indeed, in various cases, the text-to-graph neural network 806 can have an input layer, one or more hidden layers, and an output layer. In various instances, any of such layers can be coupled together by any suitable interneuron connections or inter-layer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. As yet another example, any of such input layer, one or more hidden layers, or output layer can be transformer layers, whose learnable or trainable parameters can be single-head or multi-head attention blocks or other weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of its specific internal architecture, the text-to-graph neural network 806 can be configured to convert an inputted textual document into a graph structure whose leaf nodes represent text blocks of the inputted textual document and whose non-leaf nodes represent contextual information of the inputted textual document. So, the search component 320 can electronically execute the text-to-graph neural network 806 on the technical document 600, and such execution can yield the document-graph 702. More specifically, the search component 320 can feed the technical document 600 to the input layer of the text-to-graph neural network 806, the technical document 600 can complete a forward pass through the one or more hidden layers of the text-to-graph neural network 806, and the output layer of the text-to-graph neural network 806 can compute the document-graph 702 based on whatever activation maps or feature maps are provided by its one or more hidden layers.

Now, consider numeral 804. In various embodiments, the search component 320 can electronically store, electronically maintain, electronically control, or otherwise electronically access the named entity recognition neural network 812. In various aspects, the named entity recognition neural network 812 can exhibit any suitable deep learning internal architecture. Indeed, in various cases, the named entity recognition neural network 812 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. As yet another example, any of such input layer, one or more hidden layers, or output layer can be transformer layers, whose learnable or trainable parameters can be single-head or multi-head attention blocks or other weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of its specific internal architecture, the named entity recognition neural network 812 can be configured to determine what specific scientific instrument identifiers are recited within an inputted textual document and, in some cases, where those specific scientific instrument identifiers are located in the inputted textual document. So, the search component 320 can electronically execute the named entity recognition neural network 812 on the technical document 600, and such execution can yield one or more instrument identifiers 814. More specifically, the search component 320 can feed the technical document 600 to the input layer of the named entity recognition neural network 812, the technical document 600 can complete a forward pass through the one or more hidden layers of the named entity recognition neural network 812, and the output layer of the named entity recognition neural network 812 can extract the one or more instrument identifiers 814 (and, in some cases, their intra-document locations, in terms of page numbers or line numbers within the technical document 600) based on whatever activation maps or feature maps are provided by its one or more hidden layers.

Furthermore, the search component 320 can electronically store, electronically maintain, or otherwise electronically access the plurality of document-exploration prompts 808. In various aspects, the plurality of document-exploration prompts 808 can comprise m prompts, for any suitable positive integer m>1: a document-exploration prompt 808 (1) to a document-exploration prompt 808(m). In various instances, each of the plurality of document-exploration prompts 808 can be one or more unstructured or natural language sentences that request or command that some respective detail of the semantic or substantive content or organization of the technical document 600 be identified. As a non-limiting example, a document-exploration prompt can be: "What is the title of the technical document 600?". As another non-limiting example, a document-exploration prompt can be: "Determine how many sections the technical document 600 has.". As yet another non-limiting example, for any given section of the technical document 600, a document-exploration prompt can be: "What is the heading of the given section?", or "How many paragraphs are in the given section?". As still another non-limiting example, for any given paragraph of the technical document 600, a document-exploration prompt can be: "What is the text of the given paragraph?", or "How many sentences are in the given paragraph?". As even another non-limiting example, for any given sentence of the technical document 600, a document-exploration prompt can be: "What is the text of the given sentence?".

In any case, the search component 320 can execute the LLM 306 on the technical document 600 and on each of the plurality of document-exploration prompts 808, thereby yielding a plurality of synthesized exploration responses 810.

As a non-limiting example, the search component 320 can execute the LLM 306 on both the technical document 600 and the document-exploration prompt 808(1), and such execution can yield a synthesized exploration response 810(1). More specifically, the search component 320 can concatenate the technical document 600 with the document-exploration prompt 808(1); the search component 320 can feed or route that concatenation to the input layer of the encoder portion 308; that concatenation can complete a forward pass through the one or more hidden layers of the encoder portion 308; the output layer of the encoder portion 308 can compute or otherwise calculate one or more embeddings based on activation maps or feature maps provided by the one or more hidden layers of the encoder portion 308; those one or more embeddings can be fed or routed to the input layer of the synthesizer portion 310; those embeddings can complete a forward pass through the one or more hidden layers of the synthesizer portion 310; and the output layer of the synthesizer portion 310 can compute or otherwise calculate the synthesized exploration response 810(1) based on activation maps or feature maps provided by the one or more hidden layers of the synthesizer portion 310. In any case, the synthesized exploration response 810(1) can be one or more unstructured or natural language sentences or sentence fragments that substantively identify whatever piece of information about the technical document 600 was requested or demanded by the document-exploration prompt 808(1). For instance, if the document-exploration prompt 808(1) asks for the title of the technical document 600, then the synthesized exploration response 810(1) can relay or convey or otherwise be the title of the technical document 600 (e.g., can be whatever the LLM 306 thinks, determines, or infers is the title of the technical document 600).

As another non-limiting example, the search component 320 can execute the LLM 306 on both the technical document 600 and the document-exploration prompt 808(*m*), and such execution can yield a synthesized exploration response 810(*m*). More specifically, the search component 320 can concatenate the technical document 600 with the document-exploration prompt 808(*m*), that concatenation can complete a forward pass through the LLM 306 (e.g., through the encoder portion 308 and the synthesizer portion 310), and the LLM 306 can compute as output the synthesized exploration response 810(*m*). As above, the synthesized exploration response 810(*m*) can be one or more unstructured or natural language sentences or sentence fragments that substantively identify whatever piece of information about the technical document 600 was requested or demanded by the document-exploration prompt 808(*m*). For instance, if the document-exploration prompt 808(*m*) asks for the text of a specific paragraph within the technical document 600, then the synthesized exploration response 810(*m*) can relay or convey or otherwise be the text of that specific paragraph (e.g., can be whatever the LLM 306 thinks, determines, or infers is the text of that specific paragraph).

Note that the synthesized exploration response 810(1) to the synthesized exploration response 810(*m*) can be collectively considered as forming the plurality of synthesized exploration responses 810. In any case, the plurality of document-exploration prompts 808 can be considered as causing or forcing the LLM 306 to investigate, explore, or itemize the semantic content or organization of the technical document 600, and the plurality of synthesized exploration responses 810 can be considered as the findings or conclusions of the LLM 306 with respect to such investigation, exploration, or itemization.

In various aspects, the search component 320 can electronically construct or build the document-graph 702 based on the plurality of synthesized exploration responses 810 and the one or more instrument identifiers 814. For instance, some of the plurality of synthesized exploration responses 810 can be considered as indicating how many leaf nodes or non-leaf nodes the document-graph 702 should have (e.g., how many sections in the technical document 600, how many paragraphs in each section, how many sentences in each paragraph), and others of the plurality of synthesized exploration responses 810 can be considered as indicating the contents of those leaf nodes or non-leaf nodes (e.g., what is the title of the technical document 600, what is the heading of a given section, what is the text of a given paragraph, what is the text of a given sentence). Likewise, the one or more instrument identifiers 814 can be considered as indicating the content (and possibly location) of various non-leaf nodes of the document-graph 702 (e.g., of whichever nodes represent scientific instrument identifiers). In some cases, the one or more instrument identifiers 814 can be considered as being applicable to all text blocks of the document-graph 702, and so whatever nodes in the document-graph 702 that represent the one or more instrument identifiers 814 can be positioned so as to be upstream of all of the leaf nodes of the document-graph 702. In other cases, however, the respective intra-document locations of the one or more instrument identifiers 814 can suggest which subsets of those text blocks they are or are not applicable to (e.g., a scientific instrument identifier that is present only in a latter half of the technical document 600 can be considered as not being applicable to whatever text blocks are in the first half of the technical document 600; a scientific instrument identifier that is present at the beginning of a particular section of the technical document 600 can be considered as being applicable to all text blocks that are in that particular section). So whatever nodes in the document-graph 702 that represent the one or more instrument identifiers 814 can be positioned within the document-graph 702 accordingly.

In any case, the search component 320 can generate the document-graph 702 based on the technical document 600.

Figure 9:
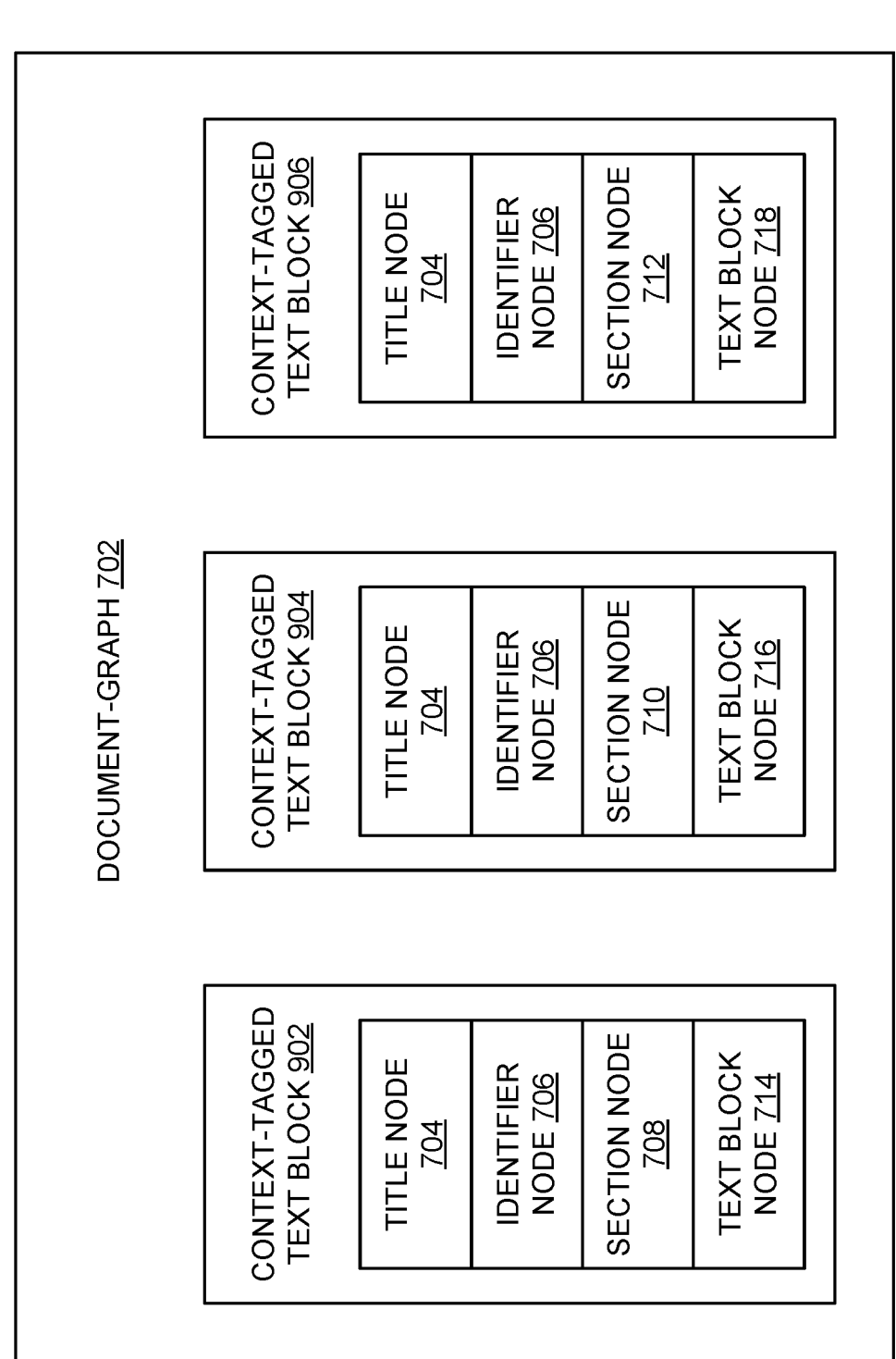

Now, consider FIG. 9. As mentioned above, leaf nodes (e.g., 714-718) can represent respective text blocks of the technical document 600, and non-leaf nodes (e.g., 704-712) can instead represent contextual information that qualifies or modifies respective text blocks. In various cases, which leaf nodes are nested beneath which non-leaf nodes of the document-graph 702 can be considered as linking, mapping, or otherwise tagging text blocks with their respective contextual information. Accordingly, the document-graph 702 can be considered as comprising one respective context-tagged text block for each unique text block.

As a non-limiting example, the text block node 714 is downstream of (e.g., nested beneath) the section node 708, the identifier node 706, and the title node 704. Accordingly, the text block node 714, the section node 708, the identifier node 706, and the title node 704 can all be concatenated or otherwise linked together, thereby yielding a context-tagged text block 902. So, the context-tagged text block 902 can be considered as containing the same content as the text block node 714, in addition to the contents of the section node 708, the identifier node 706, and the title node 704. In other words, the context-tagged text block 902 can be considered as comprising the text indicated by numeral 602, the scientific instrument identifier (e.g., Triplus RSH SMART) that is present in the technical document 600, the text indicated by numeral 604, and the text indicated by numeral 606.

As another non-limiting example, the text block node 716 is downstream of the section node 710, the identifier node 706, and the title node 704. Accordingly, the text block node 716, the section node 710, the identifier node 706, and the title node 704 can all be concatenated or otherwise linked together, thereby yielding a context-tagged text block 904. Thus, the context-tagged text block 904 can be considered as containing the same content as the text block node 716, in addition to the contents of the section node 710, the identifier node 706, and the title node 704. That is, the context-tagged text block 904 can be considered as comprising the text indicated by numeral 602, the scientific instrument identifier that is present in the technical document 600, the text indicated by numeral 608, and the text indicated by numeral 610.

As even another non-limiting example, the text block node 718 is downstream of the section node 712, the identifier node 706, and the title node 704. Accordingly, the text block node 718, the section node 710, the identifier node 706, and the title node 704 can all be concatenated or otherwise linked together, thereby yielding a context-tagged text block 906. So, the context-tagged text block 906 can be considered as containing the same content as the text block node 718, in addition to the contents of the section node 712, the identifier node 706, and the title node 704. That is, the context-tagged text block 906 can be considered as comprising the text indicated by numeral 602, the scientific instrument identifier that is present in the technical document 600, the text indicated by numeral 612, and the text indicated by numeral 614.

Figure 10:
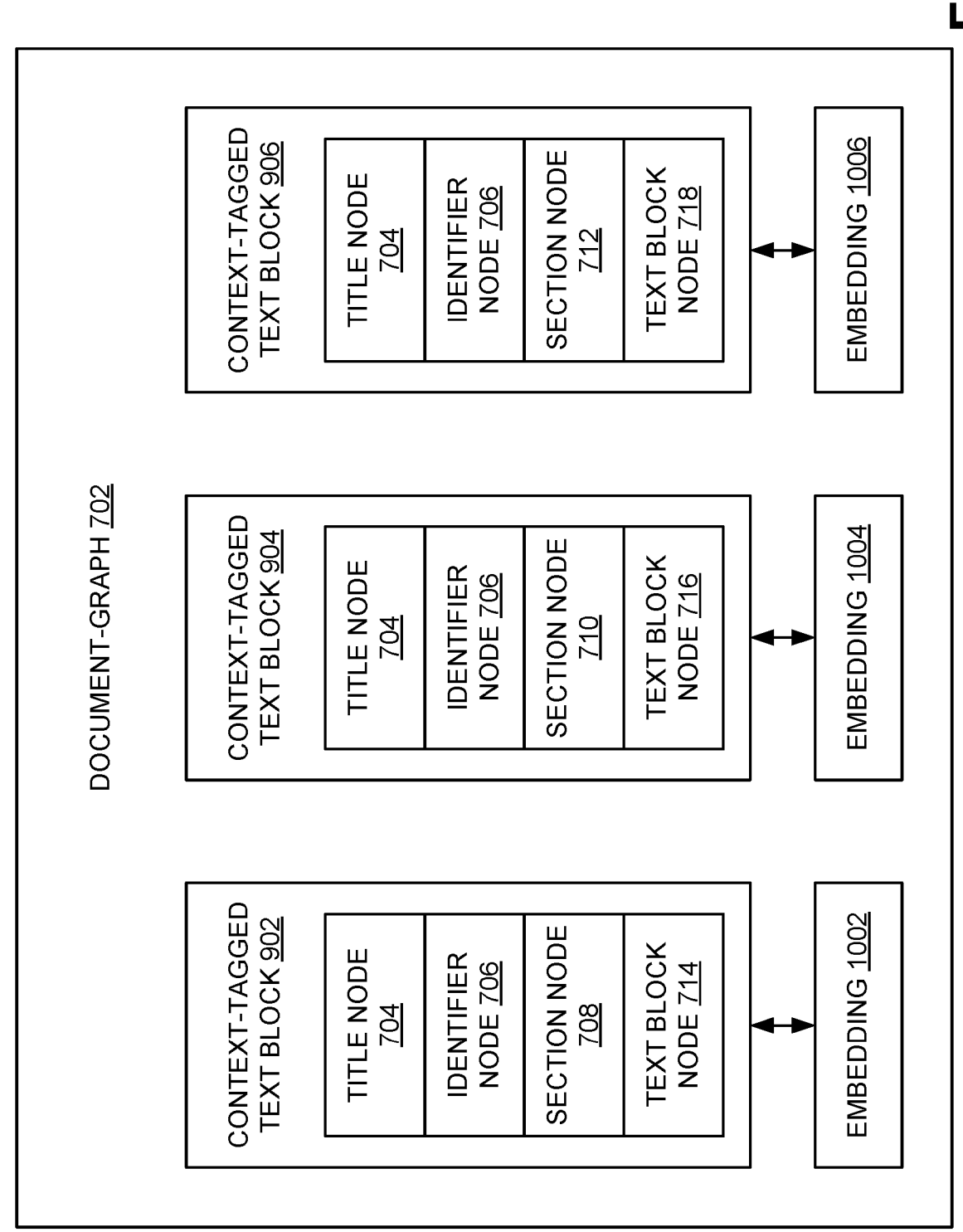

Now, consider FIG. 10. In various aspects, the search component 320 can generate a respective embedding for each context-tagged text block of the document-graph 702, by leveraging the encoder portion 308.

As a non-limiting example, the search component 320 can execute the encoder portion 308 on the context-tagged text block 902, thereby yielding an embedding 1002. That is, the context-tagged text block 902 can complete a forward pass through the input, hidden, and output layers of the encoder portion 308, and the output layer of the encoder portion 308 can produce the embedding 1002, which can be considered as a latent vector representation of the context-tagged text block 902.

As another non-limiting example, the search component 320 can execute the encoder portion 308 on the context-tagged text block 904, thereby yielding an embedding 1004. That is, the context-tagged text block 904 can complete a forward pass through the input, hidden, and output layers of the encoder portion 308, and the output layer of the encoder portion 308 can produce the embedding 1004, which can be considered as a latent vector representation of the context-tagged text block 904.

As still another non-limiting example, the search component 320 can execute the encoder portion 308 on the context-tagged text block 906, thereby yielding an embedding 1006. That is, the context-tagged text block 906 can complete a forward pass through the input, hidden, and output layers of the encoder portion 308, and the output layer of the encoder portion 308 can produce the embedding 1006, which can be considered as a latent vector representation of the context-tagged text block 906.

In this way, the document-graph repository 402 can be created or otherwise stored based on the plurality of technical documents 502.

In various embodiments, the search component 320 can electronically identify the plurality of relevant context-tagged text blocks 404, based on the document-graph repository 402. Non-limiting aspects are described with respect to FIGS. 11-16.

FIGS. 11-16 illustrate example, non-limiting block diagrams showing how the plurality of relevant context-tagged text blocks 404 can be identified using the document-graph repository 402 in accordance with one or more embodiments described herein.

Figure 11:
FIGS. 11-16 illustrate example, non-limiting block diagrams showing how a plurality of relevant context-tagged text blocks can be identified using a document-graph repository in accordance with one or more embodiments described herein.

First, consider FIG. 11. In various embodiments, the search component 320 can electronically perform a search through the document-graph repository 402, and such search can uncover or otherwise identify a plurality of potentially-relevant context-tagged text blocks 1102.

In some instances, such search can be an embedding search. That is, the search component 320 can execute the encoder portion 308 on the plain text question 304, thereby yielding an embedding (e.g., a latent vector representation) for the plain text question 304, and the search component 320 can search for context-tagged text blocks in the document-graph repository 402 whose embeddings are within any suitable threshold margin of similarity (e.g., in terms of Euclidean distance or cosine similarity) of the embedding of the plain text question 304. In such case, any context-tagged text block whose embedding differs from that of the plain text question 304 by less than that threshold margin of similarity can be considered or otherwise deemed to be potentially-relevant to the plain text question.

In other instances, however, such search can instead be a keyword search. That is, the search component 320 can identify one or more keywords within the plain text question 304 (e.g., via execution of the named entity recognition neural network 812 or any other named entity extraction tool), and the search component 320 can search for context-tagged text blocks in the document-graph repository 402 that recite or otherwise contain those same one or more keywords. In such case, any context-tagged text block that contains at least one of the one or more keywords that are in the plain text question 304 can be considered or otherwise deemed to be potentially-relevant to the plain text question.

In yet other instances, the search component 320 can utilize both an embedding search and a keyword search with respect to the plain text question 304. Indeed, in some instances, the search component 320 can utilize any other suitable types of search techniques.

In any case, such searching can uncover or reveal the plurality of potentially-relevant context-tagged text blocks 1102. In various aspects, as shown, the plurality of potentially-relevant context-tagged text blocks 1102 can have a cardinality of q, for any suitable positive integer $1<q<\Sigma_{i=1}^{n}p_i$.

In various embodiments, due to the above-mentioned difficulties that scientific instrument identifiers present for embedding searches and keyword searches, it is possible that the searching performed by the search component 320 can miss or otherwise fail to uncover some context-tagged text blocks that are nevertheless potentially-relevant with respect to the plain text question 304. In various aspects, the problem of such missed text blocks can be ameliorated by adjacent text block composition. Non-limiting aspects are described with respect to FIGS. 12-13.

Figure 12:

Consider FIG. 12. In various instances, there can be a potentially-relevant context-tagged text block 1202. In various cases, the potentially-relevant context-tagged text block 1202 can be any of the plurality of potentially-relevant context-tagged text blocks 1102. In various aspects, the potentially-relevant context-tagged text block 1202 can be located in a document-graph 1204, which can be any of the plurality of document-graphs 504. In various instances, the potentially-relevant context-tagged text block 1202 can be made up of one leaf node and one or more non-leaf nodes of the document-graph 1204, where that one leaf node can represent some specific text block, and where those one or more non-leaf nodes can represent respective contextual information that qualifies that specific text block. In various cases, there can be other leaf nodes, and thus other text blocks, within the document-graph 1204. In various aspects, some of those other text blocks can be separated from the specific text block by a smaller number of intervening levels, intervening branches, or intervening nodes of the document-graph 1204 (e.g., intra-graph paths that couple the specific text block to those other text blocks can be shorter in length). Such other text blocks can thus be considered as being near, close, or more adjacent to the specific text block. However, some of those other text blocks can instead be separated from the specific text block by a larger number of intervening levels, intervening branches, or intervening nodes of the document-graph 1204 (e.g., intra-graph paths that couple the specific text block to those other text blocks can be longer in length). So, such other text blocks can instead be considered as being far from or less adjacent to the specific text block.

In various aspects, the search component 320 can generate a composed context-tagged text block 1206, by iteratively performing graph-walking and embedding-change comparison with respect to the potentially-relevant context-tagged text block 1202. More specifically, as mentioned above, the potentially-relevant context-tagged text block 1202 can include one leaf node that represents a specific text block within the document-graph 1204. In various instances, the search component 320 can traverse or walk along the edges of the document-graph 1204 so as to identify whichever other text block (e.g., other leaf node) within the document-graph 1204 is nearest or most adjacent to that specific text block (e.g., is separated from that specific text block by a minimum number of intervening levels, branches, or nodes). Note that, in some cases, two or more other text blocks might be equidistant from the specific text block. In such situations, the search component 320 can select randomly (or via any other suitable order of priority) from among those two or more other text blocks. In any case, the search component 320 can identify a nearest or most adjacent text block based on the specific text block. In various aspects, the search component 320 can concatenate, aggregate, combine, or otherwise compose that nearest or most adjacent text block with the specific text block, with all of the contextual information (e.g., non-leaf nodes) that is upstream of the specific text block, and with all of the contextual information that is upstream of that nearest or most adjacent text block. Such concatenation can be referred to as the composed context-tagged text block 1206. Furthermore, the search component 320 can generate an embedding for the composed context-tagged text block 1206, by passing the composed context-tagged text block 1206 through the encoder portion 308.

Now, suppose that the composed context-tagged text block 1206 is not so large as to exceed any token limits of the LLM 306, and also suppose that the embedding of the composed context-tagged text block 1206 differs (e.g., in terms of Euclidean distance or cosine similarity) by less than any suitable threshold margin from whatever embedding corresponds to the potentially-relevant context-tagged text block 1202. In such case, the composed context-tagged text block 1206 can be considered as containing more information than the potentially-relevant context-tagged text block 1202 while simultaneously having sufficiently similar semantic meaning as the potentially-relevant context-tagged text block 1202. Thus, the composed context-tagged text block 1206 can be considered as a better or more useful version of the potentially-relevant context-tagged text block 1202. So, the search component 320 can, in its follow-on actions described herein, replace the potentially-relevant context-tagged text block 1202 with the composed context-tagged text block 1206. In other words, the potentially-relevant context-tagged text block 1202 can have been identified in an effort to automatically answer the plain text question 304, but the composed context-tagged text block 1206 can be utilized instead of the potentially-relevant context-tagged text block 1202 in that effort to automatically answer the plain text question 304.

On the other hand, suppose that the composed context-tagged text block 1206 is so large as to exceed any token limits of the LLM 306, or suppose that the embedding of the composed context-tagged text block 1206 differs by more than any suitable threshold margin from whatever embedding corresponds to the potentially-relevant context-tagged text block 1202. In such case, the composed context-tagged text block 1206 can be considered either as being too big for the LLM 306 or as having too different a semantic meaning than the potentially-relevant context-tagged text block 1202. So, the search component 320 can, in its follow-on actions described herein, disregard the composed context-tagged text block 1206.

In some cases, the search component 320 can perform multiple rounds or iterations of graph-walking and embedding-change comparison, stopping at the most recently generated composed context-tagged text block that is not too big for the LLM 306 and that has an embedding that is not too different from that of the potentially-relevant context-tagged text block 1202.

In various aspects, text block composition as described herein can be considered as a technique or mechanism for capturing potentially-relevant semantic content from the document-graph repository 402 at different scopes or different levels of granularity. As a non-limiting example, suppose that, prior to composition, text blocks can represent individual sentences, which can be considered as very granular. In such case, a composed text block can represent a paragraph of sentences, which can be considered as less granular. Continuing such composition can yield a composed text block that represents a collection of paragraphs, which can be less granular still. Continuing such composition even more can yield a composed text block that represents whole sections of a document, which can be even less granular. In this way, multiple levels or scopes of semantic content can be captured by implementing context-tagged text block composition as described herein.

Figure 13:
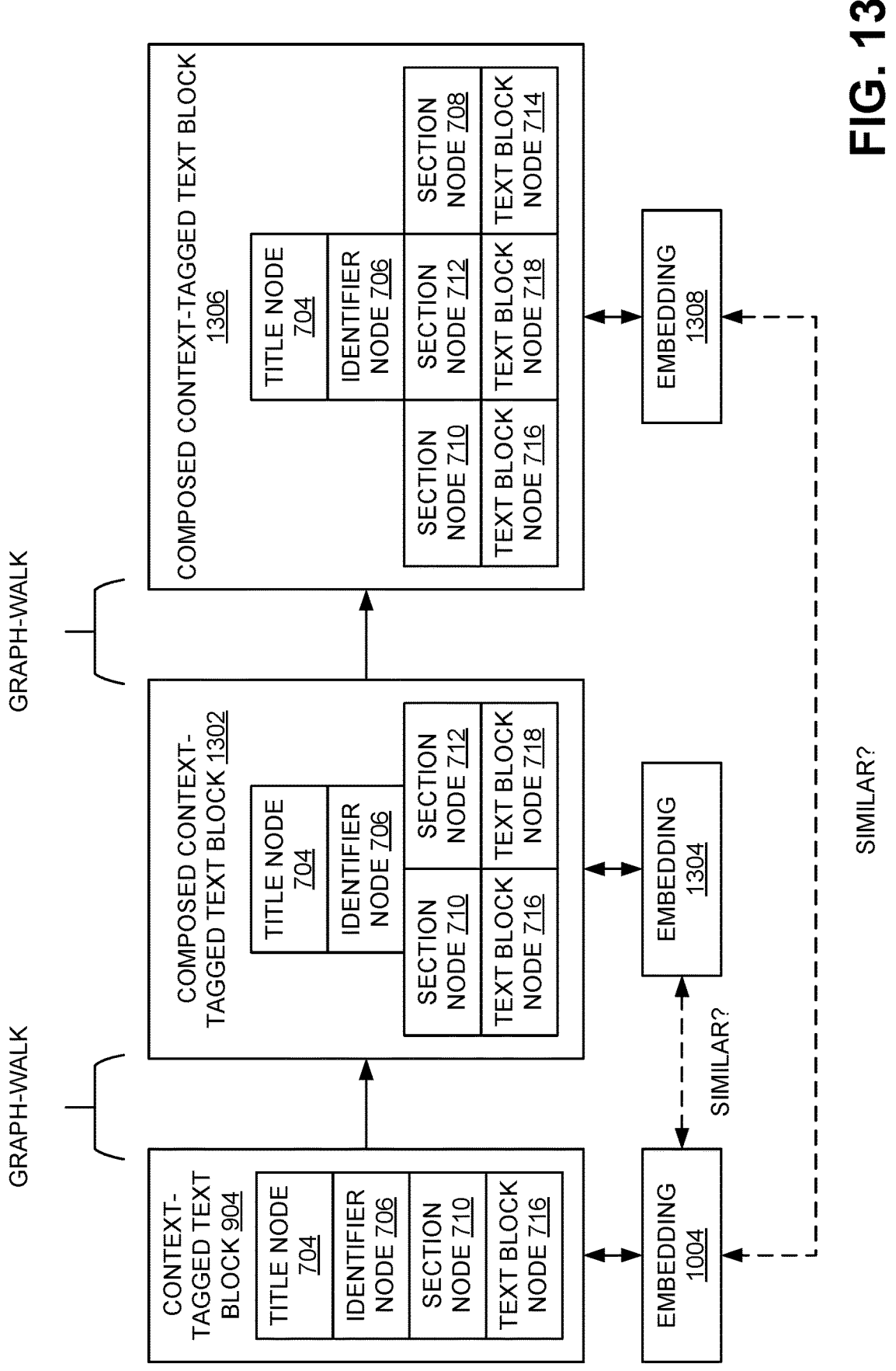

For clarification, consider the non-limiting example shown in FIG. 13. As explained above with respect to FIGS. 6-10, the context-tagged text block 904 can be based on the text block node 716 and can correspond to the embedding 1004. In various aspects, the search component 320 can traverse or walk the document-graph 702, so as to identify a text block node that is nearest or most adjacent to the text block node 716. In these non-limiting examples, the text block nodes 714 and 718 can be considered as being equidistant from the text block node 716 (e.g., in terms of intra-graph path length or number of intervening nodes). So, one of those two text block nodes can be chosen at random. Suppose that the text block node 718 is chosen as being nearest or most adjacent to the text block node 716. In such case, the search component 320 can generate a composed context-tagged text block 1302, by combining the text block node 716 and its upstream non-leaf nodes with the text block node 718 and its upstream non-leaf nodes. Thus, the composed context-tagged text block 1302 can comprise: the text block node 716; the text block node 718; the title node 704 (e.g., which is upstream of both the text block node 716 and the text block node 718); the identifier node 706 (e.g., which is upstream of both the text block node 716 and the text block node 718); the section node 710 (e.g., which is upstream of the text block node 716); and the section node 712 (e.g., which is upstream of the text block node 718). The search component 320 can execute the encoder portion 308 on the composed context-tagged text block 1302, thereby yielding an embedding 1304 (e.g., a latent vector representation of the composed context-tagged text block 1302), and the search component 320 can compare the embedding 1004 with the embedding 1304. If the embedding 1304 and the embedding 1004 differ by more than a threshold margin (or if the composed context-tagged text block 1302 exceeds a token limit of the LLM 306), then the composed context-tagged text block 1302 can be disregarded, and the search component 320 can proceed with the context-tagged text block 904. Instead, if the embedding 1304 and the embedding 1004 differ by less than a threshold margin (and if the composed context-tagged text block 1302 does not exceed a token limit of the LLM 306), then the context-tagged text block 904 can be disregarded, and the search component 320 can instead proceed with the composed context-tagged text block 1302.

In some cases, if the embedding 1304 and the embedding 1004 differ by less than a threshold margin (and if the composed context-tagged text block 1302 does not exceed a token limit of the LLM 306), then another iteration of graph-walking and embedding-change comparison can be performed. In particular, the search component 320 can traverse or walk the document-graph 702, so as to identify the next-nearest or next-most-adjacent text block node with respect to the text block node 716. In these non-limiting examples, that next-nearest or next-most-adjacent text block node can be the text block node 714. So, the search component 320 can generate a composed context-tagged text block 1306, by combining all the nodes of the composed context-tagged text block 1302 with the text block node 714 and its upstream non-leaf nodes. Thus, the composed context-tagged text block 1306 can comprise: the text block nodes 714-718; the title node 704 (e.g., which is upstream of all of the text block nodes 714-718); the identifier node 706 (e.g., which is upstream of all of the text block nodes 714-718); the section node 710 (e.g., which is upstream of the text block node 716); the section node 712 (e.g., which is upstream of the text block node 718); and the section node 708 (e.g., which is upstream of the text block node 714). The search component 320 can execute the encoder portion 308 on the composed context-tagged text block 1306, thereby yielding an embedding 1308 (e.g., a latent vector representation of the composed context-tagged text block 1306), and the search component 320 can compare the embedding 1004 with the embedding 1308. If the embedding 1308 and the embedding 1004 differ by more than a threshold margin (or if the composed context-tagged text block 1306 exceeds a token limit of the LLM 306), then the composed context-tagged text block 1306 can be disregarded, and the search component 320 can proceed with the composed context-tagged text block 1302. Instead, if the embedding 1308 and the embedding 1004 differ by less than a threshold margin (and if the composed context-tagged text block 1306 does not exceed a token limit of the LLM 306), then the composed context-tagged text block 1302 can be disregarded, and the search component 320 can instead proceed with the composed context-tagged text block 1306.

In any case, adjacent text block composition via iterative graph-walking and embedding-change comparison can be considered as helping to catch potentially-relevant text blocks that may have escaped or otherwise not been caught by the initial embedding or keyword searches performed by the search component 320.

In various embodiments, the search component 320 can identify the plurality of relevant context-tagged text blocks 404, by re-ranking the plurality of potentially-relevant context-tagged text blocks 1102 (or adjacent compositions thereof). Non-limiting aspects are described with respect to FIGS. 14-16.

Figure 14:
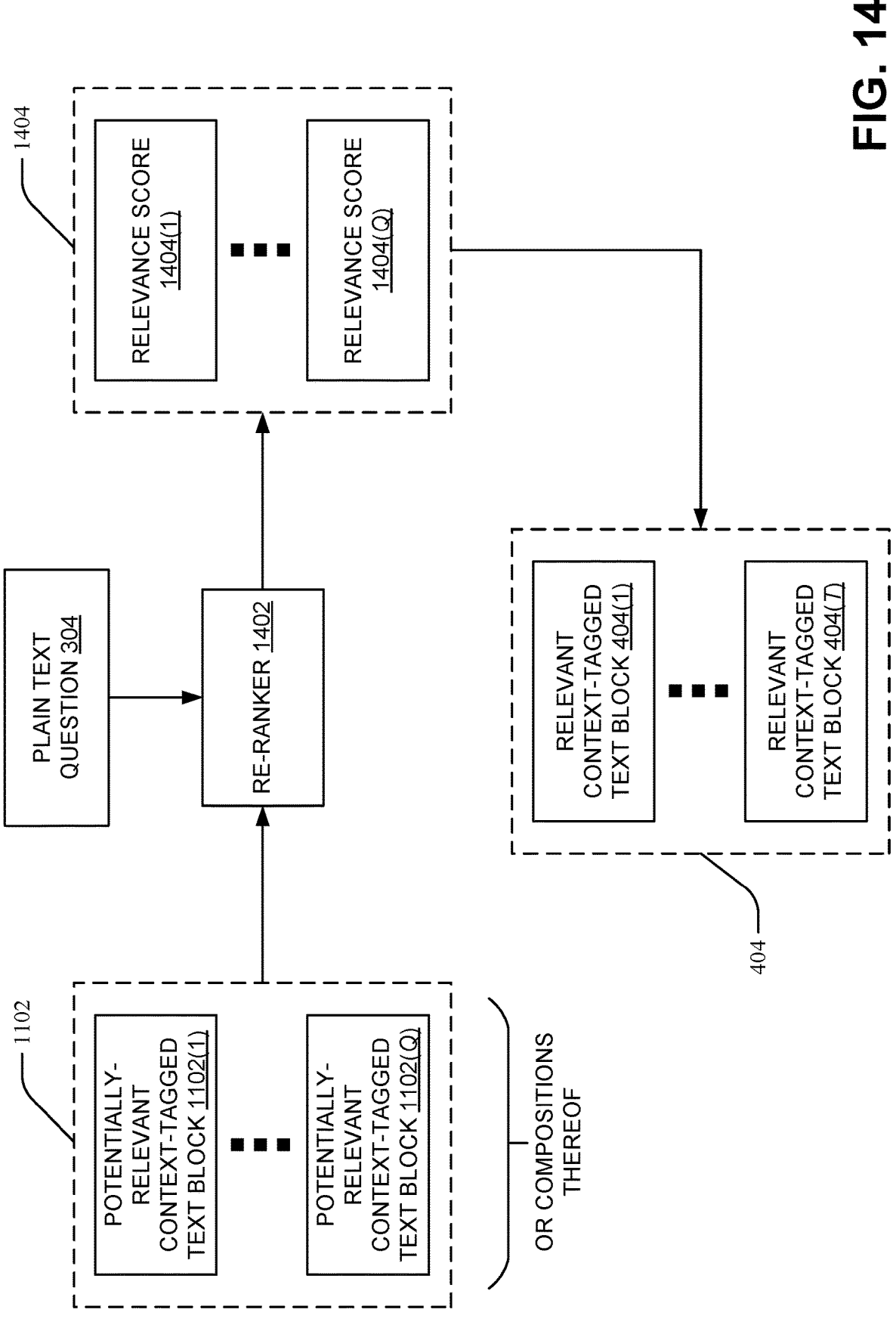

First, consider FIG. 14. In various embodiments, the search component 320 can electronically store, electronically maintain, electronically control, or otherwise electronically access a re-ranker 1402. In various aspects, the re-ranker 1402 can exhibit any suitable deep learning internal architecture. Indeed, in various cases, the re-ranker 1402 can have an input layer, one or more hidden layers, and an output layer. In various instances, any of such layers can be coupled together by any suitable interneuron connections or inter-layer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. As yet another example, any of such input layer, one or more hidden layers, or output layer can be transformer layers, whose learnable or trainable parameters can be single-head or multi-head attention blocks or other weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers. As a non-limiting example, the re-ranker 1402 can be a cross-encoder based on bi-directional encoder representations from transformers (BERT).

Regardless of the specific internal architecture (e.g., the specific numbers, types, or organizations of layers) that is implemented within the re-ranker 1402, the re-ranker 1402 can be configured to receive two collections of inputted text and to produce as output a score that indicates how relevant or irrelevant those two collections of inputted text are with respect to each other. So, in various aspects, the search component 320 can execute the re-ranker 1402 on the plain text question 304 and on each of the plurality of potentially-relevant context-tagged texts blocks 1102 (or adjacent compositions thereof), and such execution can cause the re-ranker 1402 to produce a plurality of relevance scores 1404.

As a non-limiting example, the search component 320 can execute the re-ranker 1402 on both the plain text question 304 and the potentially-relevant context-tagged text block 1102(1) (or on an adjacent composition derived from the potentially-relevant context-tagged text block 1102(1)), and such execution can yield a relevance score 1404(1). More specifically, the search component 320 can concatenate the plain text question 304 with the potentially-relevant context-tagged text block 1102(1) (or with the adjacent composition derived from the potentially-relevant context-tagged text block 1102(1)), the search component 320 can feed or route that concatenation to the input layer of the re-ranker 1402, that concatenation can complete a forward pass through the one or more hidden layers of the re-ranker 1402, and the output layer of the re-ranker 1402 can compute or otherwise calculate the relevance score 1404(1) based on activation maps or feature maps provided by the one or more hidden layers of the re-ranker 1402. In any case, the relevance score 1404(1) can be a real-valued scalar whose magnitude indicates how much relevance the potentially-relevant context-tagged text block 1102(1) has with respect to the plain text question 304 (e.g., a magnitude closer to 0 can indicate less relevance, whereas a magnitude closer to 1 can indicate more relevance).

As another non-limiting example, the search component 320 can execute the re-ranker 1402 on both the plain text question 304 and the potentially-relevant context-tagged text block 1102(q) (or on an adjacent composition derived from the potentially-relevant context-tagged text block 1102(q)), and such execution can yield a relevance score 1404(q). In particular, the search component 320 can concatenate the plain text question 304 with the potentially-relevant context-tagged text block 1102(q) (or with the adjacent composition derived from the potentially-relevant context-tagged text block $1102(q)$), the search component 320 can feed or route that concatenation to the input layer of the re-ranker 1402, that concatenation can complete a forward pass through the one or more hidden layers of the re-ranker 1402, and the output layer of the re-ranker 1402 can compute or otherwise calculate the relevance score $1404(q)$ based on activation maps or feature maps provided by the one or more hidden layers of the re-ranker 1402. In any case, the relevance score $1404(q)$ can be a real-valued scalar whose magnitude indicates how much relevance the potentially-relevant context-tagged text block $1102(q)$ has with respect to the plain text question 304.

Note that the relevance score 1404(1) to the relevance score $1404(q)$ can collectively be considered as forming the plurality of relevance scores 1404.

In any case, the plurality of relevant context-tagged text blocks 404 can be a highest relevance-scoring or top relevance-scoring subset of the plurality of potentially-relevant context-tagged text blocks 1102. For instance, the plurality of relevant context-tagged text blocks 404 can have a cardinality of t, for any suitable positive integer t<q: a relevant context-tagged text block 404(1) to a relevant context-tagged text block $404(t)$. In various cases, the relevant context-tagged text block 404(1) can be whichever of the plurality of potentially-relevant context-tagged text blocks 1102 has a highest relevance score, whereas the relevant context-tagged text block $404(t)$ can be whichever of the plurality of potentially-relevant context-tagged text blocks 1102 has a t-th highest relevance score.

In some embodiments, the search component 320 can implement chain-of-thought prompting, so as to improve the performance of the re-ranker 1402. Non-limiting aspects are described with respect to FIGS. 15-16.

Figure 15:
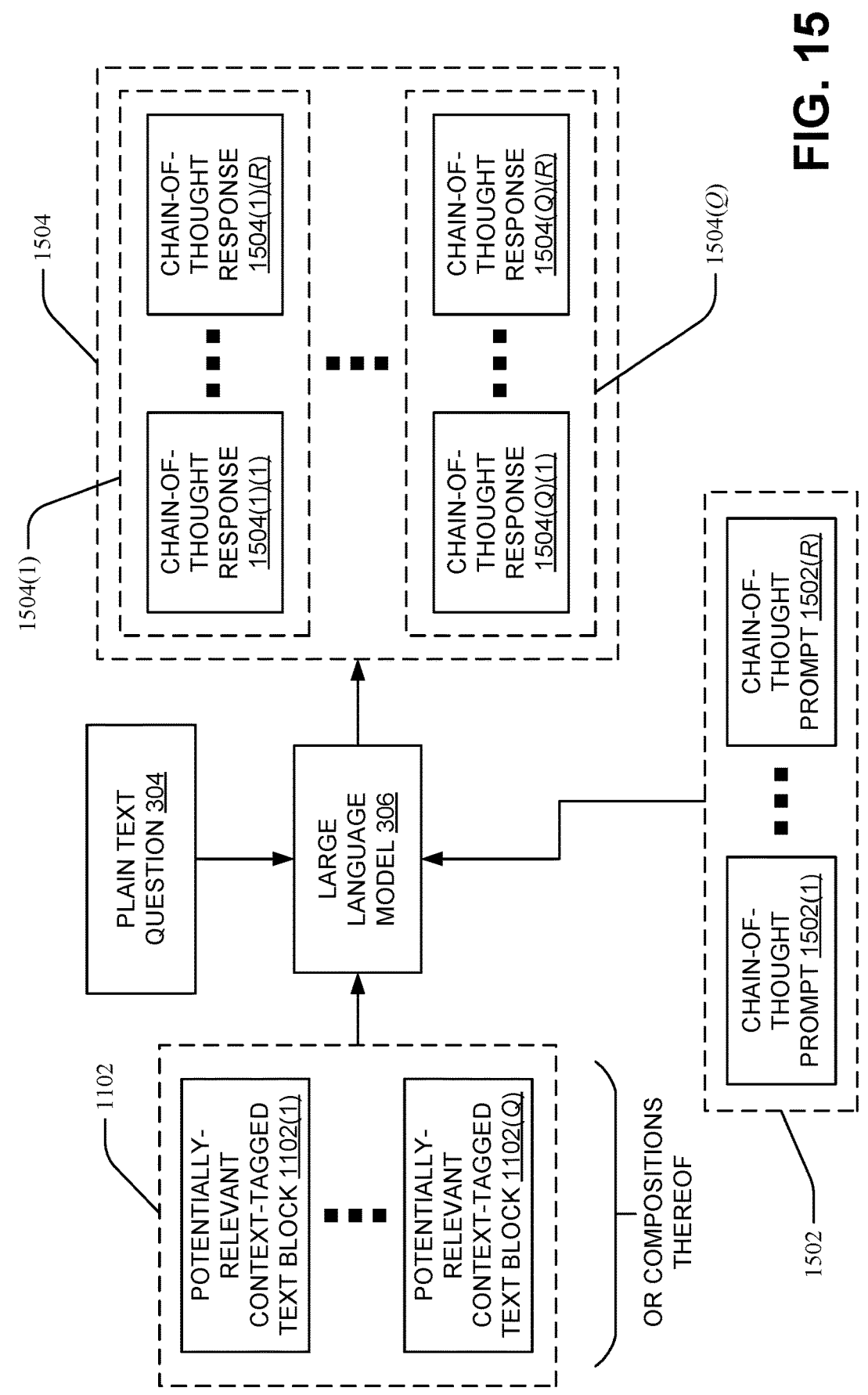

First, consider FIG. 15. In various embodiments, the search component 320 can electronically store, electronically maintain, or otherwise electronically access a plurality of chain-of-thought prompts 1502. In various aspects, the plurality of chain-of-thought prompts 1502 can comprise r prompts, for any suitable positive integer r>1: a chain-of-thought prompt 1502(1) to a chain-of-thought prompt 1502(r). In various instances, each of the plurality of chain-of-thought prompts 1502 can be one or more unstructured or natural language sentences that request or command that some substantive or semantic relationship between the plain text question 304 and a given potentially-relevant context-tagged text block be identified. As a non-limiting example, for a given potentially-relevant context-tagged text block, a chain-of-thought prompt can be: "Answer the plain text question 304 using only the given potentially-relevant context-tagged text block?". As another non-limiting example, for a given potentially-relevant context-tagged text block, a chain-of-thought prompt can be: "Does the given potentially-relevant context-tagged text block contain enough information to fully answer the plain text question 304?". As yet another non-limiting example, for any given potentially-relevant context-tagged text block, a chain-of-thought prompt can be: "What information that would be needed to fully answer the plain text question 304 is missing from the given potentially-relevant context-tagged text block?".

In any case, the search component 320 can execute the LLM 306 on the plain text question 304, on each of the plurality of potentially-relevant context-tagged text blocks 1102, and on each of the plurality of chain-of-thought prompts 1502, thereby yielding a plurality of chain-of-thought responses 1504.

As a non-limiting example, the search component 320 can execute the LLM 306 on the plain text question 304, on the potentially-relevant context-tagged text block 1102(1) (or an adjacent composition thereof), and on the chain-of-thought prompt 1502(1), and such execution can yield a chain-of-thought response 1504(1)(1). More specifically, the search component 320 can concatenate the plain text question 304 with the potentially-relevant context-tagged text block 1102 (1) and with the chain-of-thought prompt 1502(1), that concatenation can complete a forward pass through the LLM 306 (e.g., through the encoder portion 308 and the synthesizer portion 310), and the LLM 306 can compute or calculate the chain-of-thought response 1504(1)(1) based on whatever activation maps or feature maps were internally generated by the LLM 306 during such forward pass. In any case, the chain-of-thought response 1504(1)(1) can be one or more unstructured or natural language sentences or sentence fragments that substantively identify whatever piece of information about the semantic relationship between the potentially-relevant context-tagged text block 1102(1) and the plain text question 304 was requested or demanded by the chain-of-thought prompt 1502(1). For instance, if the chain-of-thought prompt 1502(1) asks for the plain text question 304 to be answered based only the potentially-relevant context-tagged text block 1102(1), then the chain-of-thought response 1504(1)(1) can be synthesized text that relays or conveys or otherwise is that answer (e.g., can be whatever the LLM 306 thinks, determines, or infers is the answer to the plain text question 304 based only on the information contained in the potentially-relevant context-tagged text block 1102(1)).

As another non-limiting example, the search component 320 can execute the LLM 306 on the plain text question 304, the potentially-relevant context-tagged text block 1102(1) (or an adjacent composition thereof), and the chain-of-thought prompt 1502(r), and such execution can yield a chain-of-thought response 1504(1)(r). More specifically, the search component 320 can concatenate the plain text question 304 with the potentially-relevant context-tagged text block 1102(1) and with the chain-of-thought prompt 1502 (r), that concatenation can complete a forward pass through the LLM 306, and the LLM 306 can compute or calculate the chain-of-thought response 1504(1)(r) based on whatever activation maps or feature maps were internally generated by the LLM 306 during such forward pass. In any case, the chain-of-thought response 1504(1)(r) can be one or more unstructured or natural language sentences or sentence fragments that substantively identify whatever piece of information about the semantic relationship between the potentially-relevant context-tagged text block 1102(1) and the plain text question 304 was requested or demanded by the chain-of-thought prompt 1502(r). For instance, if the chain-of-thought prompt 1502(r) asks what information is needed to answer the plain text question 304 but is missing from the potentially-relevant context-tagged text block 1102(1), then the chain-of-thought response 1504(1)(r) can be synthesized text that relays or conveys or otherwise is that needed-but-missing information (e.g., can be whatever the LLM 306 thinks, determines, or infers is the information that is needed to answer the plain text question 304 but that is missing from the potentially-relevant context-tagged text block 1102(1)).

In various cases, the chain-of-thought response 1504(1) (1) to the chain-of-thought response 1504(1)(r) can collectively be considered as a plurality of chain-of-thought responses 1504(1), all of which can be considered as corresponding to the potentially-relevant context-tagged text block 1102(1).

As yet another non-limiting example, the search component 320 can execute the LLM 306 on the plain text question 304, the potentially-relevant context-tagged text block 1102 ($q$) (or an adjacent composition thereof), and the chain-of-thought prompt 1502(1), and such execution can yield a chain-of-thought response 1504($q$)(1). More specifically, the search component 320 can concatenate the plain text question 304 with the potentially-relevant context-tagged text block 1102($q$) and with the chain-of-thought prompt 1502 (1), that concatenation can complete a forward pass through the LLM 306, and the LLM 306 can compute or calculate the chain-of-thought response 1504($q$)(1) based on whatever activation maps or feature maps were internally generated by the LLM 306 during such forward pass. In any case, the chain-of-thought response 1504($q$)(1) can be one or more unstructured or natural language sentences or sentence fragments that substantively identify whatever piece of information about the semantic relationship between the potentially-relevant context-tagged text block 1102($q$) and the plain text question 304 was requested or demanded by the chain-of-thought prompt 1502(1).

As still another non-limiting example, the search component 320 can execute the LLM 306 on the plain text question 304, on the potentially-relevant context-tagged text block 1102($q$) (or an adjacent composition thereof), and on the chain-of-thought prompt 1502($r$), and such execution can yield a chain-of-thought response 1504($q$)($r$). More specifically, the search component 320 can concatenate the plain text question 304 with the potentially-relevant context-tagged text block 1102($q$) and with the chain-of-thought prompt 1502($r$), that concatenation can complete a forward pass through the LLM 306, and the LLM 306 can compute or calculate the chain-of-thought response 1504($q$)($r$) based on whatever activation maps or feature maps were internally generated by the LLM 306 during such forward pass. In any case, the chain-of-thought response 1504($q$)($r$) can be one or more unstructured or natural language sentences or sentence fragments that substantively identify whatever piece of information about the semantic relationship between the potentially-relevant context-tagged text block 1102($q$) and the plain text question 304 was requested or demanded by the chain-of-thought prompt 1502($r$).

In various cases, the chain-of-thought response 1504($q$) (1) to the chain-of-thought response 1504($q$)($r$) can collectively be considered as a plurality of chain-of-thought responses 1504($q$), all of which can be considered as corresponding to the potentially-relevant context-tagged text block 1102($q$).

In various instances, the plurality of chain-of-thought responses 1504(1) to the plurality of chain-of-thought responses 1504($q$) can be considered as collectively forming the plurality of chain-of-thought responses 1504.

Figure 16:
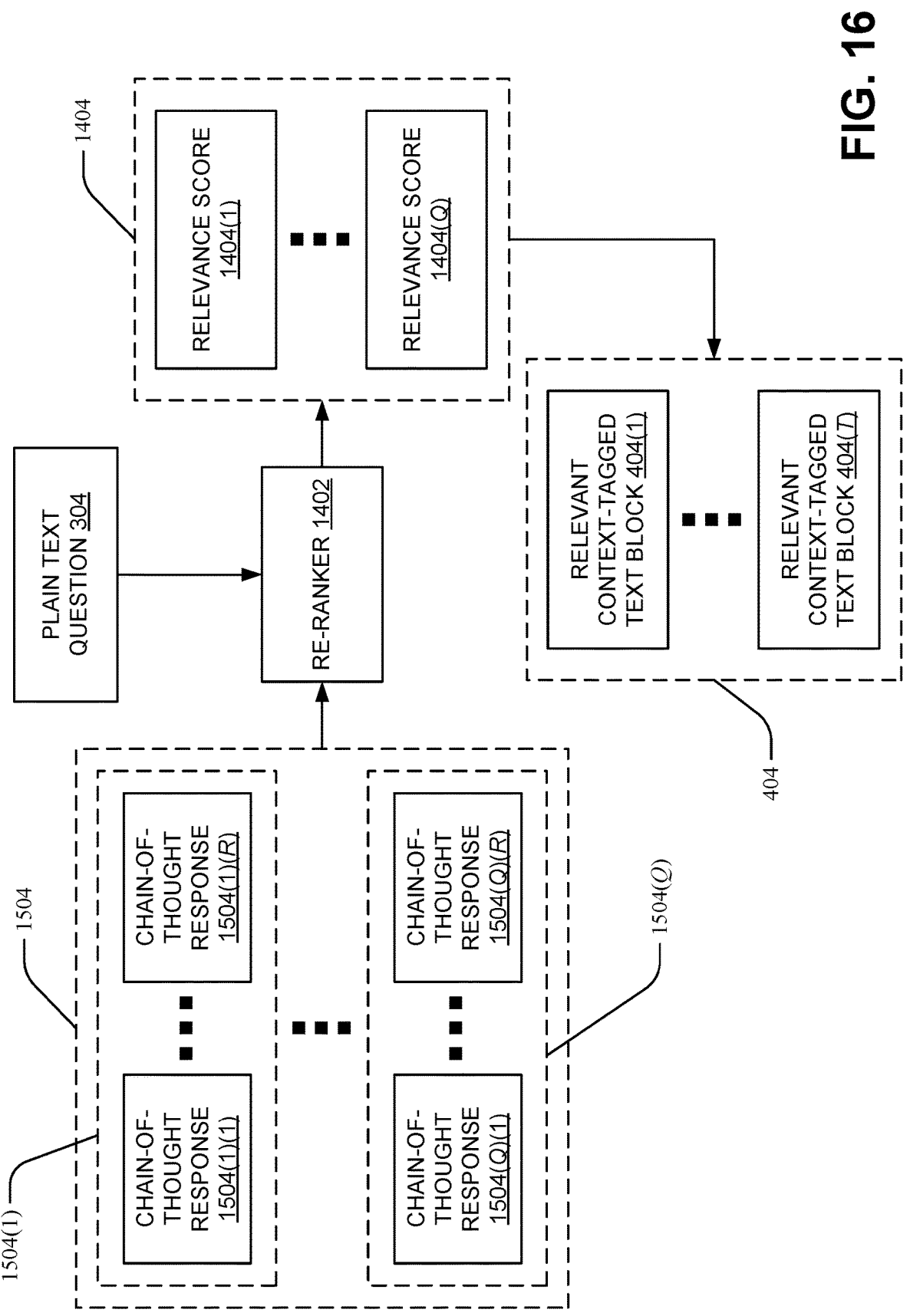

Now, consider FIG. 16. As mentioned above, the re-ranker 1402 can be configured to receive two collections of inputted text and to produce as output a score that indicates how relevant or irrelevant those two collections of inputted text are with respect to each other. So, in various aspects, the search component 320 can execute the re-ranker 1402 on the plain text question 304 and on respective sets of the plurality of chain-of-thought responses 1504, and such execution can cause the re-ranker 1402 to produce the plurality of relevance scores 1404.

As a non-limiting example, the search component 320 can execute the re-ranker 1402 on both the plain text question 304 and the plurality of chain-of-thought responses 1504(1) (as well as, in some cases, the potentially-relevant context-tagged text block 1102(1) or an adjacent composition thereof), and such execution can yield the relevance score 1404(1). More specifically, the search component 320 can concatenate the plain text question 304 with the plurality of chain-of-thought responses 1504(1) (and also possibly with the potentially-relevant context-tagged text block 1102(1)), the search component 320 can feed or route that concatenation to the input layer of the re-ranker 1402, that concatenation can complete a forward pass through the one or more hidden layers of the re-ranker 1402, and the output layer of the re-ranker 1402 can compute or otherwise calculate the relevance score 1404(1) based on activation maps or feature maps provided by the one or more hidden layers of the re-ranker 1402. In such cases, the plurality of chain-of-thought responses 1504(1) can be considered as deeper, richer, or otherwise supplemental information that fleshes out or illuminates the semantic relationship between the plain text question 304 and the potentially-relevant context-tagged text block 1102(1). Such deeper, richer, or otherwise supplemental information can be considered as enabling the re-ranker to generate the relevance score 1404(1) in a more informed, and thus more accurate, way.

As another non-limiting example, the search component 320 can execute the re-ranker 1402 on both the plain text question 304 and the plurality of chain-of-thought responses 1504($q$) (as well as, in some cases, the potentially-relevant context-tagged text block 1102($q$) or an adjacent composition thereof), and such execution can yield the relevance score 1404($q$). More specifically, the search component 320 can concatenate the plain text question 304 with the plurality of chain-of-thought responses 1504($q$) (and also possibly with the potentially-relevant context-tagged text block 1102 ($q$)), the search component 320 can feed or route that concatenation to the input layer of the re-ranker 1402, that concatenation can complete a forward pass through the one or more hidden layers of the re-ranker 1402, and the output layer of the re-ranker 1402 can compute or otherwise calculate the relevance score 1404($q$) based on activation maps or feature maps provided by the one or more hidden layers of the re-ranker 1402. As above, the plurality of chain-of-thought responses 1504($q$) can be considered as deeper, richer, or otherwise supplemental information that fleshes out or illuminates the semantic relationship between the plain text question 304 and the potentially-relevant context-tagged text block 1102($q$). Such deeper, richer, or otherwise supplemental information can be considered as enabling the re-ranker to generate the relevance score 1404 ($q$) in a more informed, and thus more accurate, way.

As above, the plurality of relevant context-tagged text blocks 404 can be identified from the plurality of potentially-relevant context-tagged text blocks 1102, based on the plurality of relevance scores 1404.

In some embodiments, the search component 320 can determine whether or not the plain text question 304 explicitly recites or otherwise contains any scientific instrument identifiers. In various cases, the search component 320 can accomplish this determination by executing the named entity recognition neural network 812 on the plain text question 304.

In response to determining that the plain text question 304 does explicitly recite or otherwise include one or more scientific instrument identifiers, the search component 320 can bias (or can cause the re-ranker 1402 to bias) the plurality of relevance scores 404 toward whichever of the plurality of potentially-relevant context-tagged text blocks 1102 that were uncovered or found using a keyword search and away from whichever of the plurality of potentially-relevant context-tagged text blocks 1102 that were uncovered or found using an embedding search. In various cases, the search component 320 can accomplish this by scaling upward by any suitable margin the relevance scores of whichever of the plurality of potentially-relevant context-tagged text blocks 1102 that were uncovered or found using a keyword search, or by scaling downward by any suitable margin the relevance scores of whichever of the plurality of potentially-relevant context-tagged text blocks 1102 that were uncovered or found using an embedding search.

Conversely, in response to determining that the plain text question 304 does not explicitly recite or otherwise include one or more scientific instrument identifiers, the search component 320 can bias (or can cause the re-ranker 1402 to bias) the plurality of relevance scores 404 toward whichever of the plurality of potentially-relevant context-tagged text blocks 1102 that were uncovered or found using an embedding search and away from whichever of the plurality of potentially-relevant context-tagged text blocks 1102 that were uncovered or found using a keyword search. In various cases, the search component 320 can accomplish this by scaling upward by any suitable margin the relevance scores of whichever of the plurality of potentially-relevant context-tagged text blocks 1102 that were uncovered or found using an embedding search, or by scaling downward by any suitable margin the relevance scores of whichever of the plurality of potentially-relevant context-tagged text blocks 1102 that were uncovered or found using a keyword search.

In any case, such biasing can be considered as yet another way to help overcome the difficulties that scientific instrument identifiers pose for embedding searches and keyword searches (e.g., if scientific instrument identifiers are found in the plain text question 304, then rely more on the keyword search results; instead, if scientific instrument identifiers are not found in the plain text question 304, then rely more on the embedding search results).

Figure 17:
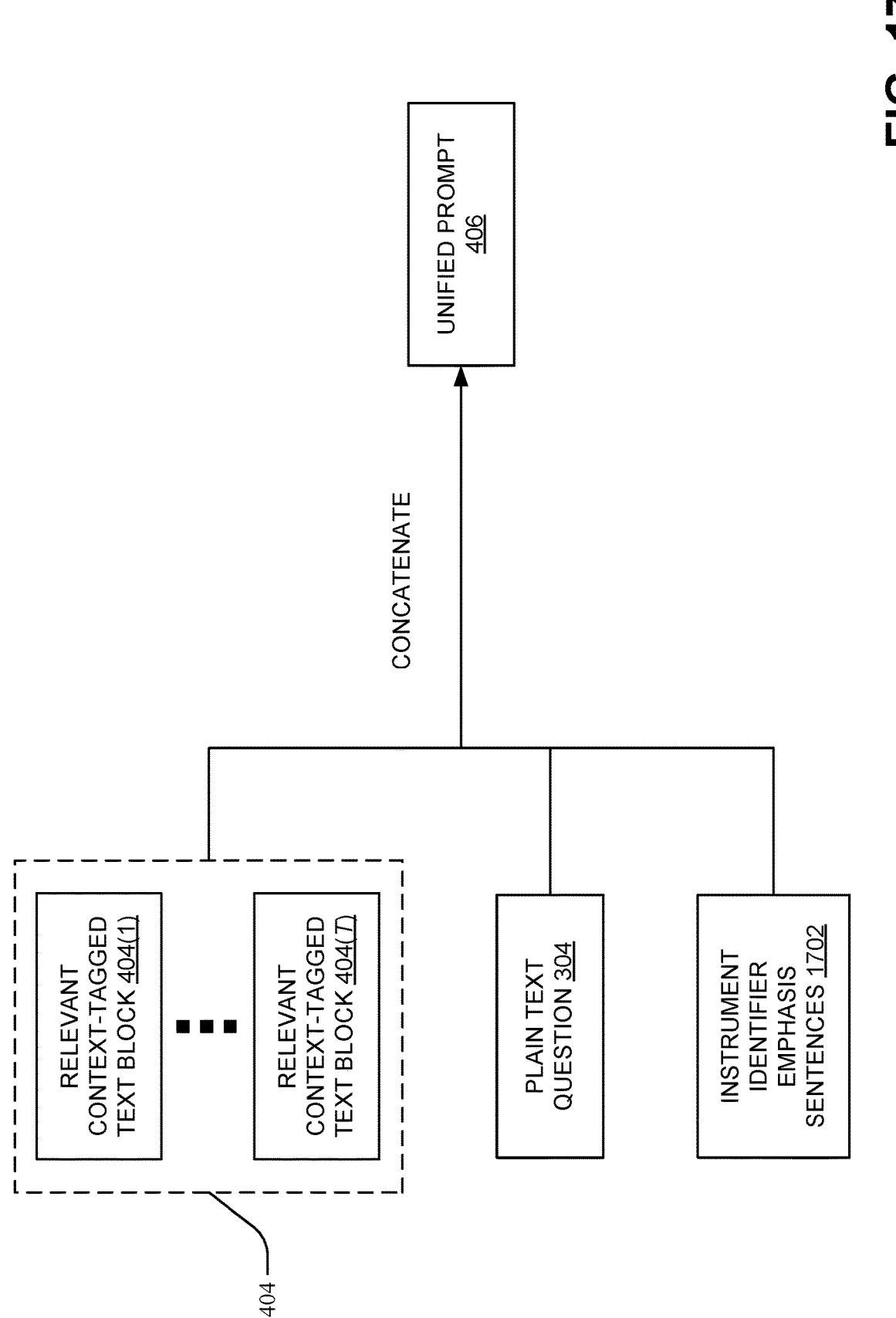
FIG. 17 illustrates an example, non-limiting block diagram showing how a unified prompt can be created in accordance with one or more embodiments described herein.

Now, consider FIG. 17. In various embodiments, the search component 320 can generate the unified prompt 406, based on the plurality of relevant context-tagged text blocks 404 and based on the plain text question 304. As a non-limiting example, the search component 320 can concatenate the plurality of relevant context-tagged text blocks 404 together with the plain text question 304, and such concatenation can be considered as the unified prompt 406.

In some aspects, the search component 320 can augment the unified prompt 406 with one or more instrument identifier emphasis sentences 1702. Indeed, as mentioned above, the search component 320 can determine (e.g., via the named entity recognition neural network 812) whether or not the plain text question 304 explicitly recites or otherwise contains any scientific instrument identifiers. In response to determining that the plain text question 304 does explicitly recite or otherwise include one or more scientific instrument identifiers, the search component 320 can add the one or more instrument identifier emphasis sentences 1702 to the unified prompt 406. In various cases, the one or more instrument identifier emphasis sentences can be any suitable unstructured or natural language sentences or sentence fragments that request or command that extra or additional attention be paid to whichever of the plurality of relevant context-tagged text blocks 404 also explicitly recite or include any of the one or more scientific instrument identifiers that are explicitly recited or included in the plain text question 304. As a non-limiting example, suppose that the plain text question 304 recites the identifier "ICS-2000". In such case, an instrument identifier emphasis sentence can be: "References that address ICS-2000 are preferred."; "Pay more attention to references that include ICS-2000."; or "Focus on references that deal with ICS-2000." In any case, the one or more instrument identifier emphasis sentences 1702 can be considered as guiding, encouraging, or otherwise forcing the plain text question 304 to be answered more heavily based on whichever of the plurality of relevant context-tagged text blocks 404 recite the same scientific instrument identifiers as the plain text question 304.

Indeed, the text synthesized by any large language model can be related to or otherwise based on the semantic content of whatever text that large language model receives as input. Thus, if that large language model were to receive both the plain text question 304 and the plurality of relevant context-tagged text blocks 404 as input, that large language model would synthesize text that semantically answers the plain text question 304 using whatever semantic information is contained within the plurality of relevant context-tagged text blocks 404. Without any additional input, that large language model would be free to rely more or to rely less on any of the plurality of relevant context-tagged text blocks 404 when synthesizing an answer to the plain text question 304 (e.g., that large language model could decide for itself, or possibly randomly, which relevant context-tagged text blocks to focus on when synthesizing text). However, by being fed the one or more instrument identifier emphasis sentences 1702 as a supplemental input, whatever text that is synthesized by that large language model can also be based on the semantic content of the one or more instrument identifier emphasis sentences 1702. Since the one or more instrument identifier emphasis sentences 1702 can semantically request or command that more attention be given to whichever of the plurality of relevant context-tagged text blocks 404 that recite the same instrument identifier as the plain text question 304, that large language model can synthesize text in accordance with (e.g., can obey) that request or command. In this way, the one or more instrument identifier emphasis sentences 1702 can be considered as linguistic or semantic blinders that can point a large language model toward whichever of the plurality of relevant context-tagged text blocks 404 that recite the same instrument identifier as the plain text question 304.

Figure 18:
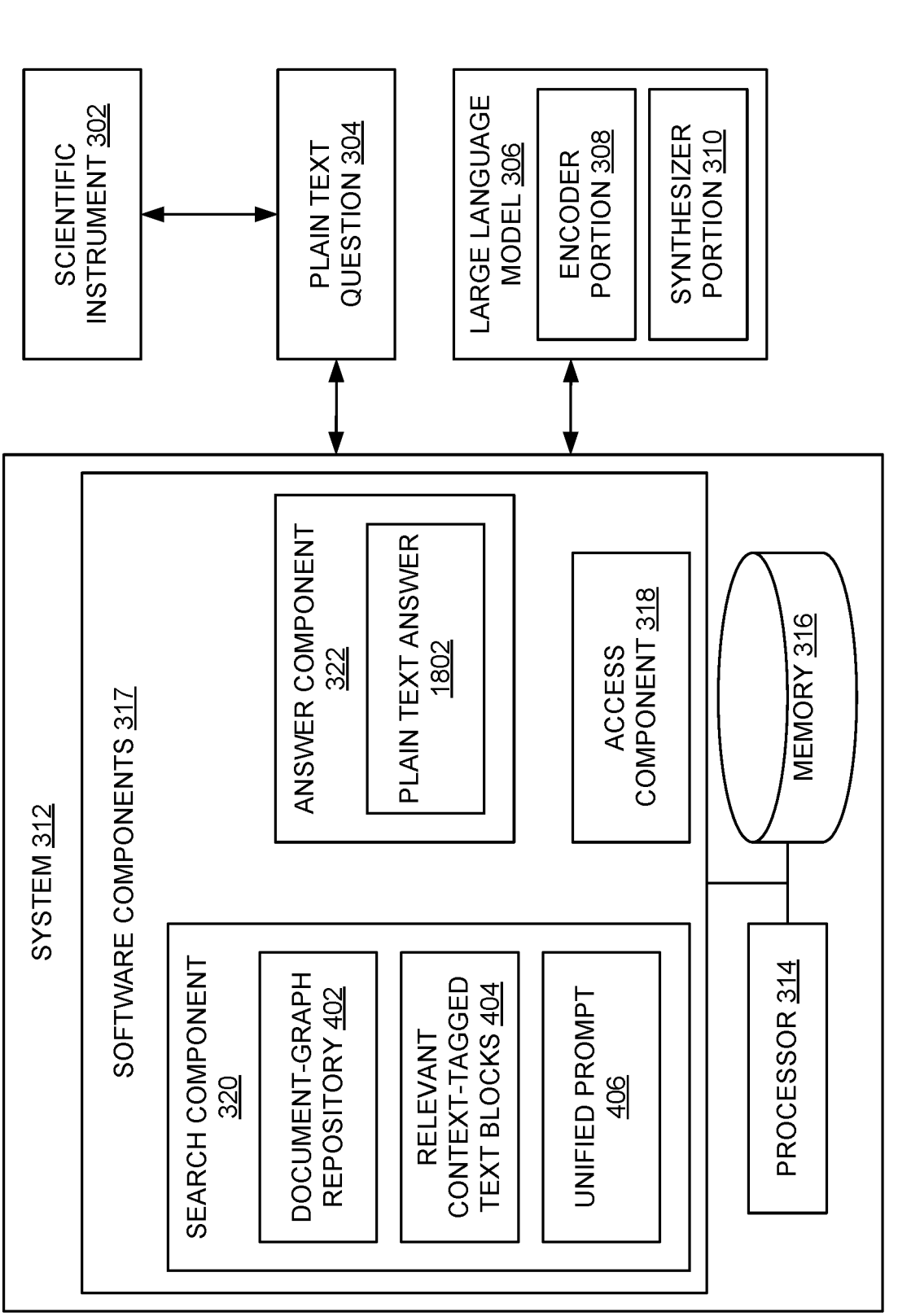
FIG. 18 illustrates a block diagram of an example, non-limiting system including a plain text answer that facilitates retrieval augmented generative question and answer boosting in accordance with one or more embodiments described herein.

FIG. 18 illustrates a block diagram of an example, non-limiting system including a plain text answer that can facilitate retrieval augmented generative question and answer boosting in accordance with one or more embodiments described herein.

In various embodiments, the answer component 322 can electronically generate a plain text answer 1802, based on the unified prompt 406. Non-limiting aspects are described with respect to FIG. 19.

Figure 19:
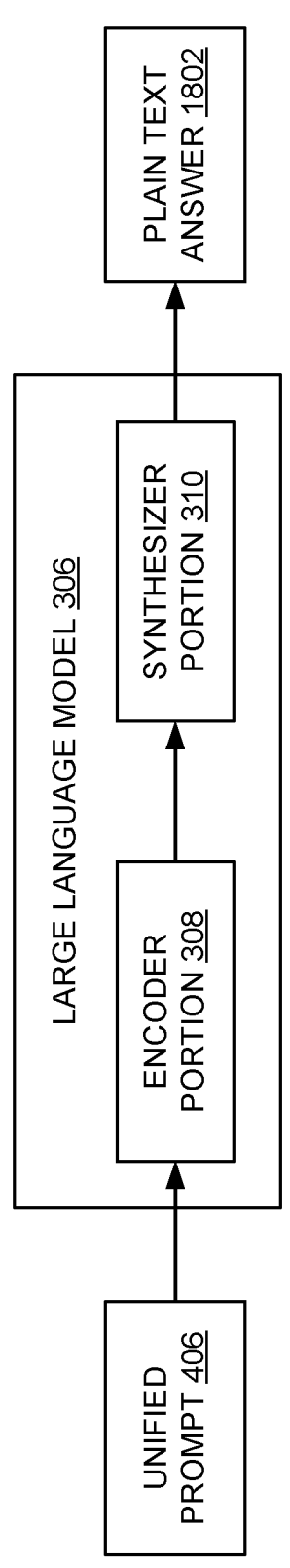
FIG. 19 illustrates an example, non-limiting block diagram showing how a plain text answer can be generated from a unified prompt in accordance with one or more embodiments described herein.

FIG. 19 illustrates an example, non-limiting block diagram showing how the plain text answer 1802 can be generated from the unified prompt 406 in accordance with one or more embodiments described herein.

In various aspects, the search component 320 can execute the LLM 306 on the unified prompt 406, and such execution can yield the plain text answer 1802. More specifically, the search component 320 can feed the unified prompt 406 to the LLM 306, the unified prompt 406 can complete a forward pass through the LLM 306 (e.g., through the encoder portion 308 and the synthesizer portion 310), and the LLM 306 can compute or calculate the plain text answer 1802 based on whatever activation maps or feature maps were internally generated by the LLM 306 during such forward pass. In any case, the plain text answer 1802 can be one or more unstructured or natural language sentences or sentence fragments that substantively identify whatever piece of technical information about the scientific instrument 302 that was requested or demanded by the plain text question 304. In various cases, the LLM 306 can be considered as synthesizing such piece of technical information, based on the semantic contents of the plurality of relevant context-tagged text blocks 404 (and based on the one or more instrument identifier emphasis sentences, as appropriate).

In various aspects, the answer component 322 can electronically transmit the plain text answer 1802 to any suitable computing device. In various instances, the answer component 322 can visually render the plain text answer 1802 on any suitable electronic display (e.g., computer screen, computer monitor). In various cases, the answer component 322 can audibly play the plain text answer 1802 via any suitable computerized speakers.

Note that the likelihood of the plain text answer 1802 being correct or accurate for the plain text question 304 can be higher, due to the herein-described implementation of: document-graphs comprising context-tagged text blocks; text block composition via graph-walking and embedding-change comparison; chain-of-thought re-ranking; and identifier emphasis augmentation. Indeed, as explained above, the present inventors experimentally verified such increase or boost in answer accuracy.

Although various embodiments are described herein as involving the generation of the plain text answer 1802, this is a mere non-limiting example for ease of explanation. It should be appreciated that the plain text answer 1802 can, in some aspects, not be plain text (e.g., not be one or more unstructured or natural language sentences). Indeed, in some instances, the result of executing the LLM 306 on the unified prompt 406 can be any suitable formatted or structured text, such as an HTML answer. In yet other instances, the result of executing the LLM 306 on the unified prompt 406 can comprise both structured and unstructured text. Accordingly, the plain text answer 1802 can, in some cases, be more generally or broadly considered as "a structured or unstructured answer 1802", any portions of which may be unformatted, unstructured, or natural language, and any other portions of which may be formatted, structured, or otherwise not natural language. Furthermore, in some embodiments, the structured or unstructured answer 1802 can be accompanied by citations (e.g., pointers or indicators) to one or more of the plurality of relevant context-tagged text blocks 404 (e.g., citations to whichever specific texts, tables, or figures from various of the plurality of technical documents 502 that were relied upon to respond to the plain text question 304).

In order for the plain text answer 1802 (referred to more broadly as the structured or unstructured answer 1802) to be accurate, correct, or reliable, the various machine learning models described herein can first undergo training. A non-limiting example of such training is described with respect to FIG. 20.

Figure 20:
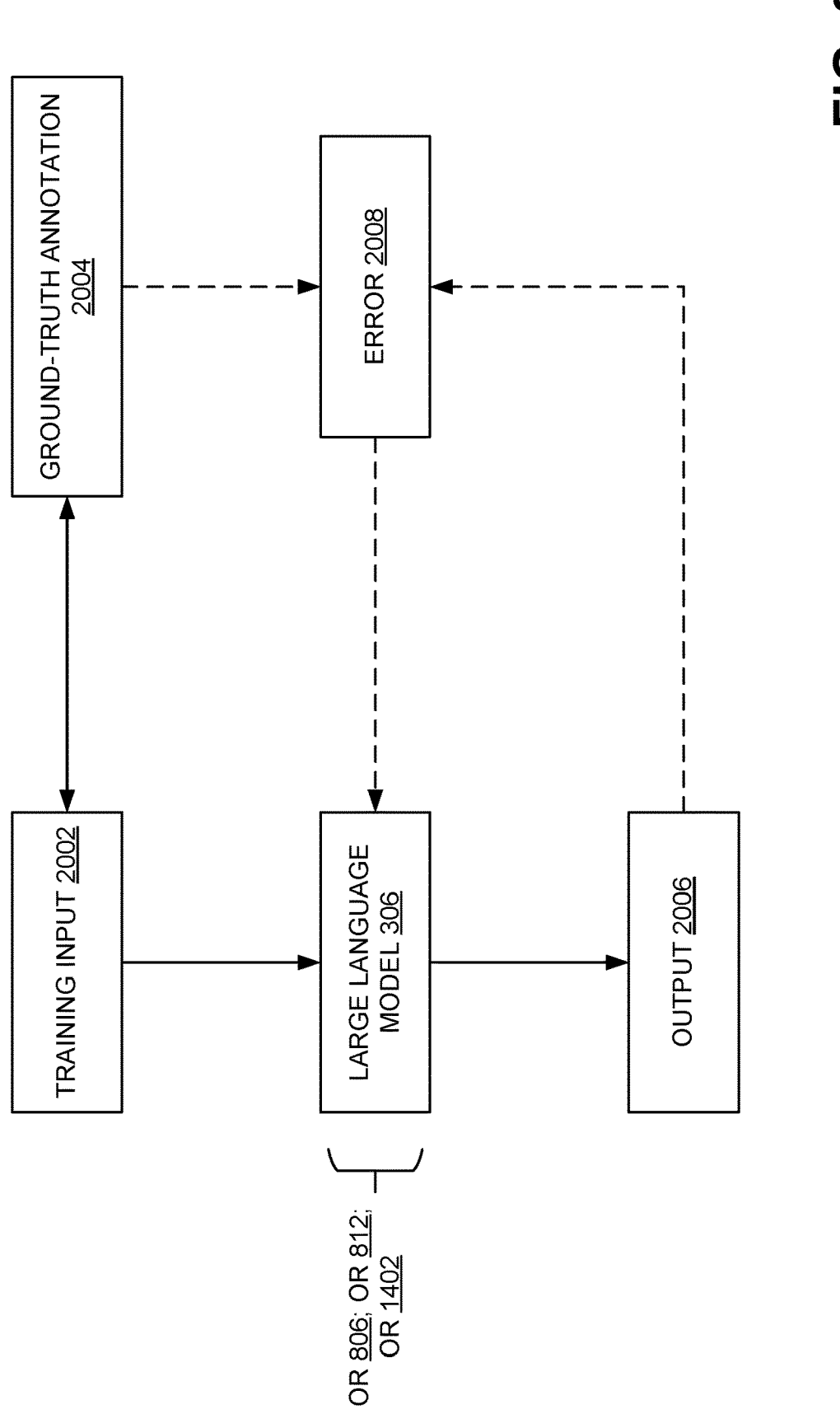
FIG. 20 illustrates an example, non-limiting block diagram showing how various artificial intelligence models can be trained in accordance with one or more embodiments described herein.

FIG. 20 illustrates an example, non-limiting block diagram showing how various artificial intelligence models can be trained in accordance with one or more embodiments described herein.

In various aspects, prior to beginning training, the trainable internal parameters (e.g., convolutional kernels, weight matrices, bias values) of whatever artificial intelligence model is being trained (e.g., the LLM 306, the text-to-graph neural network 806, the named entity recognition neural network 812, the re-ranker 1402) can be initialized in any suitable fashion (e.g., via random initialization).

In various embodiments, there can be a training input 2002 and a ground-truth annotation 2004. When it is desired to train the LLM 306, the training input 2002 can be any suitable training text (e.g., training questions, training text blocks, training document-exploration prompts, training chain-of-thought prompts), and the ground-truth annotation 2004 can be whatever correct or accurate synthesized textual content that is known or deemed to correspond to the training input 2002. When it is desired to train the text-to-graph neural network 806, the training input 2002 can be any suitable training document, and the ground-truth annotation 2004 can be whatever correct or accurate document-graph that is known or deemed to correspond to the training input 2002. When it is desired to train the named entity recognition neural network 812, the training input 2002 can be any suitable training text (e.g., training questions, training documents), and the ground-truth annotation 2004 can be whatever correct or accurate named entity identifiers or extractions that are known or deemed to correspond to the training input 2002. When it is desired to train the re-ranker 1402, the training input 2002 can be any suitable pair of training texts (e.g., a training question and a training text block; a training question and a set of training chain-of-thought responses), and the ground-truth annotation 2004 can be whatever correct or accurate relevance score that is known or deemed to correspond to the training input 2002.

In any case, the artificial intelligence model that is being trained can be executed on the training input 2002, thereby causing that artificial intelligence model to produce an output 2006. More specifically, in some cases, the training input 2002 can be fed or routed to the input layer of the artificial intelligence model, the training input 2002 can complete a forward pass through the one or more hidden layers of the artificial intelligence model, and the output layer of the artificial intelligence model can compute the output 2006 based on activation maps or feature maps provided by the one or more hidden layers of the artificial intelligence model.

Note that the format, size, or dimensionality of the output 2006 can be dictated by the number, arrangement, sizes, or other characteristics of the neurons, convolutional kernels, LSTM layers, or other internal parameters of the output layer (or of any other layers) of the artificial intelligence model. Accordingly, the output 2006 can be forced to have any desired format, size, or dimensionality, by adding, removing, or otherwise adjusting characteristics of the output layer (or of any other layers) of the artificial intelligence model.

In various aspects, if the output 2006 is produced by the LLM 306, the output 2006 can be considered as the predicted or inferred textual content that the LLM 306 has synthesized based on the training input 2002. Instead, if the output 2006 is produced by the text-to-graph neural network 806, the output 2006 can be considered as the predicted or inferred document-graph that the text-to-graph neural network 806 has synthesized based on the training input 2002. In other cases, if the output 2006 is produced by the named entity recognition neural network 812, the output 2006 can be considered as the predicted or inferred named entity identifiers (e.g., scientific instrument identifiers) that the named entity recognition neural network 812 has extracted from on the training input 2002. In yet other cases, if the output 2006 is produced by the re-ranker 1402, the output 2006 can be considered as the predicted or inferred relevance score that the re-ranker 1402 has calculated based on the training input 2002. In any case, the ground-truth annotation 2004 can be considered as whatever correct or accurate result that is known or deemed to correspond to the training input 2002. Note that, if the artificial intelligence model that is been trained has so far undergone no or little training, then the output 2006 can be highly inaccurate. In other words, the output 2006 can be very different from the ground-truth annotation 2004.

In various aspects, an error 2008 (e.g., mean absolute error (MAE), mean squared error (MSE), cross-entropy error) between the output 2006 and the ground-truth annotation 2004 can be computed. In various instances, the trainable internal parameters of the artificial intelligence model can be incrementally updated via backpropagation (e.g., stochastic gradient descent) based on the error 2008.

In various cases, such execution-and-update procedure can be repeated for any suitable number input-annotation pairs. This can ultimately cause the trainable internal parameters of the artificial intelligence model (e.g., of the LLM 306, of the text-to-graph neural network 806, of the named entity recognition neural network 812, of the re-ranker 1402) to become iteratively optimized for accurately performing its inferencing task (e.g., text synthesis, graph synthesis, named entity extraction, relevance score computation). In various aspects, any suitable training batch sizes, any suitable error/loss functions, or any suitable training termination criteria can be utilized during such training.

Although the herein disclosure mainly describes the various artificial intelligence models as being trained in supervised fashion, this is a mere non-limiting example for ease of explanation and illustration. In various embodiments, any other suitable training paradigms can be used to train the LLM 306, the text-to-graph neural network 806, the named entity recognition neural network 812, or the re-ranker 1402, such as unsupervised training or reinforcement learning.

Non-limiting examples of various specific constituent technologies that the present inventors utilized in reducing to practice various embodiments described herein include the following: Python; Javascript; docker containers; Postgres databases; Minio S3 compatible object storage; web servers; web-browser clients; Azure OpenAI® hosted artificial intelligence models; PyTorch® BERT models; transformer models; fully-connected neural networks; and Doccano for named entity recognition training.

Although the herein figures depict each context-tagged text block as corresponding to a single, respective embedding, this is a mere non-limiting example for ease of illustration and explanation. In various cases, each context-tagged text block can instead correspond to multiple, respective embeddings that can be produced by multiple different encoders (e.g., encoders other than or in addition to 308). Indeed, differently trained encoders can be considered as having different, unique, or idiosyncratic embedding spaces (e.g., different encoders can learn to capture different semantic content from inputted texts). So, different embeddings of any given context-tagged text block can be considered as capturing or representing different semantic dimensions or axes of the given context-tagged text block.

Figure 22:
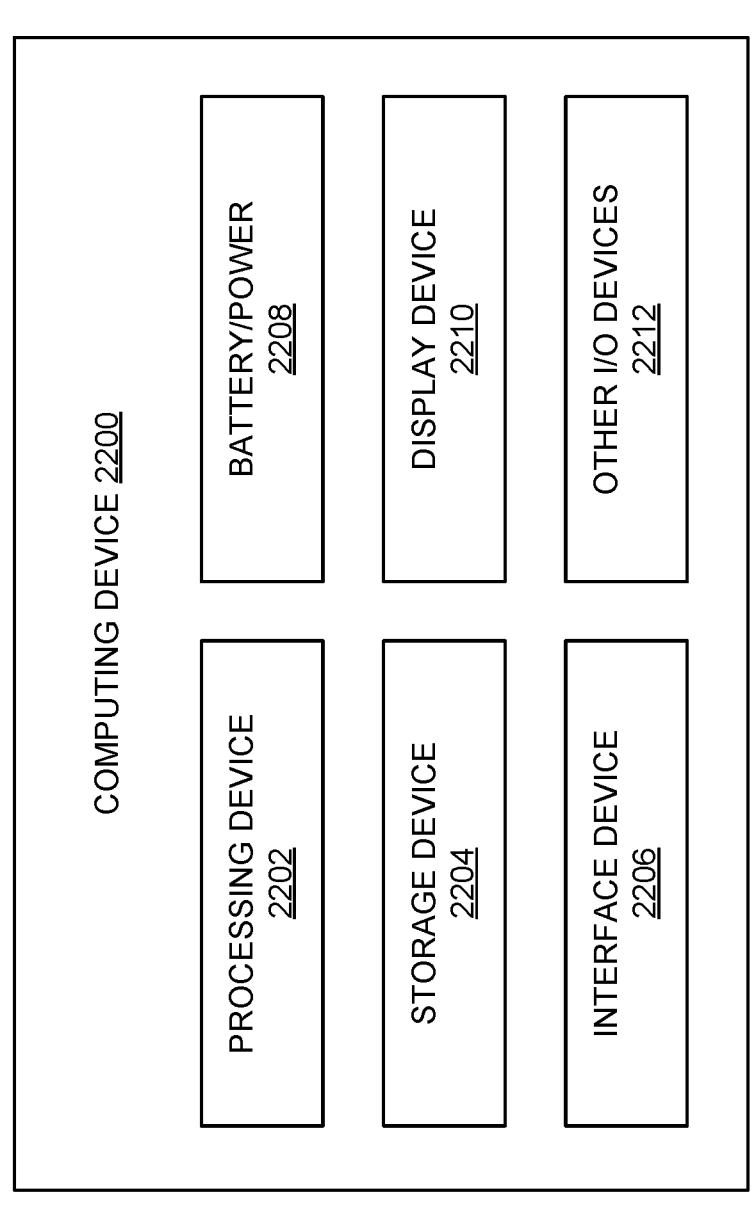
FIG. 22 illustrates an example, non-limiting block diagram of a computing device that can perform some or all of the methods or techniques disclosed herein, in accordance with various embodiments described herein.
Figure 23:
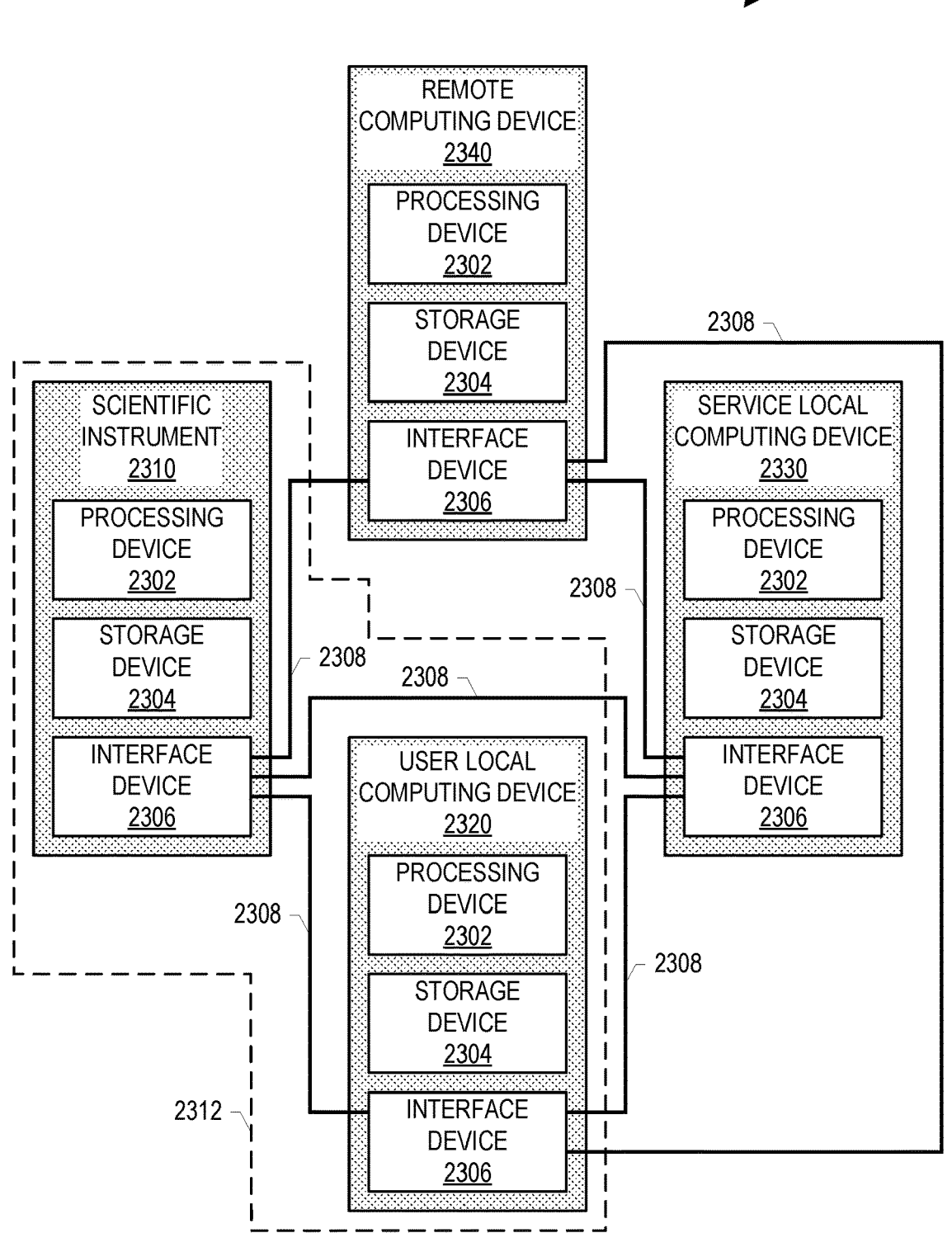
FIG. 23 illustrates an example, non-limiting block diagram of a scientific instrument support system in which some or all of the methods or techniques disclosed herein may be performed, in accordance with various embodiments described herein.

The scientific instrument systems, methods, or techniques disclosed herein may include interactions with a human user (e.g., via a user local computing device 2320 discussed herein with reference to FIG. 23). These interactions may include providing information to the user (e.g., information regarding the operation of a scientific instrument such as the scientific instrument 2310 of FIG. 23, information regarding a sample being analyzed or other test or measurement performed by a scientific instrument, information retrieved from a local or remote database, or other information) or providing an option for a user to input commands (e.g., to control the operation of a scientific instrument such as the scientific instrument 2310 of FIG. 23, or to control the analysis of data generated by a scientific instrument), queries (e.g., to a local or remote database), or other information. In some embodiments, these interactions may be performed through a graphical user interface (GUI) that includes a visual display on a display device (e.g., a display device 2210 discussed herein with reference to FIG. 22) that provides outputs to the user and/or prompts the user to provide inputs (e.g., via one or more input devices, such as a keyboard, mouse, trackpad, or touchscreen, included in other I/O devices 2212 discussed herein with reference to FIG. 22). The scientific instrument systems, methods, or techniques disclosed herein may include any suitable GUIs for interaction with a user.

Figure 21:
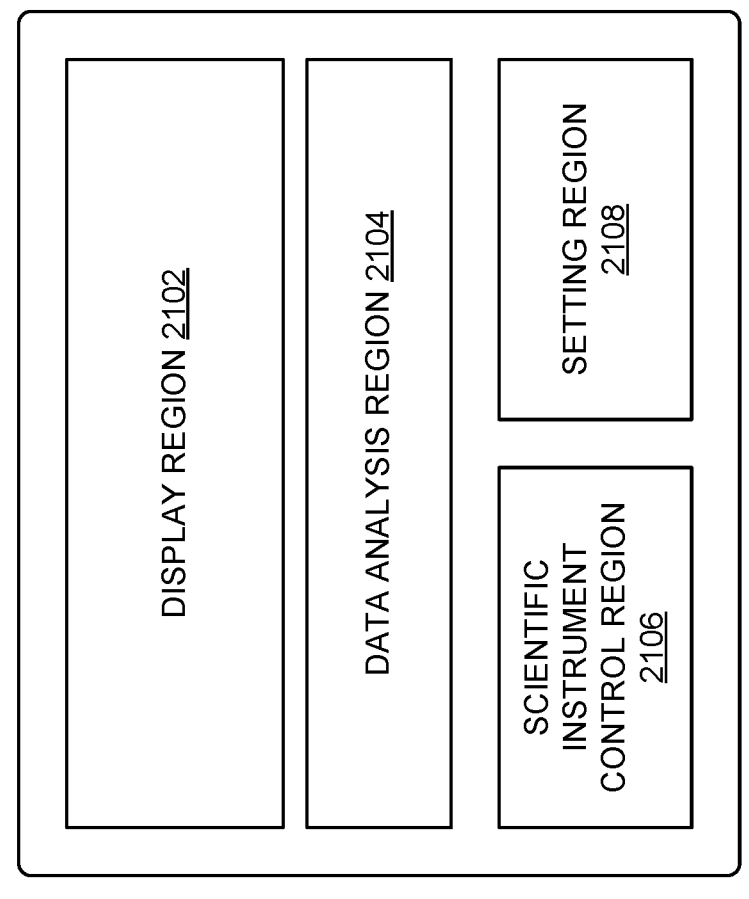
FIG. 21 illustrates an example, non-limiting block diagram of a graphical user interface that can be used in the performance of some or all of the methods or techniques disclosed herein, in accordance with various embodiments described herein.

FIG. 21 depicts an example graphical user interface 2100 (hereafter "GUI 2100") that can be used in the performance of some or all of the support methods or techniques disclosed herein, in accordance with various embodiments. In various aspects, the GUI 2100 can be provided on any suitable electronic display (e.g., a display device 2210 discussed herein with reference to FIG. 22) of a computing device (e.g., a computing device 2200 discussed herein with reference to FIG. 22) of a scientific instrument support system (e.g., a scientific instrument support system 2300 discussed herein with reference to FIG. 23), and a user or technician can interact with the GUI 2100 using any suitable input device (e.g., any of other I/O devices 2212 discussed herein with reference to FIG. 22) and input technique (e.g., movement of a cursor, motion capture, facial recognition, gesture detection, voice recognition, actuation of buttons).

The GUI 2100 can include a data display region 2102, a data analysis region 2104, a scientific instrument control region 2106, and a setting region 2108. The particular number and arrangement of regions depicted in FIG. 21 is merely illustrative, and any number and arrangement of regions, including any desired features, can be included in other embodiments of the GUI 2100.

The data display region 2102 can display data generated by a scientific instrument (e.g., a scientific instrument 2310 discussed herein with reference to FIG. 23).

The data analysis region 2104 can display any suitable data analysis results (e.g., the results of analyzing the data illustrated in the data display region 2102 or other data). In some embodiments, the data display region 2102 and the data analysis region 2104 can be combined in the GUI 2100 (e.g., to include both data output from a scientific instrument and some analysis of the data in a common graph or region).

The scientific instrument control region 2106 can include options that allow a user or technician to control a scientific instrument (e.g., the scientific instrument 2310 discussed herein with reference to FIG. 23). For example, the scientific instrument control region 2106 can include configurable parameters that govern operation of such scientific instrument (e.g., configurable parameters that govern voltages or electric currents of the scientific instrument, that govern interior temperatures of the scientific instrument, or that govern fluid flow rates of the scientific instrument).

The setting region 2108 can include options that allow a user or technician to control any features or functions of the GUI 2100 (or of other GUIs) or to perform common computing operations with respect to the data display region 2102 and the data analysis region 2104 (e.g., saving data on a storage device, such as the storage device 2204 discussed herein with reference to FIG. 22, sending data to another user, labeling data).

As noted above, the scientific instrument module 102 can be implemented by one or more computing devices. FIG. 22 is a block diagram of a computing device 2200 that can perform some or all of the scientific instrument methods or techniques disclosed herein, in accordance with various embodiments. In some embodiments, the scientific instrument module 102 can be implemented by a single instance of the computing device 2200 or by multiple instances of the computing device 2200. Further, as discussed below, the computing device 2200 (or multiple instances thereof) that implements the scientific instrument module 102 can be part of one or more of a scientific instrument 2310, a user local computing device 2320, a service local computing device 2330, or a remote computing device 2340 of FIG. 23.

The computing device 2200 is illustrated as having a number of components, but any one or more of these components can be omitted or duplicated, as suitable for the application and setting. In some embodiments, some or all of the components included in the computing device 2200 can be attached to one or more motherboards and enclosed in a housing (e.g., including plastic, metal, or other materials). In some embodiments, some these components can be fabricated onto a single system-on-a-chip (SoC) (e.g., an SoC may include one or more instances of a processing device 2202 and one or more instances of a storage device 2204). Additionally, in various embodiments, the computing device 2200 can omit one or more of the components illustrated in FIG. 22, but can include interface circuitry (not shown) for coupling to the one or more omitted components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 2200 can omit a display device 2210, but can include display device interface circuitry (e.g., a connector and driver circuitry) to which a display device 2210 can be coupled.

The computing device 2200 can include a processing device 2202 (e.g., one or more processing devices). As used herein, the term "processing device" can refer to any device or portion of a device that processes electronic data from registers or memory to transform that electronic data into other electronic data that may be stored in registers or memories. The processing device 2202 can include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 2200 can include a storage device 2204 (e.g., one or more storage devices). The storage device 2204 can include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 2204 can include memory that shares a die with a processing device 2202. In such an embodiment, the memory may be used as cache memory and may include embedded dynamic random access memory (eDRAM) or spin transfer torque magnetic random access memory (STT-MRAM), for example. In some embodiments, the storage device 2204 can include non-transitory computer readable media having instructions thereon that, when executed by one or more processing devices (e.g., the processing device 2202), cause the computing device 2200 to perform any appropriate ones of or portions of the methods disclosed herein.

The computing device 2200 can include an interface device 2206 (e.g., one or more instances of the interface device 2206). The interface device 2206 can include one or more communication chips, connectors, or other hardware and software to govern communications between the computing device 2200 and other computing devices. For example, the interface device 2206 can include circuitry for managing wireless communications for the transfer of data to and from the computing device 2200. The term "wireless" and its derivatives may be used to describe circuits, devices, systems, methods, techniques, or communications channels that may communicate data through the use of modulated electromagnetic radiation through a nonsolid medium. The term does not imply that the associated devices do not contain any wires, although in some embodiments they might not. Circuitry included in the interface device 2206 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2")). In some embodiments, circuitry included in the interface device 2206 for managing wireless communications can operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 2206 for managing wireless communications can operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 2206 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 2206 may include one or more antennas (e.g., one or more antenna arrays) to receipt and/or transmission of wireless communications.

In some embodiments, the interface device 2206 can include circuitry for managing wired communications, such as electrical, optical, or any other suitable communication protocols. For example, the interface device 2206 can include circuitry to support communications in accordance with Ethernet technologies. In some embodiments, the interface device 2206 can support both wireless and wired communication, or can support multiple wired communication protocols or multiple wireless communication protocols. For example, a first set of circuitry of the interface device 2206 may be dedicated to shorter-range wireless communications such as Wi-Fi or Bluetooth, and a second set of circuitry of the interface device 2206 may be dedicated to longer-range wireless communications such as global positioning system (GPS), EDGE, GPRS, CDMA, WiMAX, LTE, EV-DO, or others. In some embodiments, a first set of circuitry of the interface device 2206 can be dedicated to wireless communications, and a second set of circuitry of the interface device 2206 can be dedicated to wired communications.

The computing device 2200 can include battery/power circuitry 2208. The battery/power circuitry 2208 can include one or more energy storage devices (e.g., batteries or capacitors) or circuitry for coupling components of the computing device 2200 to an energy source separate from the computing device 2200 (e.g., alternating current line power).

The computing device 2200 can include a display device 2210 (e.g., multiple display devices). The display device 2210 can include any visual indicators, such as a heads-up display, a computer monitor, a projector, a touchscreen display, a liquid crystal display (LCD), a light-emitting diode display, or a flat panel display.

The computing device 2200 can include other input/output (I/O) devices 2212. The other I/O devices 2212 can include one or more audio output devices (e.g., speakers, headsets, earbuds, alarms), one or more audio input devices (e.g., microphones or microphone arrays), location devices (e.g., GPS devices in communication with a satellite-based system to receive a location of the computing device 2200), audio codecs, video codecs, printers, sensors (e.g., thermocouples or other temperature sensors, humidity sensors, pressure sensors, vibration sensors, accelerometers, gyroscopes), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 2200 can have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer), a desktop computing device, or a server computing device or other networked computing component.

One or more computing devices implementing any of the scientific instrument modules, methods, or techniques disclosed herein may be part of a scientific instrument support system. FIG. 23 is a block diagram of an example scientific instrument support system 2300 in which some or all of the scientific instrument support methods disclosed herein may be performed, in accordance with various embodiments. The scientific instrument modules, methods, or techniques disclosed herein (e.g., the scientific instrument module 102, the computer-implemented method 200, the system 312) can be implemented by one or more of a scientific instrument 2310, a user local computing device 2320, a service local computing device 2330, or a remote computing device 2340 of the scientific instrument support system 2300.

Any of the scientific instrument 2310, the user local computing device 2320, the service local computing device 2330, or the remote computing device 2340 can include any of the embodiments of the computing device 2200, and any of the scientific instrument 2310, the user local computing device 2320, the service local computing device 2330, or the remote computing device 2340 can take the form of any appropriate ones of the embodiments of the computing device 2200.

The scientific instrument 2310, the user local computing device 2320, the service local computing device 2330, or the remote computing device 2340 may each include a processing device 2302, a storage device 2304, and an interface device 2306. The processing device 2302 may take any suitable form, including any form of the processing device 2202, and the processing devices 2302 included in different ones of the scientific instrument 2310, the user local computing device 2320, the service local computing device 2330, or the remote computing device 2340 may take the same form or different forms. The storage device 2304 may take any suitable form, including any form of the storage device 2204, and the storage devices 2304 included in different ones of the scientific instrument 2310, the user local computing device 2320, the service local computing device 2330, or the remote computing device 2340 may take the same form or different forms. The interface device 2306 may take any suitable form, including any form of the interface device 2206, and the interface devices 2306 included in different ones of the scientific instrument 2310, the user local computing device 2320, the service local computing device 2330, or the remote computing device 2340 may take the same form or different forms.

The scientific instrument 2310, the user local computing device 2320, the service local computing device 2330, and the remote computing device 2340 can be in communication with other elements of the scientific instrument support system 2300 via communication pathways 2308. The communication pathways 2308 may communicatively couple the interface devices 2306 of different ones of the elements of the scientific instrument support system 2300, as shown, and may be wired or wireless communication pathways (e.g., in accordance with any of the communication techniques discussed herein with reference to the interface device 2206). The particular scientific instrument support system 2300 depicted in FIG. 23 includes communication pathways between each pair of the scientific instrument 2310, the user local computing device 2320, the service local computing device 2330, and the remote computing device 2340, but this "fully connected" implementation is merely illustrative, and in various embodiments, various ones of the communication pathways 2308 may be absent. For example, in some embodiments, a service local computing device 2330 can lack a direct communication pathway 2308 between its interface device 2306 and the interface device 2306 of the scientific instrument 2310, but can instead communicate with the scientific instrument 2310 via the communication pathway 2308 between the service local computing device 2330 and the user local computing device 2320 and the communication pathway 2308 between the user local computing device 2320 and the scientific instrument 2310.

The scientific instrument 2310 may include any appropriate scientific instrument, such as the scientific instrument 302.

The user local computing device 2320 can be a computing device (e.g., in accordance with any of the embodiments of the computing device 2200) that is local to a user of the scientific instrument 2310. In some embodiments, the user local computing device 2320 may also be local to the scientific instrument 2310, but this need not be the case; for example, a user local computing device 2320 that is in a user's home or office may be remote from, but in communication with, the scientific instrument 2310 so that the user may use the user local computing device 2320 to control or access data from the scientific instrument 2310. In some embodiments, the user local computing device 2320 may be a laptop, smartphone, or tablet device. In some embodiments the user local computing device 2320 can be a portable computing device.

The service local computing device 2330 can be a computing device (e.g., in accordance with any of the embodiments of the computing device 2200) that is local to an entity that services the scientific instrument 2310. For example, the service local computing device 2330 may be local to a manufacturer of the scientific instrument 2310 or to a third-party service company. In some embodiments, the service local computing device 2330 can communicate with the scientific instrument 2310, the user local computing device 2320, or the remote computing device 2340 (e.g., via a direct communication pathway 2308 or via multiple "indirect" communication pathways 2308, as discussed above) to receive data regarding the operation of the scientific instrument 2310, the user local computing device 2320, or the remote computing device 2340 (e.g., the results of self-tests of the scientific instrument 2310, calibration coefficients used by the scientific instrument 2310, the measurements of sensors associated with the scientific instrument 2310). In some embodiments, the service local computing device 2330 may communicate with the scientific instrument 2310, the user local computing device 2320, or the remote computing device 2340 (e.g., via a direct communication pathway 2308 or via multiple "indirect" communication pathways 2308, as discussed above) to transmit data to the scientific instrument 2310, the user local computing device 2320, or the remote computing device 2340 (e.g., to update programmed instructions, such as firmware, in the scientific instrument 2310, to initiate the performance of test or calibration sequences in the scientific instrument 2310, to update programmed instructions, such as software, in the user local computing device 2320 or the remote computing device 2340). A user of the scientific instrument 2310 can utilize the scientific instrument 2310 or the user local computing device 2320 to communicate with the service local computing device 2330 to report a problem with the scientific instrument 2310 or the user local computing device 2320, to request a visit from a technician to improve the operation of the scientific instrument 2310, to order consumables or replacement parts associated with the scientific instrument 2310, or for other purposes.

The remote computing device 2340 can be a computing device (e.g., in accordance with any of the embodiments of the computing device 2200 discussed herein) that is remote from the scientific instrument 2310 or from the user local computing device 2320. In some embodiments, the remote computing device 2340 can be included in a datacenter or other large-scale server environment. In some embodiments, the remote computing device 2340 may include network-attached storage (e.g., as part of the storage device 2304). The remote computing device 2340 can store data generated by the scientific instrument 2310, perform analyses of the data generated by the scientific instrument 2310 (e.g., in accordance with programmed instructions), facilitate communication between the user local computing device 2320 and the scientific instrument 2310, or facilitate communication between the service local computing device 2330 and the scientific instrument 2310.

In some embodiments, one or more of the elements of the scientific instrument support system 2300 illustrated in FIG. 23 can be omitted. Further, in some embodiments, multiple ones of various ones of the elements of the scientific instrument support system 2300 of FIG. 23 may be present. For example, a scientific instrument support system 2300 can include multiple user local computing devices 2320 (e.g., different user local computing devices 2320 associated with different users or in different locations). In another example, a scientific instrument support system 2300 may include multiple scientific instruments 2310, all in communication with service local computing device 2330 and/or a remote computing device 2340; in such an embodiment, the service local computing device 2330 may monitor these multiple scientific instruments 2310, and the service local computing device 2330 may cause updates or other information may be "broadcast" to multiple scientific instruments 2310 at the same time. Different ones of the scientific instruments 2310 in a scientific instrument support system 2300 can be located close to one another (e.g., in the same room) or farther from one another (e.g., on different floors of a building, in different buildings, in different cities, etc.). In some embodiments, a scientific instrument 2310 can be connected to an Internet-of-Things (IoT) stack that allows for command and control of the scientific instrument 2310 through a web-based application, a virtual or augmented reality application, a mobile application, or a desktop application. Any of these applications can be accessed by a user operating the user local computing device 2320 in communication with the scientific instrument 2310 by the intervening remote computing device 2340. In some embodiments, a scientific instrument 2310 may be sold by the manufacturer along with one or more associated user local computing devices 2320 as part of a local scientific instrument computing unit 2312.

In some embodiments, different ones of the scientific instruments 2310 included in a scientific instrument support system 2300 may be different types of scientific instruments 2310; for example, one scientific instrument 2310 may be a mass spectrometer, while another scientific instrument 2310 may be a chromatograph or autosampler. In some such embodiments, the remote computing device 2340 or the user local computing device 2320 can combine data from different types of scientific instruments 2310 included in a scientific instrument support system 2300.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)$=confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 24:
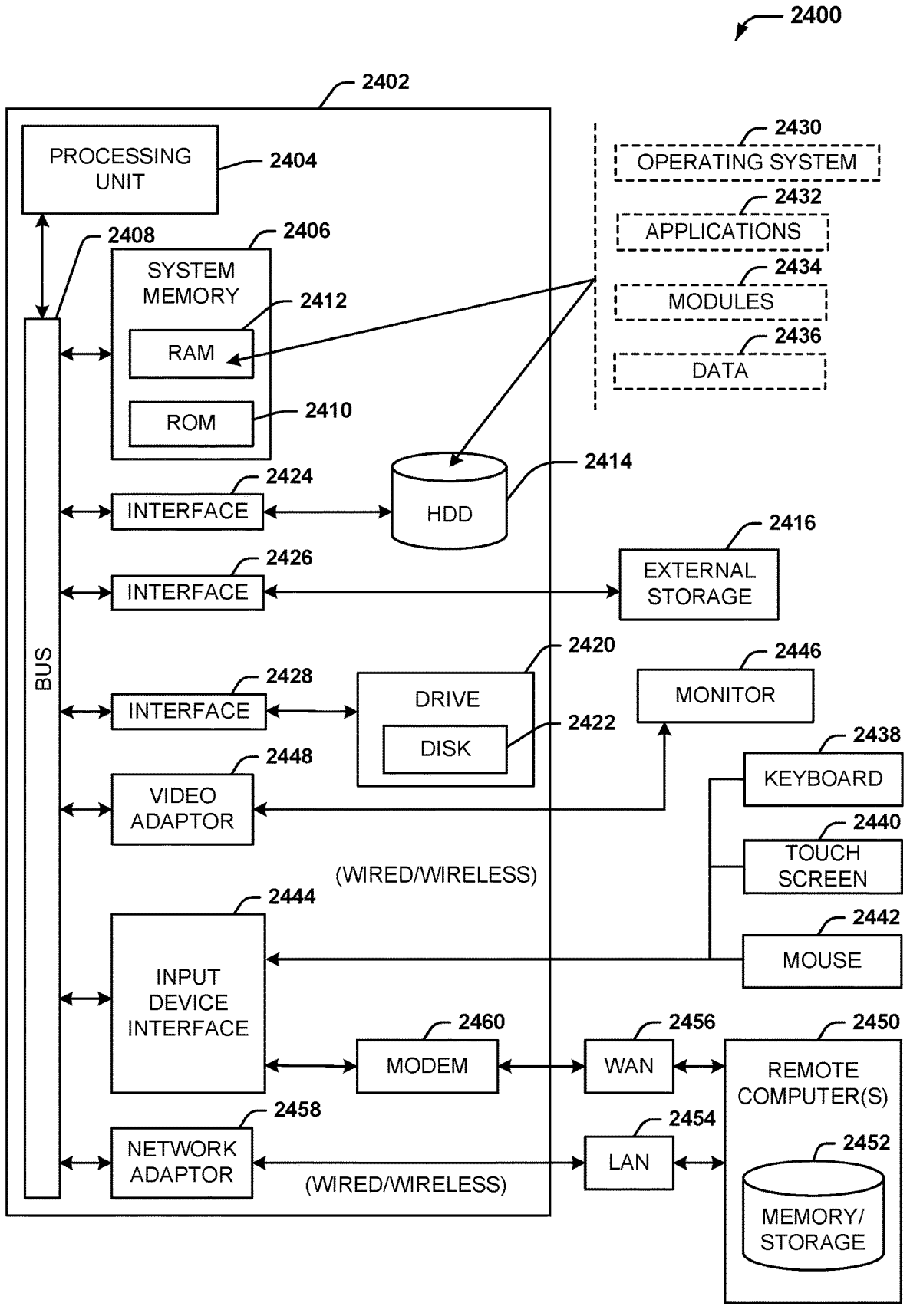
FIG. 24 illustrates a block diagram of an example, non-limiting operating environment in which one or more embodiments described herein can be facilitated.

In order to provide additional context for various embodiments described herein, FIG. 24 and the following discussion are intended to provide a brief, general description of a suitable computing environment 2400 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 24, the example environment 2400 for implementing various embodiments of the aspects described herein includes a computer 2402, the computer 2402 including a processing unit 2404, a system memory 2406 and a system bus 2408. The system bus 2408 couples system components including, but not limited to, the system memory 2406 to the processing unit 2404. The processing unit 2404 can be any of various commercially available processors. Dual microprocessors and other multi-processor architectures can also be employed as the processing unit 2404.

The system bus 2408 can be any of several types of bus structure that can further interconnect to a memory bus (with or without a memory controller), a peripheral bus, and a local bus using any of a variety of commercially available bus architectures. The system memory 2406 includes ROM 2410 and RAM 2412. A basic input/output system (BIOS) can be stored in a non-volatile memory such as ROM, erasable programmable read only memory (EPROM), EEPROM, which BIOS contains the basic routines that help to transfer information between elements within the computer 2402, such as during startup. The RAM 2412 can also include a high-speed RAM such as static RAM for caching data.

The computer 2402 further includes an internal hard disk drive (HDD) 2414 (e.g., EIDE, SATA), one or more external storage devices 2416 (e.g., a magnetic floppy disk drive (FDD) 2416, a memory stick or flash drive reader, a memory card reader, etc.) and a drive 2420, e.g., such as a solid state drive, an optical disk drive, which can read or write from a disk 2422, such as a CD-ROM disc, a DVD, a BD, etc.

Alternatively, where a solid state drive is involved, disk 2422 would not be included, unless separate. While the internal HDD 2414 is illustrated as located within the computer 2402, the internal HDD 2414 can also be configured for external use in a suitable chassis (not shown). Additionally, while not shown in environment 2400, a solid state drive (SSD) could be used in addition to, or in place of, an HDD 2414. The HDD 2414, external storage device(s) 2416 and drive 2420 can be connected to the system bus 2408 by an HDD interface 2424, an external storage interface 2426 and a drive interface 2428, respectively. The interface 2424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2412, including an operating system 2430, one or more application programs 2432, other program modules 2434 and program data 2436. All or portions of the operating system, applications, modules, or data can also be cached in the RAM 2412. The systems and methods described herein can be implemented utilizing various commercially available operating systems or combinations of operating systems.

Computer 2402 can optionally comprise emulation technologies. For example, a hypervisor (not shown) or other intermediary can emulate a hardware environment for operating system 2430, and the emulated hardware can optionally be different from the hardware illustrated in FIG. 24. In such an embodiment, operating system 2430 can comprise one virtual machine (VM) of multiple VMs hosted at computer 2402. Furthermore, operating system 2430 can provide runtime environments, such as the Java runtime environment or the .NET framework, for applications 2432. Runtime environments are consistent execution environments that allow applications 2432 to run on any operating system that includes the runtime environment. Similarly, operating system 2430 can support containers, and applications 2432 can be in the form of containers, which are lightweight, standalone, executable packages of software that include, e.g., code, runtime, system tools, system libraries and settings for an application.

Further, computer 2402 can be enable with a security module, such as a trusted processing module (TPM). For instance with a TPM, boot components hash next in time boot components, and wait for a match of results to secured values, before loading a next boot component. This process can take place at any layer in the code execution stack of computer 2402, e.g., applied at the application execution level or at the operating system (OS) kernel level, thereby enabling security at any level of code execution.

A user can enter commands and information into the computer 2402 through one or more wired/wireless input devices, e.g., a keyboard 2438, a touch screen 2440, and a pointing device, such as a mouse 2442. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2404 through an input device interface 2444 that can be coupled to the system bus 2408, but can be connected by other interfaces, such as a parallel port, an IEEE 1394 serial port, a game port, a USB port, an IR interface, a BLUETOOTH® interface, etc.

A monitor 2446 or other type of display device can be also connected to the system bus 2408 via an interface, such as a video adapter 2448. In addition to the monitor 2446, a computer typically includes other peripheral output devices (not shown), such as speakers, printers, etc.

The computer 2402 can operate in a networked environment using logical connections via wired or wireless communications to one or more remote computers, such as a remote computer(s) 2450. The remote computer(s) 2450 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2452 is illustrated. The logical connections depicted include wired/wireless connectivity to a local area network (LAN) 2454 or larger networks, e.g., a wide area network (WAN) 2456. Such LAN and WAN networking environments are commonplace in offices and companies, and facilitate enterprise-wide computer networks, such as intranets, all of which can connect to a global communications network, e.g., the Internet.

When used in a LAN networking environment, the computer 2402 can be connected to the local network 2454 through a wired or wireless communication network interface or adapter 2458. The adapter 2458 can facilitate wired or wireless communication to the LAN 2454, which can also include a wireless access point (AP) disposed thereon for communicating with the adapter 2458 in a wireless mode.

When used in a WAN networking environment, the computer 2402 can include a modem 2460 or can be connected to a communications server on the WAN 2456 via other means for establishing communications over the WAN 2456, such as by way of the Internet. The modem 2460, which can be internal or external and a wired or wireless device, can be connected to the system bus 2408 via the input device interface 2444. In a networked environment, program modules depicted relative to the computer 2402 or portions thereof, can be stored in the remote memory/storage device 2452. It will be appreciated that the network connections shown are example and other means of establishing a communications link between the computers can be used.

When used in either a LAN or WAN networking environment, the computer 2402 can access cloud storage systems or other network-based storage systems in addition to, or in place of, external storage devices 2416 as described above, such as but not limited to a network virtual machine providing one or more aspects of storage or processing of information. Generally, a connection between the computer 2402 and a cloud storage system can be established over a LAN 2454 or WAN 2456 e.g., by the adapter 2458 or modem 2460, respectively. Upon connecting the computer 2402 to an associated cloud storage system, the external storage interface 2426 can, with the aid of the adapter 2458 or modem 2460, manage storage provided by the cloud storage system as it would other types of external storage. For instance, the external storage interface 2426 can be configured to provide access to cloud storage sources as if those sources were physically connected to the computer 2402.

The computer 2402 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 25 is a schematic block diagram of a sample computing environment 2500 with which the disclosed subject matter can interact. The sample computing environment 2500 includes one or more client(s) 2510. The client(s) 2510 can be hardware or software (e.g., threads, processes, computing devices). The sample computing environment 2500 also includes one or more server(s) 2530. The server(s) 2530 can also be hardware or software (e.g., threads, processes, computing devices). The servers 2530 can house threads to perform transformations by employing one or more embodiments as described herein, for example. One possible communication between a client 2510 and a server 2530 can be in the form of a data packet adapted to be transmitted between two or more computer processes. The sample computing environment 2500 includes a communication framework 2550 that can be employed to facilitate communications between the client(s) 2510 and the server(s) 2530. The client(s) 2510 are operably connected to one or more client data store(s) 2520 that can be employed to store information local to the client(s) 2510. Similarly, the server(s) 2530 are operably connected to one or more server data store(s) 2540 that can be employed to store information local to the servers 2530.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various non-limiting aspects are described in the following examples.

EXAMPLE 1: A system can comprise: a processor that executes computer-executable components stored in a non-transitory computer-readable memory, wherein the computer-executable components comprise: an access component that can access a plain text question regarding a scientific instrument; and an answer component that can generate, via a large language model that references a document-graph repository, a structured or unstructured answer for the plain text question.

EXAMPLE 2: The system of any preceding example can be implemented, wherein the document-graph repository can comprise a plurality of document-graphs that respectively correspond to a plurality of technical documents, wherein, for a first document-graph of the plurality of document-graphs that corresponds to a first technical document of the plurality of technical documents, leaf nodes of the first document-graph can represent respective text blocks written in the first technical document, and wherein non-leaf nodes of the first document-graph can respectively represent a document title, one or more section headings, and one or more scientific instrument identifiers written in the first technical document and beneath which the respective text blocks are nested.

EXAMPLE 3: The system of any preceding example can be implemented, wherein, for a first leaf node that is nested beneath one or more first non-leaf nodes of the first document-graph, a concatenation of the first leaf node with the one or more first non-leaf nodes can form a context-tagged text block, and wherein the document-graph repository can comprise an embedding that semantically represents the context-tagged text block.

EXAMPLE 4: The system of any preceding example can be implemented, wherein the computer-executable components can comprise: a search component that can construct the document-graph repository via actions comprising: document-wise execution of a trained text-to-graph model on the plurality of technical documents; or document-wise execution of the large language model on the plurality of technical documents and on one or more document-exploration prompts.

EXAMPLE 5: The system of any preceding example can be implemented, wherein the computer-executable components can comprise: a search component that can identify, via an embedding search or a keyword search, a context-tagged text block from the document-graph repository that is related to the plain text question, can generate a composed context-tagged text block by iteratively performing document-graph walking and embedding-change comparison with respect to the context-tagged text block, and can generate a unified prompt based on concatenating the plain text question with the composed context-tagged text block, wherein the large language model can receive the unified prompt as input and can produce the structured or unstructured answer as output.

EXAMPLE 6: The system of any preceding example can be implemented, wherein the computer-executable components can comprise: a search component that can identify some of a plurality of context-tagged text blocks from the document-graph repository via an embedding search based on the plain text question and others of the plurality of context-tagged text blocks from the document-graph repository via a keyword search based on the plain text question, wherein the search component can select, via execution of a re-ranker, one or more highest-ranking context-tagged text blocks from the plurality of context-tagged text blocks, wherein the search component can generate a unified prompt by concatenating the plain text question with the one or more highest-ranking context-tagged text blocks, and wherein the large language model can receive the unified prompt as input and can produce the structured or unstructured answer as output.

EXAMPLE 7: The system of any preceding example can be implemented, wherein the search component can bias the re-ranker toward context-tagged text blocks found using the keyword search, in response to a determination that the plain text question comprises a scientific instrument identifier.

EXAMPLE 8: The system of any preceding example can be implemented, wherein the search component can cause the large language model to respond to one or more chain-of-thought prompts for respective ones of the plurality of context-tagged text blocks, thereby yielding a plurality of chain-of-thought responses that respectively correspond to the plurality of context-tagged text blocks, wherein the re-ranker can assign respective relevance scores to the plurality of chain-of-thought responses, and wherein the search component can identify the one or more highest-ranking context-tagged text blocks based on the relevance scores.

EXAMPLE 9: The system of any preceding example can be implemented, wherein the answer component can prompt the large language model to pay extra attention to an identifier of the scientific instrument, in response to the identifier being written in the plain text question.

In various embodiments, any combination or combinations of examples 1-9 can be implemented.

EXAMPLE 10: A computer-implemented method can comprise: accessing, by a device operatively coupled to a processor, a plain text question regarding a scientific instrument; and generating, by the device and via a large language model that references a document-graph repository, a structured or unstructured answer for the plain text question.

EXAMPLE 11: The computer-implemented method of any preceding example can be implemented, wherein the document-graph repository can comprise a plurality of document-graphs that respectively correspond to a plurality of technical documents, wherein, for a first document-graph of the plurality of document-graphs that corresponds to a first technical document of the plurality of technical documents, leaf nodes of the first document-graph can represent respective text blocks written in the first technical document, and wherein non-leaf nodes of the first document-graph can respectively represent a document title, one or more section headings, and one or more scientific instrument identifiers written in the first technical document and beneath which the respective text blocks are nested.

EXAMPLE 12: The computer-implemented method of any preceding example can be implemented, wherein, for a first leaf node that is nested beneath one or more first non-leaf nodes of the first document-graph, a concatenation of the first leaf node with the one or more first non-leaf nodes can form a context-tagged text block, and wherein the document-graph repository can comprise an embedding that semantically represents the context-tagged text block.

EXAMPLE 13: The computer-implemented method of any preceding example can be implemented, further comprising: constructing, by the device, the document-graph repository via actions comprising: document-wise execution of a trained text-to-graph model on the plurality of technical documents; or document-wise execution of the large language model on the plurality of technical documents and on one or more document-exploration prompts.

EXAMPLE 14: The computer-implemented method of any preceding example can be implemented, further comprising: identifying, by the device and via an embedding search or a keyword search, a context-tagged text block from the document-graph repository that is related to the plain text question; generating, by the device, a composed context-tagged text block by performing actions comprising iterative document-graph walking and embedding-change comparison with respect to the context-tagged text block; and generating, by the device, a unified prompt based on concatenating the plain text question with the composed context-tagged text block, wherein the large language model can receive the unified prompt as input and can produce the structured or unstructured answer as output.

EXAMPLE 15: The computer-implemented method of any preceding example can be implemented, further comprising: identifying, by the device, some of a plurality of context-tagged text blocks from the document-graph repository via an embedding search based on the plain text question and others of the plurality of context-tagged text blocks from the document-graph repository via a keyword search based on the plain text question; selecting, by the device and via execution of a re-ranker, one or more highest-ranking context-tagged text blocks from the plurality of context-tagged text blocks; and generating, by the device, a unified prompt by concatenating the plain text question with the one or more highest-ranking context-tagged text blocks, wherein the large language model can receive the unified prompt as input and can produce the structured or unstructured answer as output.

EXAMPLE 16: The computer-implemented method of any preceding example can be implemented, wherein the device can bias the re-ranker toward context-tagged text blocks found using the keyword search, in response to a determination that the plain text question comprises a scientific instrument identifier.

EXAMPLE 17: The computer-implemented method of any preceding example can be implemented, wherein the device can cause the large language model to respond to one or more chain-of-thought prompts for respective ones of the plurality of context-tagged text blocks, thereby yielding a plurality of chain-of-thought responses that respectively correspond to the plurality of context-tagged text blocks, wherein the re-ranker can assign respective relevance scores to the plurality of chain-of-thought responses, and wherein the device can identify the one or more highest-ranking context-tagged text blocks based on the relevance scores.

In various embodiments, any combination or combinations of examples 10-17 can be implemented.

EXAMPLE 18: A computer program product for facilitating retrieval augmented generative question and answer boosting can comprise a non-transitory computer-readable memory having program instructions embodied therewith. In various aspects, the program instructions can be executable by a processor to cause the processor to: access a natural language question asking about maintenance or operation of a scientific instrument; identify, from a document-graph repository, one or more context-tagged text blocks that are relevant to the natural language question; and generate, via execution of a large language model on a unified prompt that is based on the natural language question and on the one or more context-tagged text blocks, a natural language answer.

EXAMPLE 19: The computer program product of any preceding example can be implemented, wherein, in response to the natural language question containing an identifier of the scientific instrument, the processor can cause the unified prompt to comprise a natural language sentence instructing the large language model to pay extra attention to the identifier.

EXAMPLE 20: The computer program product of any preceding example can be implemented, wherein the processor can identify the one or more context-tagged text blocks via an embedding search, a keyword search, and a re-ranker, and wherein the re-ranker can respectively assign relevance scores to the one or more context-tagged text blocks based on texts synthesized by the large language model in response to chain-of-thought prompts corresponding to the one or more context-tagged text blocks.

In various embodiments, any combination or combinations of examples 18-20 can be implemented.

In various embodiments, any combination or combinations of examples 1-20 can be implemented.

What is claimed is:

1. A system, comprising:
   a processor that executes computer-executable components stored in a non-transitory computer-readable memory, wherein the computer-executable components comprise:
      an access component that accesses a plain text question regarding a scientific instrument; and
      an answer component that generates, via a large language model that references a document-graph repository, a structured or unstructured answer for the plain text question.

2. The system of claim 1, wherein the document-graph repository comprises a plurality of document-graphs that respectively correspond to a plurality of technical documents, wherein, for a first document-graph of the plurality of document-graphs that corresponds to a first technical document of the plurality of technical documents, leaf nodes of the first document-graph represent respective text blocks written in the first technical document, and wherein non-leaf nodes of the first document-graph respectively represent a document title, one or more section headings, and one or more scientific instrument identifiers written in the first technical document and beneath which the respective text blocks are nested.

3. The system of claim 2, wherein, for a first leaf node that is nested beneath one or more first non-leaf nodes of the first document-graph, a concatenation of the first leaf node with the one or more first non-leaf nodes forms a context-tagged text block, and wherein the document-graph repository comprises an embedding that semantically represents the context-tagged text block.

4. The system of claim 3, wherein the computer-executable components comprise:
   a search component that constructs the document-graph repository via actions comprising:
      document-wise execution of a trained text-to-graph model on the plurality of technical documents; or
      document-wise execution of the large language model on the plurality of technical documents and on one or more document-exploration prompts.

5. The system of claim 1, wherein the computer-executable components comprise:
   a search component that identifies, via an embedding search or a keyword search, a context-tagged text block from the document-graph repository that is related to the plain text question, generates a composed context-tagged text block by iteratively performing document-graph walking and embedding-change comparison with respect to the context-tagged text block, and generates a unified prompt based on concatenating the plain text question with the composed context-tagged text block, wherein the large language model receives the unified prompt as input and produces the structured or unstructured answer as output.

6. The system of claim 1, wherein the computer-executable components comprise:
   a search component that identifies some of a plurality of context-tagged text blocks from the document-graph repository via an embedding search based on the plain text question and others of the plurality of context-tagged text blocks from the document-graph repository via a keyword search based on the plain text question, and wherein the search component selects, via execution of a re-ranker, one or more highest-ranking context-tagged text blocks from the plurality of context-tagged text blocks, wherein the search component generates a unified prompt by concatenating the plain text question with the one or more highest-ranking context-tagged text blocks, and wherein the large language model receives the unified prompt as input and produces the structured or unstructured answer as output.

7. The system of claim 6, wherein the search component biases the re-ranker toward context-tagged text blocks found using the keyword search, in response to a determination that the plain text question comprises a scientific instrument identifier.

8. The system of claim 6, wherein the search component causes the large language model to respond to one or more chain-of-thought prompts for respective ones of the plurality of context-tagged text blocks, thereby yielding a plurality of chain-of-thought responses that respectively correspond to the plurality of context-tagged text blocks, wherein the re-ranker assigns respective relevance scores to the plurality of chain-of-thought responses, and wherein the search component identifies the one or more highest-ranking context-tagged text blocks based on the relevance scores.

9. The system of claim 1, wherein the answer component prompts the large language model to pay extra attention to an identifier of the scientific instrument, in response to the identifier being written in the plain text question.

10. A computer-implemented method, comprising:
    accessing, by a device operatively coupled to a processor, a plain text question regarding a scientific instrument; and
    generating, by the device and via a large language model that references a document-graph repository, a structured or unstructured answer for the plain text question.

11. The computer-implemented method of claim 10, wherein the document-graph repository comprises a plurality of document-graphs that respectively correspond to a plurality of technical documents, wherein, for a first document-graph of the plurality of document-graphs that corresponds to a first technical document of the plurality of technical documents, leaf nodes of the first document-graph represent respective text blocks written in the first technical document, and wherein non-leaf nodes of the first document-graph respectively represent a document title, one or more section headings, and one or more scientific instrument identifiers written in the first technical document and beneath which the respective text blocks are nested.

12. The computer-implemented method of claim 11, wherein, for a first leaf node that is nested beneath one or more first non-leaf nodes of the first document-graph, a concatenation of the first leaf node with the one or more first non-leaf nodes forms a context-tagged text block, and wherein the document-graph repository comprises an embedding that semantically represents the context-tagged text block.

13. The computer-implemented method of claim 12, further comprising:

constructing, by the device, the document-graph repository via actions comprising:

document-wise execution of a trained text-to-graph model on the plurality of technical documents; or document-wise execution of the large language model on the plurality of technical documents and on one or more document-exploration prompts.

14. The computer-implemented method of claim 10, further comprising:

identifying, by the device and via an embedding search or a keyword search, a context-tagged text block from the document-graph repository that is related to the plain text question;

generating, by the device, a composed context-tagged text block by performing actions comprising iterative document-graph walking and embedding-change comparison with respect to the context-tagged text block; and generating, by the device, a unified prompt based on concatenating the plain text question with the composed context-tagged text block, wherein the large language model receives the unified prompt as input and produces the structured or unstructured answer as output.

15. The computer-implemented method of claim 11, further comprising:

identifying, by the device, some of a plurality of context-tagged text blocks from the document-graph repository via an embedding search based on the plain text question and others of the plurality of context-tagged text blocks from the document-graph repository via a keyword search based on the plain text question;

selecting, by the device and via execution of a re-ranker, one or more highest-ranking context-tagged text blocks from the plurality of context-tagged text blocks; and generating, by the device, a unified prompt by concatenating the plain text question with the one or more highest-ranking context-tagged text blocks, wherein the large language model receives the unified prompt as input and produces the structured or unstructured answer as output.

16. The computer-implemented method of claim 15, wherein the device biases the re-ranker toward context-tagged text blocks found using the keyword search, in response to a determination that the plain text question comprises a scientific instrument identifier.

17. The computer-implemented method of claim 15, wherein the device causes the large language model to respond to one or more chain-of-thought prompts for respective ones of the plurality of context-tagged text blocks, thereby yielding a plurality of chain-of-thought responses that respectively correspond to the plurality of context-tagged text blocks, wherein the re-ranker assigns respective relevance scores to the plurality of chain-of-thought responses, and wherein the device identifies the one or more highest-ranking context-tagged text blocks based on the relevance scores.

18. A computer program product for facilitating retrieval augmented generative question and answer boosting, the computer program product comprising a non-transitory computer-readable memory having program instructions embodied therewith, the program instructions executable by a processor to cause the processor to:

access a natural language question asking about maintenance or operation of a scientific instrument;

identify, from a document-graph repository, one or more context-tagged text blocks that are relevant to the natural language question; and generate, via execution of a large language model on a unified prompt that is based on the natural language question and on the one or more context-tagged text blocks, a natural language answer.

19. The computer program product of claim 18, wherein, in response to the natural language question containing an identifier of the scientific instrument, the processor causes the unified prompt to comprise a natural language sentence instructing the large language model to pay extra attention to the identifier.

20. The computer program product of claim 18, wherein the processor identifies the one or more context-tagged text blocks via an embedding search, a keyword search, and a re-ranker, and wherein the re-ranker respectively assigns relevance scores to the one or more context-tagged text blocks based on texts synthesized by the large language model in response to chain-of-thought prompts corresponding to the one or more context-tagged text blocks.

* * * * *